(12) United States Patent
Sterritt et al.

(10) Patent No.: US 8,983,882 B2
(45) Date of Patent: Mar. 17, 2015

(54) AUTONOMIC AND APOPTOPIC SYSTEMS IN COMPUTING, ROBOTICS, AND SECURITY

(75) Inventors: Roy Sterritt, Newtownabbey (GB); Michael G. Hinchey, Bowie, MD (US)

(73) Assignee: The United States of America as represented by the Administrator of the National Aeronautics Space Administration, Washington, DC (US)

( * ) Notice: Subject to any disclaimer, the term of this patent is extended or adjusted under 35 U.S.C. 154(b) by 279 days.

(21) Appl. No.: 13/592,409

(22) Filed: Aug. 23, 2012

(65) Prior Publication Data

US 2013/0080360 A1 Mar. 28, 2013

Related U.S. Application Data

(60) Continuation-in-part of application No. 12/569,422, filed on Sep. 29, 2009, now Pat. No. 8,275,724, and a continuation-in-part of application No. 13/230,920, filed on Sep. 13, 2011, now Pat. No. 8,275,725, which is a division of application No. 11/836,352, filed on Aug. 9, 2007, now Pat. No. 8,041,655.

(60) Provisional application No. 60/822,687, filed on Aug. 17, 2006.

(51) Int. Cl.
*G06F 15/18* (2006.01)
*G05B 13/02* (2006.01)
*G06N 3/02* (2006.01)
*G06N 3/00* (2006.01)

(52) U.S. Cl.
CPC *G05B 13/02* (2013.01); *G06N 3/02* (2013.01); *G05B 13/027* (2013.01); *G06N 3/004* (2013.01)
USPC .......................................................... 706/14

(58) Field of Classification Search
USPC .......................................................... 706/14
See application file for complete search history.

(56) References Cited

U.S. PATENT DOCUMENTS

| 7,904,396 | B2 * | 3/2011 | Hinchey et al. | 706/11 |
|---|---|---|---|---|
| 7,925,600 | B2 * | 4/2011 | Hinchey et al. | 706/13 |
| 7,979,848 | B2 * | 7/2011 | Hinchey et al. | 717/127 |
| 7,992,134 | B2 * | 8/2011 | Hinchey et al. | 717/126 |
| 8,041,655 | B2 * | 10/2011 | Hinchey et al. | 706/14 |
| 8,082,538 | B2 * | 12/2011 | Hinchey et al. | 717/104 |
| 8,140,452 | B2 * | 3/2012 | Hinchey et al. | 706/14 |
| 8,140,453 | B2 * | 3/2012 | Hinchey et al. | 706/14 |
| 8,165,976 | B2 * | 4/2012 | Hinchey et al. | 706/14 |
| 8,165,977 | B2 * | 4/2012 | Hinchey et al. | 706/14 |
| 8,275,724 | B2 * | 9/2012 | Hinchey et al. | 706/14 |
| 8,275,725 | B2 * | 9/2012 | Hinchey et al. | 706/14 |
| 8,694,963 | B2 * | 4/2014 | Hinchey et al. | 717/122 |

* cited by examiner

*Primary Examiner* — Michael B Holmes

(57) ABSTRACT

Autonomic computing, robotics, and security devices, systems, and methods are provided. Agents of the system can communicate with one another and can self-destruct under event conditions that would render the agent detrimental to the overall system.

70 Claims, 32 Drawing Sheets

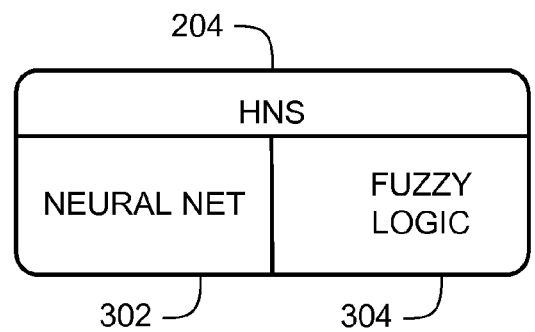
FIG. 3

I. Autonomic System (AS)
- AS Service-Level Objectives
- AS Self-Management Policies
- AS Architecture
- AS Actions
- AS Events
- AS Metrics II. AS Interaction Protocol (ASIP)
- AS Messages & Negotiation Protocol
- AS Communication Channels
- AS Communication Functions III. Autonomic Element (AE)
- AE Service-Level Objectives
- AE Self-Management Policies
- AE Friends
- AE Interaction Protocol (AEIP)
    - AE Messages & Negotiation Protocol
    - AE Communication Channels
    - AE Communication Functions
    - AE Managed Resource Interface
- AE Recovery Protocols
- AE Behavior Models
- AE Outcomes
- AE Actions
- AE Events
- AE Metrics

FIG. 28

```
1.   AECLASS Worker {
2.    AESELF_MANAGEMENT {
3.     OTHER_POLICIES {
4.      SELF_SACRIFICE {
5.       FLUENT unableToExplore {
6.         INITIATED_BY {EVENTS.instrisNonfunctional }
7.          TERMINATED_BY {EVENTS.canBeRuler , EVENTS.canBeMessenger,
8.            EVENTS.canBeShield , EVENTS.mustBeDestroyed }
9.       }
10.      FLUENT inTransformToRuler {
11.         INITIATED_BY { EVENTS.canBeRuler }
12.         TERMINATED_BY { EVENTS.transformedToRuler ,
13.              EVENTS.canBeMessenger , EVENTS.canBeShield }
14.      }
15.      FLUENT inTransformToMessenger {
16.          INTIATED_BY { EVENTS.canBeMessenger }
17.           TERMINATED_BY { EVENTS.transformedToMessenger,
18.              EVENTS.canBeRuler , EVENTS.canBeShield }
19.      }
20.      FLUENT inTransformToShield {
21.          INITIATED_BY { EVENTS.canBeShield , EVENTS.transformedToShield }
22.          TERMINATED_BY { EVENTS.mustBeDestroyed }
23.      }
24.      FLUENT inSelfDestruction {
25.          INITIATED_BY { EVENTS.mustBeDestroyed }
26.      }
27.      MAPPING {
28.          CONDITIONS { instrisNonfunctional }
29.          DO_ACTIONS { ACTIONS.checkTransformation } }
30.      MAPPING {
31.          CONDITIONS { inTransformToRuler }
32.          DO_ACTIONS { ACTIONS.transformToRuler } }
33.      MAPPING {
34.          CONDITIONS { inTranformToMessenger }
35.          DO_ACTIONS { ACTIONS.transformToMessenger } }
36.      MAPPING {
37.          CONDITIONS { inTransformToShield }
38.          DO_ACTIONS { ACTIONS.transformToShield } }
39.      MAPPING {
40.          CONDITIONS { inSelfDestruction }
41.          DO_ACTIONS { ACTIONS.selfDestroy } }
42.     }
43.    }
44.   }//AESELF_MANAGEMENT
       ....
45.   ACTIONS { .... }
46.   EVENTS { .... }
47.   METRICS {
48.       METRIC movingAbility { .... }
49.       METRIC antennaAvailability { .... }
       ....
50.   }
51.  }
```

FIG. 29

```
1.  ACTIONS {
2.     ACTION transformToShield {
3.            ENSURES { METRICS.Moving.Ability.VALUE > 0 }
4.            DOES {
5.               remove AESLO { };
6.               add AESLO { SLO shieldWorkers {....} };
7.               change AESELF_MANAGEMENT.SELF_HEALING { SWITCH {OFF} };
8.               change AESELF_MANAGEMENT.SELF_PROTECTING { SWITCH {OFF} };
9.               change AESELF_MANAGEMENT.SELF_ADAPTING { SWITCH {OFF};
10.              change AESELF_MANAGEMENT.SELF_OPTIMIZING { SWITCH {OFF} };
11.   // produce the necessary shield actions and events that prompt these actions
12.              add EVENTS { EVENT timeToShield {....} };
13.              add ACTIONS { ACTION shieldAction {....} };
14.              call IMPL doShieldTransformation
15.           }
16.        TRIGGERS { EVENTS.transformedToShield }
17.        ONERR_TRIGGERS { EVENTS.mustBeDestroyed }
18.   }
19.      ACTION transformToRuler { ....
20.         DOES {
21.            call IMPL saveAESPEC;
22.            call ASIP.FUNCTIONS.sendRulerSpecRequest;
23.            call ASIP.FUNCTIONS.receiveRulerSpecification;
24.   //remove the old spec structures
25.            remove AESLO { };
26.            remove AESELF_MANAGEMENT { };
            ....
27.   //produce the new spec structures based on the received spec
28.            add AESLO {.... };
29.            and AESELF_MANAGEMENT { SELF_HEALING {....} };
            ....
30.            call IMPL doRulerTransformation
31.         }
32.      ONERR_DOES { call IMPL restoreAESPEC }
33.      TRIGGERS { EVENTS.transformedToRuler }
34.      ONERR_TRIGGERS {
35.         IF METRICS.antennaAvailability.VALUE > 80 THEN
36.            EVENTS.canBeMessenger
37.         END ELSE
38.            EVENTS.canBeShield
39.         END
40.      }
41.   }
      ....
42. }
```

FIG. 30

Key
S*          Self-* event messages              AE          Autonomic element (AM+MC)
♡⌁         Pulse monitor                       MC          Managed component
♡           Heartbeat monitor                   AM          Autonomic manager (stationary agent)
☺           Autonomic agent (mobile agent)     ☺✦❀        Autonomic agent apoptosis controls

AUTONOMIC AND APOPTOPIC SYSTEMS IN COMPUTING, ROBOTICS, AND SECURITY

CROSS-REFERENCE TO RELATED APPLICATIONS

This application is a continuation-in-part of U.S. patent application Ser. No. 12/569,422, filed Sep. 29, 2009, now U.S. Pat. No.8,275,724, and is a continuation-in-part of U.S. patent application Ser. No. 13/230,920, filed Sep. 13, 2011, now U.S. Pat. No.8,275,725, which in-turn is a divisional application of U.S. patent application Ser. No. 11/836,352, filed Aug. 9, 2007, now, U.S. Pat. No. U.S. 8,041,655, which in-turn claims priority to U.S. Patent Application No. 60/822, 687, filed Aug. 17, 2006.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates generally to artificial intelligence and, more particularly, to architecture for collective interactions between autonomous entities.

BACKGROUND OF THE INVENTION

A synthetic neural system is an information processing paradigm that is inspired by the way biological nervous systems, such as the brain, process information. Biological systems inspire system design in many other ways as well, for example reflex reaction and health signs, nature inspired systems (NIS), hive and swarm behavior, and fire flies. These synthetic systems provide an autonomic computing entity that can be arranged to manage complexity, continuous self-adjust, adjustment to unpredictable conditions, and prevention and recovery for failures.

One key element is the general architecture of the synthetic neural system. A synthetic neural system is composed of a large number of highly interconnected processing autonomic elements that may be analogous to neurons in a brain working in parallel to solve specific problems. Unlike general purpose brains, a synthetic neural system is typically configured for a specific application and sometimes for a limited duration.

In one application of autonomic elements, each of a number of spacecrafts could be a worker in an autonomous space mission. The space mission can be configured as an autonomous nanotechnology swarm (ANTS). Each spacecraft in an ANTS has a specialized mission, much like ants in an ant colony have a specialized mission. Yet, a heuristic neural system (HNS) architecture of each worker in an ANTS provides coordination and interaction between each HNS that yields performance of the aggregate of the ANTS that exceeds the performance of a group of generalist workers.

More specifically, subset neural basis functions (SNBFs) within a HNS can have a hierarchical interaction among themselves much as the workers do in the entire ANTS collective. Hence, although many activities of the spacecraft could be controlled by individual SNBFs, a ruler SNBF could coordinate all of the SNBFs to assure that spacecraft objectives are met. Additionally, to have redundancy for the mission, inactive workers and rulers can only participate if a member of their type is lost.

In some situations, the ANTS encounters a challenging situation. For example, in some instances, the operation of a particular autonomic spacecraft can be detrimental either to the autonomic spacecraft or to the mission. It would be desirable to have a self-destruct mechanism that can be employed to avoid such a detrimental outcome, for example, analogous to apoptotic activity in a biological system.

Research reported in Klefstrom et al., "c-Myc Augments the Apoptotic Activity of Cytosolic Death Receptor Signaling Proteins by Engaging the Mitochondrial Apoptotic Pathway," J. Biological Chemistry, 8 Nov. 2002, pp. 43224-43232, indicates that cells receive orders to kill themselves when they divide. The reason appears to be self-protection. An organism relies on cell division for maintenance and growth, but the process is also dangerous: if just one of the billions of cells in a human body locks into division, the result is a tumor. The suicide and reprieve controls can be likened to the dual keys of a nuclear missile: the suicide signal (first key) turns on cell growth but at the same time activates a sequence that leads to self-destruction, while the reprieve signal (second key) overrides the self-destruct sequence. These concepts form the basis for the autonomic systems according to the present teachings.

BRIEF DESCRIPTION OF THE INVENTION

The above-mentioned shortcomings, disadvantages and problems may be addressed herein, which will be understood by reading and studying the following specification.

Autonomic Computing and Autonomic Communications are inspired by the biological Autonomic Nervous System. Apoptotic Computing and Apoptotic Communications are inspired by the apoptosis mechanism in biological systems. This mechanism provides self-management and security for the overall system. These approaches are included in modern ubiquitous/pervasive computer-based systems and next generation SWARM based Space Missions. The present teachings adapt the autonomic and apoptotic systems described, for example, in U.S. Patent Application Publication No. 2010/0146635 A1 and in U.S. Pat. No. 8,041,655 B2 for Cloud Computing, Grid Computing and other Highly Distributed Systems. Both of these publications are incorporated herein in their entireties by reference. These paradigms of computing are increasingly become ubiquitous and their management and safety is not only key for the industry in general but also for NASA's operations and missions.

According to various embodiments of the present teachings, an autonomic computing device, system, and method are provided. The device, system, and method can have many of the same or similar components, steps, and other features as described, for example, in U.S. Pat. No. 7,904,396 B2 to Hinchey et al., which is incorporated herein in its entirety by reference. Computer-based systems are provided with an environment that is self-managing. Patent and patent pending technologies that can be used to this end include those describing a range of autonomic computing (self-managing/self*) techniques. These technologies include an apoptotic (self-destruct) mechanism for SWARM agents and space craft as described, for example, in U.S. Pat. Nos. 7,627,538 B2 and 7,925,600 B2, and autonomous and autonomic environments as described, for example, in U.S. Pat. No. 7,765, 171 B2. Each of these three patents is incorporated herein in its entirety by reference. Other technologies that can also be employed to provide a self-managing computer system in accordance with the present teachings include autonomic quiescence (self-sleep), as described in U.S. Pat. No. 7,899,760 B2, as a less drastic alternative to self-destruct, and ALice (Autonomic Licence) technology as described in U.S. Pat. No. 7,627,538 B2, to ensure authenticity. Each of these two patents is also incorporated herein in its entirety by reference.

With the future direction of computer-based systems becoming highly distributed such as by cloud computing or grid computing, these previous innovations and patents covering Apoptotic, Lub-Dub Pulse Monitoring, ALice, Quiesence, and other mechanisms specifically for SWARM Space Craft and Agents, are highly relevant for cloud computing, grid computing, and other highly distributed computing systems and are used according to the present teachings to create a pervasive self-managing system. In an exemplary embodiment, a highly distributed computing system can be provided with an apoptotic (self-destructing) service or feature such that if the system is hacked it can activate the apoptotic service and self-destruct to prevent illegal access from the hacking.

Other technologies that can be employed according to various embodiments of the present teachings include those described, for example, in U.S. Pat. No. 8,019,640, which is incorporated herein in its entirety by reference. Autonomic systems developed by NASA, and others, can greatly benefit from this exploitation of these self-managing/self-* properties in facilitating greater security and safety when handing over autonomy to such systems. These highly distributed systems, including cloud computing systems, grid computing systems, and others, can be made autonomic/self-managing according to the present teachings, opening up a wide range of applications and interests.

According to various embodiments of the present teachings, an apoptotic computing system is provided that includes a programmed death by default for one or more computers of a computer-based system. Motivated by the apoptosis mechanisms in multicellular organisms, apoptotic computing can be considered a subarea of bio-inspired computing, natural computing, or autonomic systems. Two example applications according to the present teachings are autonomic agent-based environments and swarm space exploration systems.

According to various embodiments of the present teachings, an autonomic robotics device, system, and method are provided. The device, system, and method can have many of the same or similar components, steps, and other features as described, for example, in U.S. Pat. No. 7,904,396 B2 to Hinchey et al., which is incorporated herein in its entirety by reference. Apoptotic systems have been adapted for robotic systems. With robotics on the edge of becoming pervasive in daily life and having increasing roles in space missions, the present teachings utilize an apoptosis mechanism. Exemplary of the apoptosis mechanisms that can be used in such a manner are those described in U.S. Pat. Nos. 7,627,538 B2, 7,925,600 B2, and 7,765,171 B2. Such apoptosis mechanisms can be useful as inherent pre-programmed death by default safety and security mechanisms to counter undesirable adaptive behavior in adaptive robotic systems. Other technology that can be implemented to carry out such features includes the systems and methods described in Sterritt, "Apoptotic Robotics: Programmed Death by Default, "Engineering of Autonomic and Autonomous Systems," IEEE International Workshop, pages 107-113 (Jan. 1, 2011), which is incorporated herein in its entirety by reference.

According to yet other embodiments of the present teachings, the patented apoptotic systems described above are also adapted for security systems, for example, for self-protection for security systems. An autonomic security device, system, and method are provided. The device and system can have many of the same or similar components, steps, and other features as described, for example, in U.S. Pat. No. 7,904,396 B2 to Hinchey et al., which is incorporated herein in its entirety by reference. The present teachings include a utilization of the apoptosis mechanism invented in U.S. Pat. Nos. 7,627,538 B2, 7,925,600 B2, and 7,765,171 B2 as an inherent pre-programmed death by default safety and security mechanism to counter undesirable behavior and events that might affect security and safety systems. In some embodiments, the safety and/or security systems can be provided with a self-managing system, including the extreme self-destruct mechanism for self-managing components that have adapted undesirable behavior, for example, behavior that is detrimental to the systems goals. The patented innovations covering apoptotic, Lub-Dub Pulse Monitoring, ALice, and quiesence mechanisms described above are highly relevant for security, secure, and legal bound systems and provide a pervasive self-protecting feature for such systems. As an example, such systems are provided with apoptotic (self-destructing) mechanisms to ensure human and legal rights. Autonomic systems developed by NASA, and others, can greatly benefit from this exploitation of these self-* properties in facilitating greater security and safety when handing over autonomy to systems. These mechanisms, adapted correctly, actually enforce and ensure security.

According to various embodiments of the present teachings, an autonomic system is provided for a computing systems, robotics systems, security systems, and/or safety systems and has the following objectives: self-configuration; self-healing; self-optimization; and self-protection. By self-configuration, what is meant is that the system can be able to readjust itself automatically, either to support a change in circumstances or to assist in meeting other system objectives. By self-healing, what is meant is that, in a reactive mode, the system can effectively recover when a fault occurs, identify the fault, and, when possible, repair it. In a proactive mode, self-healing can entail a system configured to monitor vital signs to predict and avoid health problems, or to prevent vital signs from reaching undesirable levels. By self-optimization, what is meant is the system can measure its current performance against a known optimum, and can carry out defined policies for attempting improvements. Self-optimization can also encompass a system configured to react to a user's policy changes within the system. By self-protection, what is meant is that the system can defend itself from accidental or malicious external attacks, which requires an awareness of potential threats and the means to manage them.

According to various embodiments of the present teachings, these self-managing objectives can be achieved be configuring the system to be: self-aware, that is, aware of its internal state; self-situated, that is, aware of current external operating conditions and context; self-monitoring, that is, able to detect changing circumstances; and self-adjusting, that is, able to adapt accordingly. Thus, the autonomic systems of the present teachings can be aware of its available resources and components, their ideal performance characteristics, and current status. The system can also be aware of interconnection with other systems, as well as rules and policies for adjusting as required. The system can also operate in a heterogeneous environment, for example, by relying on open standards to communicate with other systems.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 3 is a block diagram of a heuristic neural system, according to an embodiment;

FIG. 28 depicts the multi-tier specification model of Autonomic System Specification Language (ASSL) according to various embodiments of the present teachings.

FIG. 29 depicts a partial specification of a self-sacrifice policy according to various embodiments of the present teachings.

FIG. 30 depicts a partial specification of exemplary actions included in a self-sacrifice policy according to various embodiments of the present teachings.

DETAILED DESCRIPTION OF THE INVENTION

Figure 1:
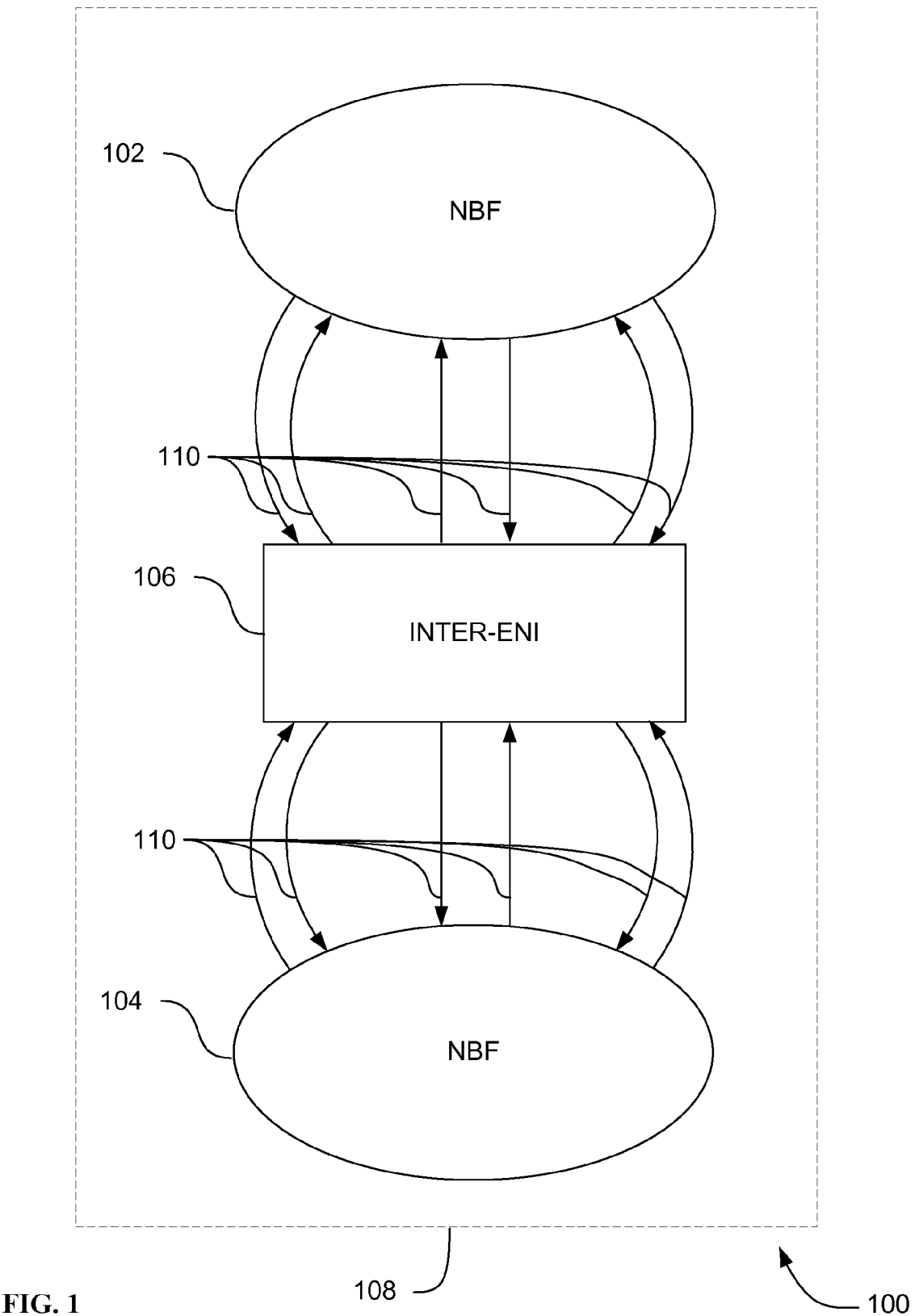
FIG. 1 is a block diagram that provides an overview of an evolvable synthetic neural system to manage collective interactions between autonomous entities, according to an embodiment of the invention.

In the following detailed description, reference is made to the accompanying drawings that form a part hereof, and in which is shown by way of illustration specific embodiments that can be practiced. These embodiments are described in sufficient detail to enable those skilled in the art to practice the embodiments, and it is to be understood that other embodiments can be utilized and that logical, mechanical, electrical and other changes can be performed without departing from the scope of the embodiments. The following detailed description is, therefore, not to be taken in a limiting sense.

According to various embodiments of the present teachings, a computer-accessible medium is provided in a first autonomic device. The device can comprise: a computing device, a robotics device, a security device, or a combination thereof. The computer-accessible medium can have executable instructions of autonomic communication and the executable instructions can be capable of directing a processor of the first autonomic device to perform a plurality of functions, for example, receiving a quiesce instruction from a second autonomic device and invoking a function of a quiesce component of the first autonomic device. The function of the quiesce component can comprise deactivating the first autonomic device, and then, if the first autonomic device does not receive a stay-alive reprieve signal after a predetermined period of time, the first autonomic device can be made to self-destruct. In some cases the first autonomic device can comprise a computing device, for example, comprising a plurality of processors. In some cases the first autonomic device can comprise a robotics device, for example, comprising a plurality or swarm of robots. In some cases the first autonomic device can comprise a security device, for example, a security system having a plurality of security detectors.

The executable instructions can be capable of directing the processor of the first autonomic device to transmit environment health/urgency data and transmit self health/urgency data, for example, simultaneously or consecutively, or subsequently. The executable instructions can be capable of directing the processor of the first autonomic device to transmit environment health/urgency data and self health/urgency data together. In some cases, the executable instructions can further instructions for encapsulating the environment health/urgency data and the self health/urgency data in a packet. The computer-accessible medium can further comprise executable instructions capable of directing the processor to perform transmitting event messages. The executable instructions can be capable of directing the processor to perform the function of receiving self health/urgency data from a self control loop component of the first autonomic device. The executable instructions can be capable of directing the processor to perform the function of receiving environment health/urgency data from an environment control loop component of the first autonomic device.

According to various embodiments of the present teachings, an autonomic device is provided that comprises a self-monitor that is operable to receive information from sensors and operable to monitor and analyze the sensor information and access a knowledge repository, and a self-adjuster operably coupled to the self-monitor in a self control loop. The self adjuster can be operable to access the knowledge repository, to transmit data to effectors, and to plan and execute. The autonomic device can also comprise an environment-monitor that is operable to receive information from the sensors and operable to monitor and analyze the sensor information and access the knowledge repository. In addition, the autonomic device can comprise an autonomic manager communications component operably coupled to the environment-monitor in an environment control loop, for example, wherein the autonomic manager communications component is operable to access the knowledge repository and to produce and transmit a pulse monitor signal. The pulse monitor signal can include, a heart beat monitor signal and a reflex signal. The reflex signal can include self health/urgency data and environment health/urgency data. The autonomic device can also comprise a quiescing component operably coupled to the self-monitor and configured to receive a quiescence instruction from another autonomic device. The quiescing component can withdraw a stay-awake signal, and if the first autonomic device does not receive a stay-alive reprieve signal after a predetermined period of time, the system can be configured such that the first autonomic device self-destructs.

The autonomic device can be in the form of a computing system, a cloud computing system, a grid computing system, a highly distributed computing system, a robotics system, a security system, a combination thereof, or the like. In some embodiments, the self health/urgency data comprises uncompressed self health/urgency data, and the environment health/urgency data comprises uncompressed environment health/urgency data. The autonomic manager communications component can further be operable to transmit the environment health/urgency data and the self health/urgency data together. The autonomic manager communications component can be operable to encapsulate the environment health/urgency data and the self health/urgency data in a packet. The pulse monitor signal further comprises at least one of an urgency signal, an environmental condition, and an event condition.

According to various embodiments of the present teachings, a method for managing a first device based on a functioning state and an operating status of the device. The method can comprise receiving a quiesce instruction from a second device and invoking a function of a quiesce component of the first device. The function of the quiesce component can comprise deactivating the first device, and then, if the first device does not receive a stay-alive reprieve signal after a predetermined period of time, the system can be configured such that the first device self-destructs. The method can further entail generating one or more stay-awake signals based on the functioning state and operating status of the first device. Generating one or more stay-awake signals can be based on processing received signals from the first device, which are indicative of the functioning state and the operating status, and as a result an analysis of the condition of the first device can be obtained. The functioning state of the first device can comprise one or more on signals, off signals, active signals, and inactive signals. The operating status of the first device can comprise one or more urgency signals, reflex signals, environmental conditions, and event conditions. The operating status of the first device can comprise an event condition, and the event condition can comprise an incorrect operation, an emergent behavior, a failure to perform self healing, or a likelihood of jeopardizing primary objectives. The method can be implemented in a computing system, a cloud computing system, a grid computing system, a highly distributed computing system, a robotics system, a security system, a combination thereof, or the like.

According to various embodiments of the present teachings, an autonomic system is provided that comprises a plurality of autonomic devices performing one or more programmed tasks, a coordinating autonomic device for assigning programmed tasks and for issuing instructions to the plurality of autonomic devices, a messenger autonomic computing device for facilitating communication among the coordinating autonomic device, the plurality of autonomic devices, and a remote system. One or more programmed tasks performed by the plurality of autonomic devices can comprise generating signals indicative of functional state and operating status. The coordinating autonomic device can be configured to emit a stay-awake signal to one or more of the plurality of autonomic devices, based on the generated signals, and if the at least one autonomic device does not receive the stay-awake signal after a predetermined period of time, the system can be configured such that the at least one autonomic device self-destructs. In some cases, the coordinating autonomic device emits a quiesce signal, based on the generated signals, to one or more of the plurality of autonomic devices. The functioning state of the system can comprise one or more signals, such as on signals, off signals, active signals, inactive signals, or a combination thereof. The operating status of the system can comprise one or more urgency signals, reflex signals, environmental conditions, and event conditions. An event condition can comprise an incorrect operation, an emergent behavior, a failure to perform self healing, a likelihood of jeopardizing primary objectives, or a combination thereof. The system can comprise a computing system, a cloud computing system, a grid computing system, a highly distributed computing system, a robotics system, a security system, a combination thereof, or the like. In some cases, the autonomic robotics device can comprise one or more detector. The detector can be any suitable detector, for example, to detect one or more chemical properties or signals, one or more physical properties or signals, or one or more mechanical properties or signals. The detector can be selected from a motion detector, a glass-shatter detector, a trip wire detector, a laser trip wire detector, a door alarm, an infrared heat detector, a weight detector, a light detector, a temperature detector, a vibration detector, an electromagnetic radiation detector, a combination thereof, and the like. In cases wherein the autonomic system comprises a security system, the plurality of autonomic devices can comprise one or more detectors or sensors. Together there can be a plurality of detectors. The detectors can comprise a plurality of motion detectors, a plurality of glass-shatter detectors, a plurality of trip wire detectors, a plurality of laser trip wire detectors, a plurality of door alarms, a plurality of infrared heat detectors, a plurality of weight detectors, a combination thereof, or the like. In cases where the autonomic system comprises a robotics system, the plurality of autonomic devices can comprise a plurality of robots, for example, on a production line, on an assembly line, or the like.

The autonomous system can comprise a first autonomic device composed of self-similar autonomic components; a second autonomic device composed of self-similar autonomic components; and a third autonomic device composed of self-similar autonomic components; wherein the third autonomic device facilitates communication between the first autonomic device and the second autonomic device. The first autonomic device generates a heart beat monitor signal and pulse monitor signal. The second autonomic device generates a stay-awake signal based on the generated heart beat monitor signal and pulse monitor signal from the first autonomic device, and then, if the first autonomic device does not receive a stay-awake signal after a predetermined period of time, the system can be configured such that the first autonomic device self-destructs. The system can also be configured such that the second autonomic device generates a quiesce signal based on the generated heart beat monitor signal and pulse monitor signal from the first autonomic device. The autonomic device can comprise a first plurality of neural basis functions and a first evolvable neural interface operably coupled to each of the first plurality of neural basis functions. In some cases the autonomic system comprises a security system and each autonomic device can comprise one or more detector. The detector can be any suitable detector, for example, to detect one or more chemical properties or signals, one or more physical properties or signals, or one or more mechanical properties or signals. The detector can comprise one or more detectors selected from a motion detector, a glass-shatter detector, a trip wire detector, a laser trip wire detector, a door alarm, an infrared heat detector, a weight detector, a light detector, a temperature detector, a vibration detector, an electromagnetic radiation detector, a combination thereof, and the like.

According to various embodiments of the present teachings, a computer-accessible medium is provided having executable instructions to construct an environment of an autonomic device to satisfy increasingly demanding external requirements, the executable instructions can be capable of directing a processor to perform the functions of: instantiating a first embryonic evolvable neural interface; and evolving the first embryonic evolvable neural interface towards complex complete connectivity, wherein the evolvable neural interface receives one or more heart beat monitor signal, pulse monitor signal, and quiesce signal. The evolvable neural interface can be configured to generate one or snore heart beat monitor signal, pulse monitor signal, quiesce signal, combination thereof, or the like. The quiesce signal can comprise a stay-awake signal, wherein the first embryonic evolvable neural interface receives the quiesce signal from a second embryonic evolvable neural interface to withdraw a stay-awake signal, and then, if the first embryonic evolvable neural interface does not receive a stay-alive reprieve signal after a predetermined period of time, the system can be configured such that the first embryonic evolvable neural interface self-destructs. The embryonic evolvable neural interface can comprise a neural thread possessing only minimal connectivity. The instructions can be useful in operating computing systems, cloud computing systems, grid computing systems, highly distributed computing systems, robotics systems, security systems, combinations thereof, and the like. For security systems, the plurality of autonomic devices can comprise a plurality of motion detectors, a plurality of glass-shatter detectors, a plurality of trip wire detectors, a plurality of laser trip wire detectors, a plurality of door alarms, a plurality of infrared heat detectors, a plurality of weight detectors, a combination thereof, or the like. For robotics systems, the plurality of autonomic devices can comprise a plurality of robots, for example, on a production line, on an assembly line, for defense purposes, operating weapons, or the like.

According to various embodiments of the present teachings, a computer-accessible medium is provided having executable instructions to protect an autonomic system, the executable instructions capable of directing a processor of the autonomic system to perform: sending a quiesce signal to a first autonomic computing device from a second autonomic computing device; monitoring the response of the first autonomic computing device to the quiesce signal; determining the potential of the first autonomic computing device to cause harm to the autonomic system, and controlling the autonomic computing system based on the potential of the first autonomic computing device to cause harm to the autonomic computing system, wherein controlling the autonomic computing system further comprises blocking the first autonomic computing device from accessing certain resources, and generating a signal to the second autonomic computing device to transmit to the first autonomic computing device a stay-awake signal, and wherein the quiesce signal is a request for the first autonomic computing device to deactivate, and, if the first autonomic computing device does not receive a stay-alive reprieve signal, the first autonomic computing device self-destructs. Controlling the autonomic system can comprise generating a signal to the first autonomic device to withdraw the stay-awake signal. A computer system can also be provided for protecting an autonomic system, and can comprise a processor; a storage device coupled to the processor; and the computer-accessible medium.

The instructions can be useful in operating computing systems, cloud computing systems, grid computing systems, highly distributed computing systems, robotics systems, security systems, combinations thereof, and the like. For security systems, the plurality of autonomic devices can comprise one or more detector selected from a motion detector, a glass-shatter detector, a trip wire detector, a laser trip wire detector, a door alarm, an infrared heat detector, a weight detector, a light detector, a temperature detector, a vibration detector, an electromagnetic radiation detector, a combination thereof, a plurality of motion detectors, a plurality of glass-shatter detectors, a plurality of trip wire detectors, a plurality of laser trip wire detectors, a plurality of door alarms, a plurality of infrared heat detectors, a plurality of weight detectors, a combination thereof, or the like. For robotics systems, the plurality of autonomic devices can comprise a plurality of robots, for example, on a production line, on an assembly line, for defense purposes, operating weapons, or the like.

According to the present teachings, a self-managing computer system has been developed based on autonomic computing. The autonomic computing system is analogous to the biological nervous system, which automatically maintains homeostasis (metabolic equilibrium) and controls responsiveness to external stimuli.

In various embodiments of the present teachings, a method for managing a system includes receiving a potentially harmful signal and transmitting an otoacoustic signal to counteract the potentially harmful signal. In other embodiments, an autonomic element includes a self-monitor that is operable to receive information from sensors and is operable to monitor and analyze the sensor information and access a knowledge repository, a self-adjuster operably coupled to the self-monitor in a self-control loop, the self-adjuster operable to access the knowledge repository, the self-adjuster operable to transmit data to effectors, and the self-adjuster operable to plan and execute, an environment monitor that is operable to receive information from sensors and operable to monitor and analyze the sensor information and access the knowledge repository, and an autonomic manager communications component operably coupled to the environment monitor in an environment control loop, the autonomic manager communications component operable to access the knowledge repository, the autonomic manager communications component also operable to produce and transmit a counteracting signal to an incoming harmful signal.

In yet other embodiments, an autonomic system includes a plurality of autonomic agents performing one or more programmed tasks. The autonomic system also includes a coordinating autonomic agent for assigning programmed task and for issuing instructions to the plurality of autonomic agents. The autonomic system also includes a messenger autonomic agent for facilitating communication between the coordinating autonomic agent, plurality of autonomic agents, a remote system. One or more programmed task performed by the plurality of autonomic objects is at least generating signals indicative of a potentially harmful signal. The coordinating autonomic agent transmits an otoacoustic signal to one or more of the plurality of autonomic agents, based on the generated signals.

In still yet other embodiments, an autonomous nanotechnology swarm includes a first worker composed of self-similar autonomic components. The autonomous nanotechnology swarm also includes a second worker composed of self-similar autonomic components. The autonomous nanotechnology swarm also includes a third worker composed of self-similar autonomic components. In the autonomous nanotechnology swarm, the third worker facilitates communication between the first worker and the second worker. In the autonomous nanotechnology swarm, the first worker generates a heart beat monitor signal and pulse monitor signal. In the autonomous nanotechnology swarm, the second worker includes an otoacoustic component that is operable to counteract a harmful signal.

In further embodiments, a method includes instantiating an embryonic evolvable neural interface. The method also includes evolving the embryonic evolvable neural interface towards complex complete connectivity. The evolvable neural interface receives one or more heart beat monitor signal, pulse monitor signal, and otoacoustic signal. The evolvable neural interface generates one or more heart beat monitor signal, pulse monitor signal, and otoacoustic signals.

In yet a further embodiment, a method for protecting an autonomic system encountering one or more autonomic agents includes determining the potential harm of the autonomic agent. The method also includes sending an otoacoustic signal to the autonomic agent and monitoring the response of the autonomic agent to the otoacoustic signal.

In still yet a further embodiment, a system includes a processor and a storage device coupled to the processor. The system also includes software means operative on the processor for sending an otoacoustic signal to the autonomic agent, monitoring the response of the autonomic agent to the otoacoustic signal, and determining the autonomic agent potential for causing harm to the autonomic system.

System Level Overview

FIG. 1 is a block diagram that provides an overview of an evolvable synthetic neural system to manage collective interactions between autonomous entities, according to an embodiment. System 100 can include a first plurality of neural basis functions (NBFs) 102 and 104. NBFs are the fundamental building block of system 100. In some embodiments of system 100, the plurality of NBFs includes more than the two NBFs 102 and 104 shown in FIG. 1. In some embodiments, system 100 includes only one NBF. One embodiment of a NBF is described below with reference to FIG. 2.

System 100 can also include a first inter-evolvable neural interface (ENI) 106 that is operably coupled to each of the first plurality of neural basis functions. The NBFs 102 and 104 can be highly integrated, and coupling between the NBFs through the ENI 106 provides a three dimensional complexity. Thus, for example, when system 100 is implemented on microprocessors such as microprocessor 804 described below with reference to FIG. 8, system 100 can provide a synthetic neural system that reconciles the two dimensional nature of microprocessor technologies to the three dimensional nature of biological neural systems.

This embodiment of the inter-ENI 106 can be known as an inter-NBF ENI because the inter-ENI 106 is illustrated as being between or among the NBFs 102 and 104 at the same level within a hierarchy. System 100 shows only one level 108 of a hierarchy, although one skilled in the art will recognize that multiple hierarchies can be used within the scope of this invention.

System 100 can also operate autonomously. A system operates autonomously when the system exhibits the properties of being self managing and self governing, often termed as autonomic, pervasive, sustainable, ubiquitous, biologically inspired, organic or with similar such terms. ENI 106 can adapt system 100 by instantiating new NBFs and ENIs and establishing operable communication paths 110 to the new NBFs and the ENIs to system 100. ENI 106 can also adapt system 100 by removing or disabling the operable communication paths 110 to the new NBFs and ENIs. The adapting, establishing, removing and disabling of the communication paths 110 can be performed autonomously. Thus, system 100 can satisfy the need for a synthetic neural system that performs significant tasks with complete autonomy.

System 100 can be capable of establishing and removing links to other similarly configured systems (not shown). Thus, the system 100 can be described as self-similar.

The system level overview of the operation of an embodiment is described in this section of the detailed description. Some embodiments can operate in a multi-processing, multi-threaded operating environment on a computer, such as computer 802 in FIG. 8.

While the system 100 is not limited to any particular NBF or ENI, for sake of clarity simplified NBFs and a simplified ENI are described.

Apparatus Embodiments

In the previous section, a system level overview of the operation of an embodiment is described. In this section, particular apparatus of such an embodiment are described by reference to a series of block diagrams. Describing the apparatus by reference to block diagrams enables one skilled in the art to develop programs, firmware, or hardware, including such instructions to implement the apparatus on suitable computers, and executing the instructions from computer-readable media.

Figure 8:
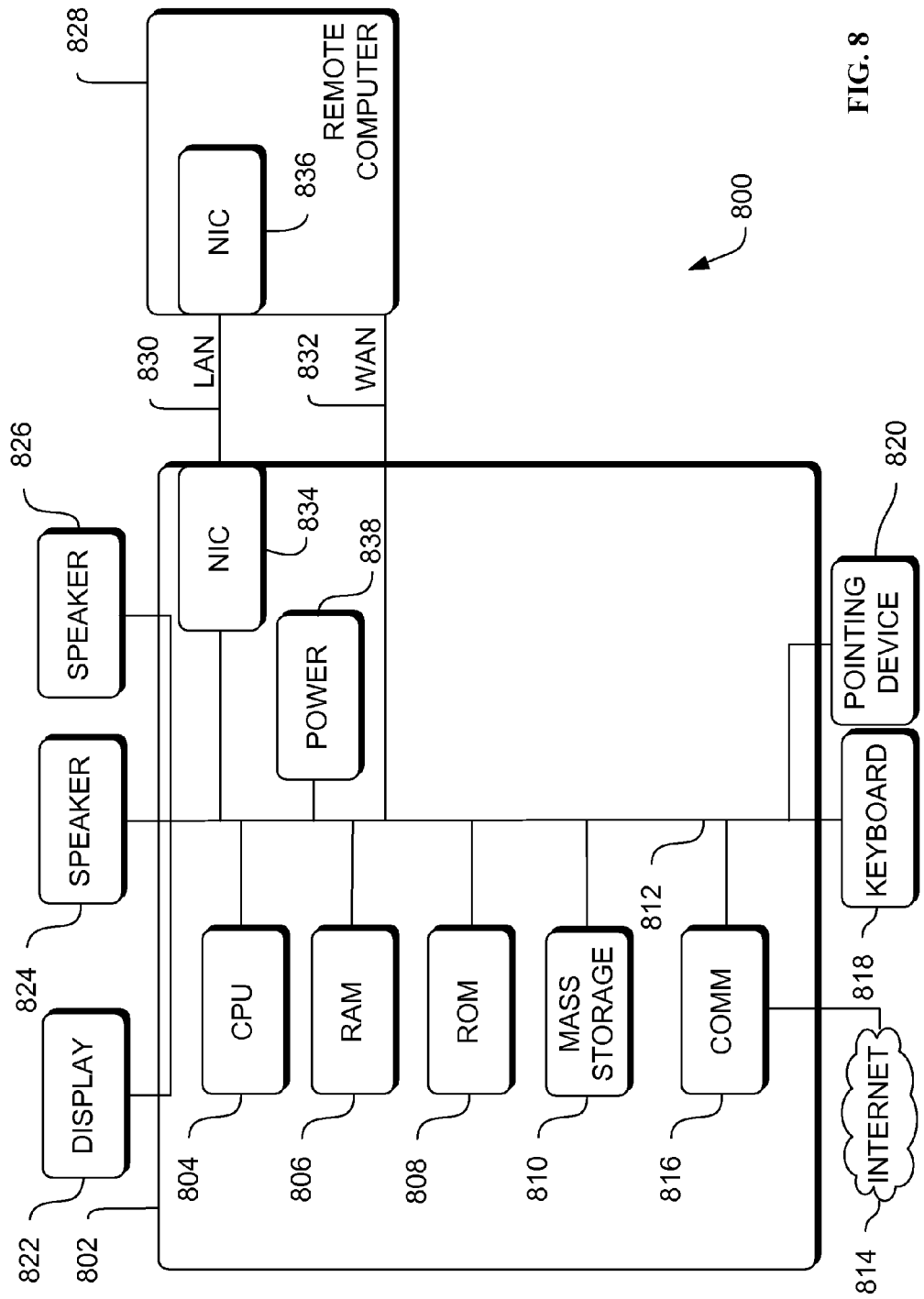
FIG. 8 is a block diagram of a conventional hardware and operating environment in which different embodiments can be practiced.

In some embodiments, apparatus 200-600 are implemented by a program executing on, or performed by, firmware or hardware that is a part of a computer, such as computer 802 shown in FIG. 8.

Figure 2:
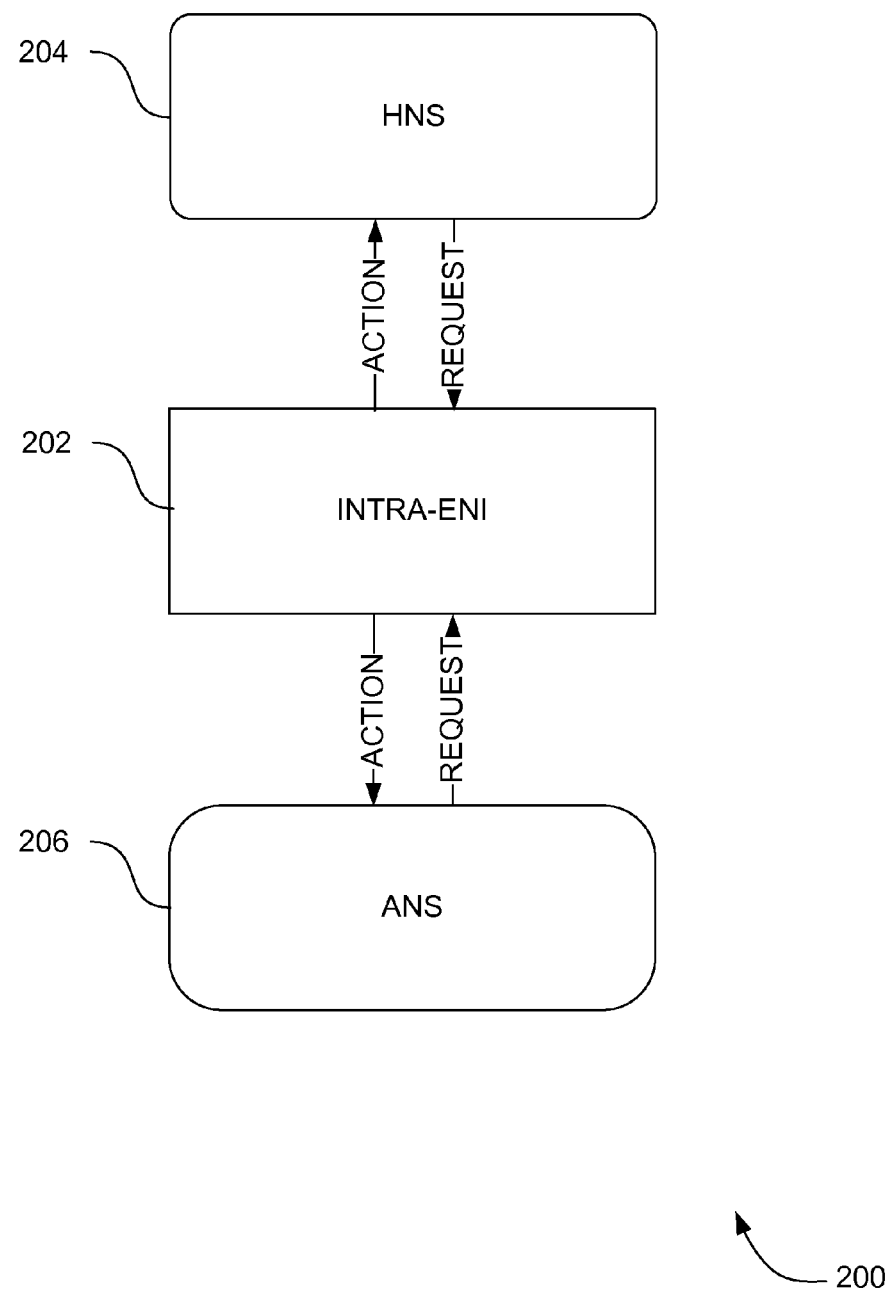
FIG. 2 is a block diagram of a neural basis function of a worker, according to an embodiment.

FIG. 2 is a block diagram of a neural basis function (NBF) 200 of a worker according to an embodiment. NBF 200 is illustrated as a bi-level neural system because both high-level functions and low-level functions are performed by NBF 200.

NBF 200 can include an intra-evolvable neural interface (intra-ENI) 202. The ENI 202 can be operably coupled to a heuristic neural system (FINS) 204 and operably coupled to an autonomous neural system (ANS) 206. The FINS 204 can perform high-level functions and the ANS 206 performs low-level functions that are often described as "motor functions" such as "motor" 1510 in FIG. 15 below. In NBF 200, the HNS 204 and the ANS 206 in aggregate can provide a function of a biological neural system. The intra-ENI 202 shown in FIG. 2 is an ENI that is wholly contained within an NBF, and is therefore prefixed with "intra."

The intra-ENI 202 can send action messages to and receive request messages from the HNS 204 and the ANS 206 during learning and task execution cycles, as well as during interfacing operations between the intra-ENI and the HNS 204 and the ANS 206 when the HNS 204 and the ANS 206 need to be modified as a result of other system failures or modification of objectives. NBF 200 is illustrated as a worker NBF because this NBF performs functions, but does not provide instructions commands to other NBFs.

FIG. 3 is a block diagram of a heuristic neural system 300 according to an embodiment.

The heuristic neural system (HNS) 300 can be composed of a neural net 302 for pattern recognition and a fuzzy logic package 304 to perform decisions based on recognitions. Taken together the neural net 302 and the fuzzy logic package 304 can form a basis for a higher level heuristic intelligence.

Figure 4:
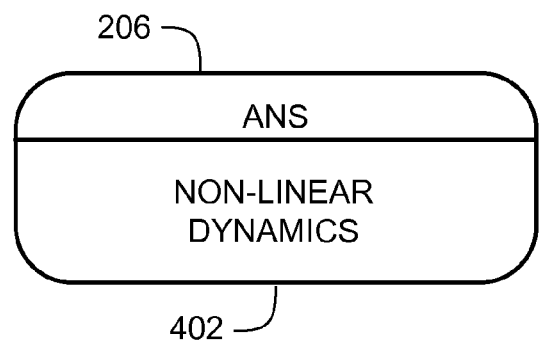
FIG. 4 is a block diagram of an autonomous neural system, according to an embodiment.

FIG. 4 is a block diagram of an autonomous neural system 400 according to an embodiment.

The autonomous neural system (ANS) 400 can include a non-linear dynamics simulation 402 that represents smart servo system behavior.

Figure 5:
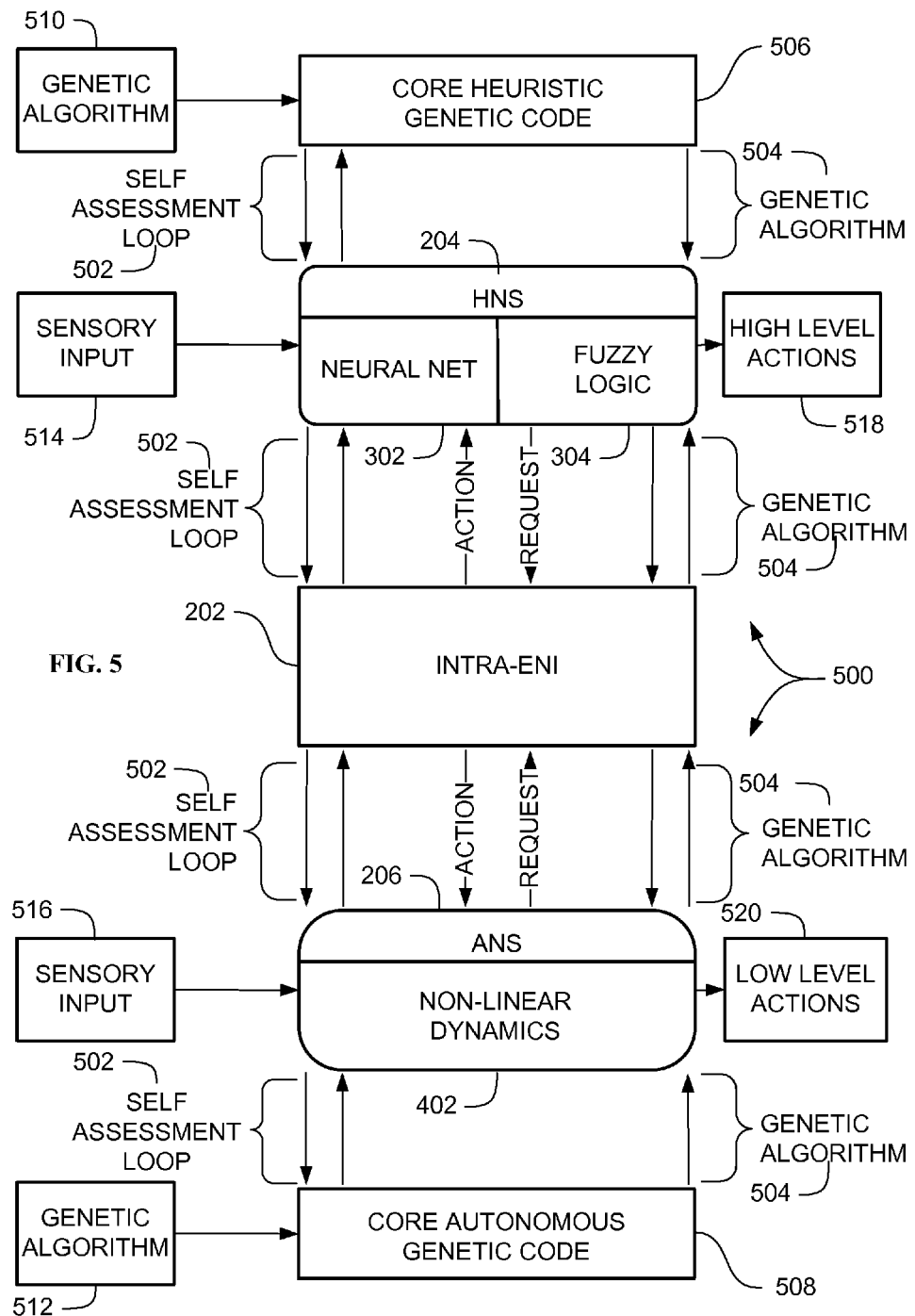
FIG. 5 is block diagram of a neural basis function of a worker, according to an embodiment.

FIG. 5 is a block diagram of a neural basis function (NBF) 500 of a worker according to an embodiment. NBF 500 is shown as a bi-level neural system.

In some embodiments, NBF 500 can include a self assessment loop (SAL) 502 at each interface between autonomic components. Each SAL 502 can continuously gauge efficiency of operations of the combined HNS 204 and ANS 206. The standards and criteria of the efficiency can be set or defined by objectives of the NBF 500.

In some embodiments, NBF 500 can also include genetic algorithms (GA) 504 at each interface between autonomic components. The GAs 504 can modify the intra-ENI 202 to satisfy requirements of the SALs 502 during learning, task execution or impairment of other subsystems.

Similarly, the FINS 204 can have a SAL 502 interface and a GA 504 interface to a core heuristic genetic code (CHGC) 506, and the ANS 206 can have a SAL 502 interface and a GA 504 interface to a core autonomic genetic code (CAGC) 508. The CHGC 506 and CAGC 508 can allow modifications to a worker functionality in response to new objectives or injury. The CHGC 506 and the CAGC 508 autonomic elements cannot be part of an operational neural system, but rather can store architectural constraints on the operating neural system for both parts of the bi-level system. The CHGC 506 and the CAGC 508 can both be modifiable depending on variations in sensory inputs via GAs 504.

In some embodiments, the CHGC 506 and the CAGC 508 in conjunction with SALs 502 and GAs 504 can be generalized within this self similar neural system to reconfigure the relationship between NBFs as well as to permit the instantiation of new NBFs to increase the overall fitness of the neural system. Thus, NBF 500 can provide a form of evolution possible only over generations of BNF workers.

In some embodiments, NBF 500 can also include genetic algorithms 510 and 512 that provide process information to the CHGC 506 and the CAGC 508, respectively. HNS 204 and ANS 206 can receive sensory input 514 and 516, respectively, process the sensory input and generate high level actions 518 and low level actions 520, respectively.

Figure 6:
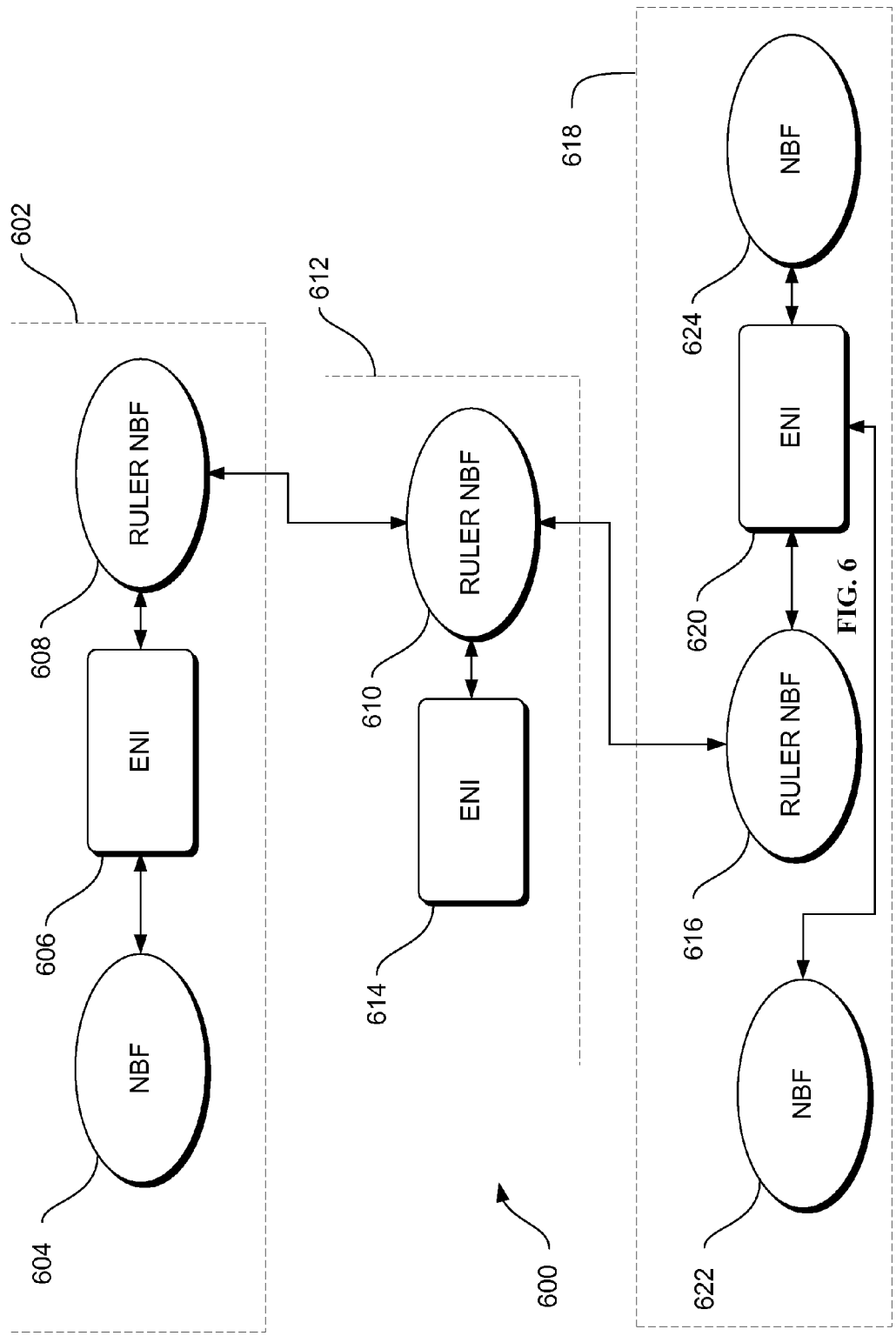
FIG. 6 is a block diagram of a multiple level hierarchical evolvable synthetic neural system, according to an embodiment.

FIG. 6 is a block diagram of a multiple level hierarchical evolvable synthetic neural system (ESNS) 600 according to an embodiment.

The multiple level hierarchical ESNS 600 can include a first level of hierarchy 602 that includes a NBF 604 and inter-ENI 606 and a ruler NBF 608. A ruler NBF, such as ruler NBF 608 can perform functions and also provide instructions commands to other subordinate NBFs.

The ruler NBF 608 of the first hierarchical level 602 is illustrated as being operably coupled to a ruler NBF 610 in a second hierarchical level 612. Ruler NBF 610 can perform functions, receive instructions and commands from other ruler NBFs that are higher in the hierarchy of the ESNS 600 and also provide instructions commands to other subordinate NBFs.

The second hierarchical level 612 can also include an inter-ENI 614. The second hierarchical level 612 of FIG. 6 shows the embodiment of an ESNS 600 having one NBF operably coupled to an ENI. The ruler NBF 610 of the second hierarchical level 612 can be operably coupled to a ruler NBF 616 in a third hierarchical level 618.

The third hierarchical level 616 can also include an inter-ENI 620. The third hierarchical level 616 of FIG. 6 shows the embodiment of an ESNS 600 having more than two NBFs (e.g. 616, 622 and 624) operably coupled to an ENI.

In some embodiments, the NBFs 604, 608, 610, 616, 622 and 624 can include the aspects of NBFs 102 and 104 in FIG. 1 above, and/or NBF 200 in FIG. 2 above. One skilled in the art will appreciate that many combinations exist that fall within the purview of this invention.

Hardware and Operating Environments

FIGS. 7, 8, 9 and 10 are diagrams of hardware and operating environments in which different embodiments can be practiced. The description of FIGS. 7, 8, 9 and 10 provide an overview of computer hardware and suitable autonomic computing environments in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server autonomic computing environments where remote devices that perform tasks are linked through a communications network. Program modules can be located in both local and remote memory storage devices in a distributed autonomic computing environment. Those skilled in the art will know that these are only a few of the possible computing environments in which the invention can be practiced and therefore these examples are given by way of illustration rather than limitation.

Figure 7:
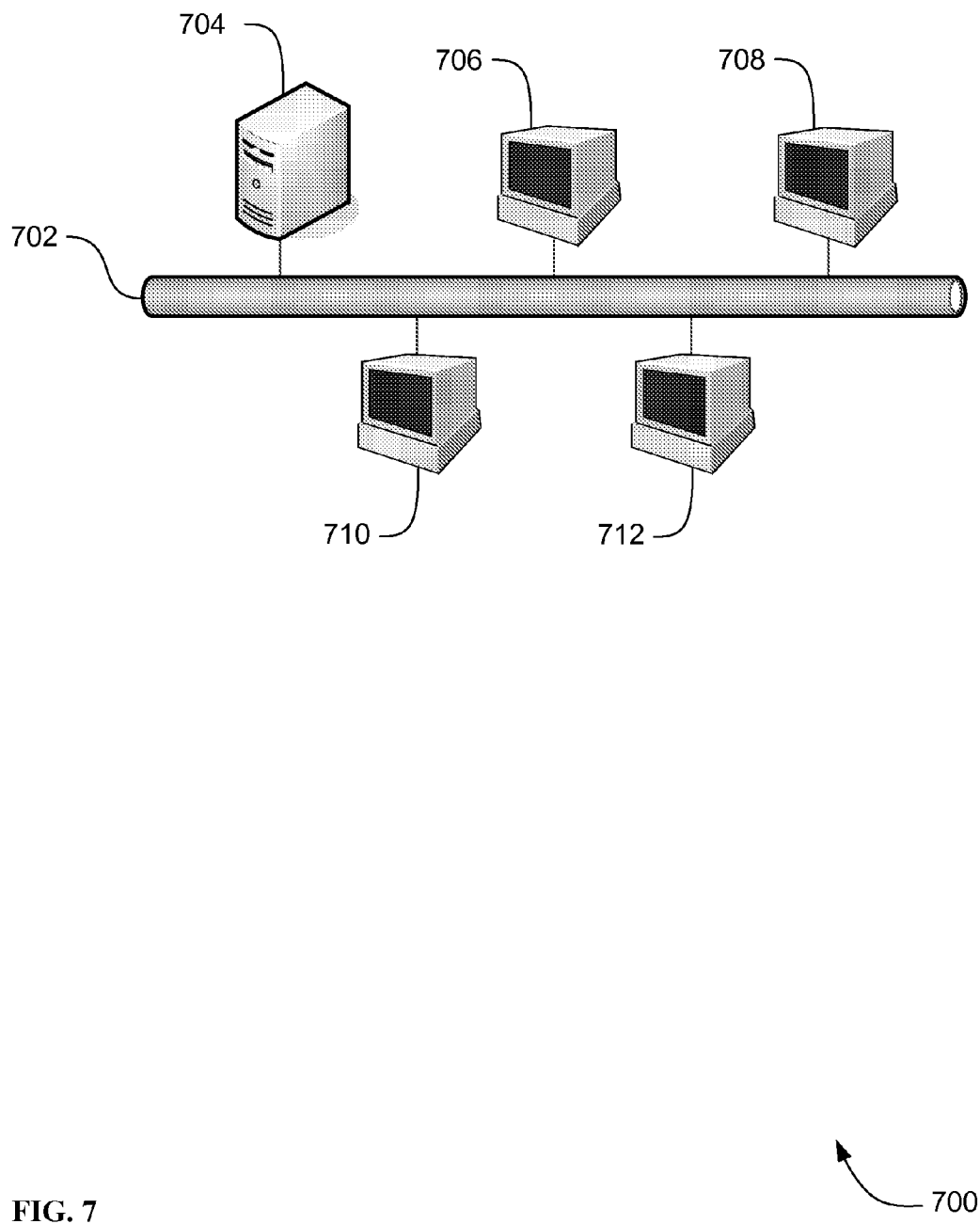
FIG. 7 is a block diagram of a conventional computer cluster environment in which different embodiments can be practiced.

FIG. 7 is a block diagram of a computer cluster environment 700 in which different embodiments can be practiced. System 100, apparatus 200, 300, 400, 500, 600, method 2000 and ESNS 1100 and 1200 can be implemented on computer cluster environment 700.

Computer cluster environment 700 can include a network 702, such as an EtherFast 10/100 backbone, that is operably coupled to a cluster server 704 and a plurality of computers 706, 708, 710 and 712. One possible embodiment of the computers is computer 802 described below with reference to FIG. 8. The plurality of computers can include any number of computers, but some implementations can include 7, 16, 32 and as many as 512 computers. The ESNSs and NBFs described above can be distributed on the plurality of computers.

One example of the computer cluster environment 700 is a Beowolf computer cluster. The computer cluster environment 700 provides an environment in which a plurality of ESNSs and NBFs can be hosted in an environment that facilitates cooperation and communication between the ESNSs and the NBFs.

FIG. 8 is a block diagram of a hardware and operating environment 800 in which different embodiments can be practiced. Computer 802 can include a processor 804, which can be a microprocessor, commercially available from Intel, Motorola, Cyrix and others. Computer 802 can also include random-access memory (RAM) 806, read-only memory (ROM) 808, and one or more mass storage devices 810, and a system bus 812, that operatively couples various system components to the processing unit 804. The memory 806, 808, and mass storage devices, 810, are illustrated as types of computer-accessible media. Mass storage devices 810 can be more specifically types of nonvolatile computer-accessible media and can include one or more hard disk drives, floppy disk drives, optical disk drives, and tape cartridge drives. The processor 804 can execute computer programs stored on the computer-accessible media.

Computer 802 can be communicatively connected to the Internet 814 via a communication device 816. Internet 814 connectivity is well known within the art. In one embodiment, a communication device 816 can be a modem that responds to communication drivers to connect to the Internet via what is known in the art as a "dial-up connection." In another embodiment, a communication device 816 can be an Ethernet® or similar hardware network card connected to a local-area network (LAN) that itself is connected to the Internet via what is known in the art as a "direct connection" (e.g., T1 line, etc.).

A user can enter commands and information into the computer 802 through input devices such as a keyboard 818 or a pointing device 820. The keyboard 818 can permit entry of textual information into computer 802, as known within the art, and embodiments are not limited to any particular type of keyboard. Pointing device 820 can permit the control of the screen pointer provided by a graphical user interface (GUI) of operating systems such as versions of Microsoft Windows®. Embodiments are not limited to any particular pointing device 820. Such pointing devices can include mice, touch pads, trackballs, remote controls and point sticks. Other input devices (not shown) could include a microphone, joystick, game pad, satellite dish, scanner, or the like.

In some embodiments, computer 802 can be operatively coupled to a display device 822. Display device 822 can be connected to the system bus 812. Display device 822 permits the display of information, including computer, video and other information, for viewing by a user of the computer. Embodiments are not limited to any particular display device 822. Such display devices can include cathode ray tube (CRT) displays (monitors), as well as flat panel displays such as liquid crystal displays (LCDs). In addition to a monitor, computers can typically include other peripheral input/output devices such as printers (not shown). Speakers 824 and 826 provide audio output of signals. Speakers 824 and 826 can also be connected to the system bus 812.

Computer 802 can also include an operating system (not shown) that could be stored on the computer-accessible media RAM 806, ROM 808, and mass storage device 810, and can be and executed by the processor 804. Examples of operating systems include Microsoft Windows®, Apple MacOS®, Linux®, UNIX®. Examples are not limited to any particular operating system, however, and the construction and use of such operating systems are well known within the art.

Embodiments of computer 802 are not limited to any type of computer 802. In varying embodiments, computer 802 can comprise a PC-compatible computer, a MacOS®-compatible computer, a Linux®-compatible computer, or a UNIX®-compatible computer. The construction and operation of such computers are well known within the art.

Computer 802 can be operated using at least one operating system to provide a graphical user interface (GUI) including a user-controllable pointer. Computer 802 can have at least one web browser application program executing within at least one operating system, to permit users of computer 802 to access an intranet, extranet or Internet world-wide-web pages as addressed by Universal Resource Locator (URL) addresses. Examples of browser application programs include Netscape Navigator® and Microsoft Internet Explorer®.

The computer 802 can operate in a networked environment using logical connections to one or more remote computers, such as remote computer 828. These logical connections can be achieved by a communication device coupled to, or a part of, the computer 802, Embodiments are not limited to a particular type of communications device. The remote computer 828 could be another computer, a server, a router, a network PC, a client, a peer device or other common network node. The logical connections depicted in FIG. 8 include a local-area network (LAN) 830 and a wide-area network (WAN) 832. Such networking environments are commonplace in offices, enterprise-wide computer networks, intranets, extranets and the Internet.

When used in a LAN-networking environment, the computer 802 and remote computer 828 can be connected to the local network 830 through network interfaces or adapters 834, which is one type of communications device 816. Remote computer 828 can also include a network device 836. When used in a conventional WAN-networking environment, the computer 802 and remote computer 828 can communicate with a WAN 832 through modems (not shown). The modem, which can be internal or external, is connected to the system bus 812. In a networked environment, program modules depicted relative to the computer 802, or portions thereof, can be stored in the remote computer 828.

Computer 802 can also include, power supply 838. Each power supply can be a battery.

Figure 9:
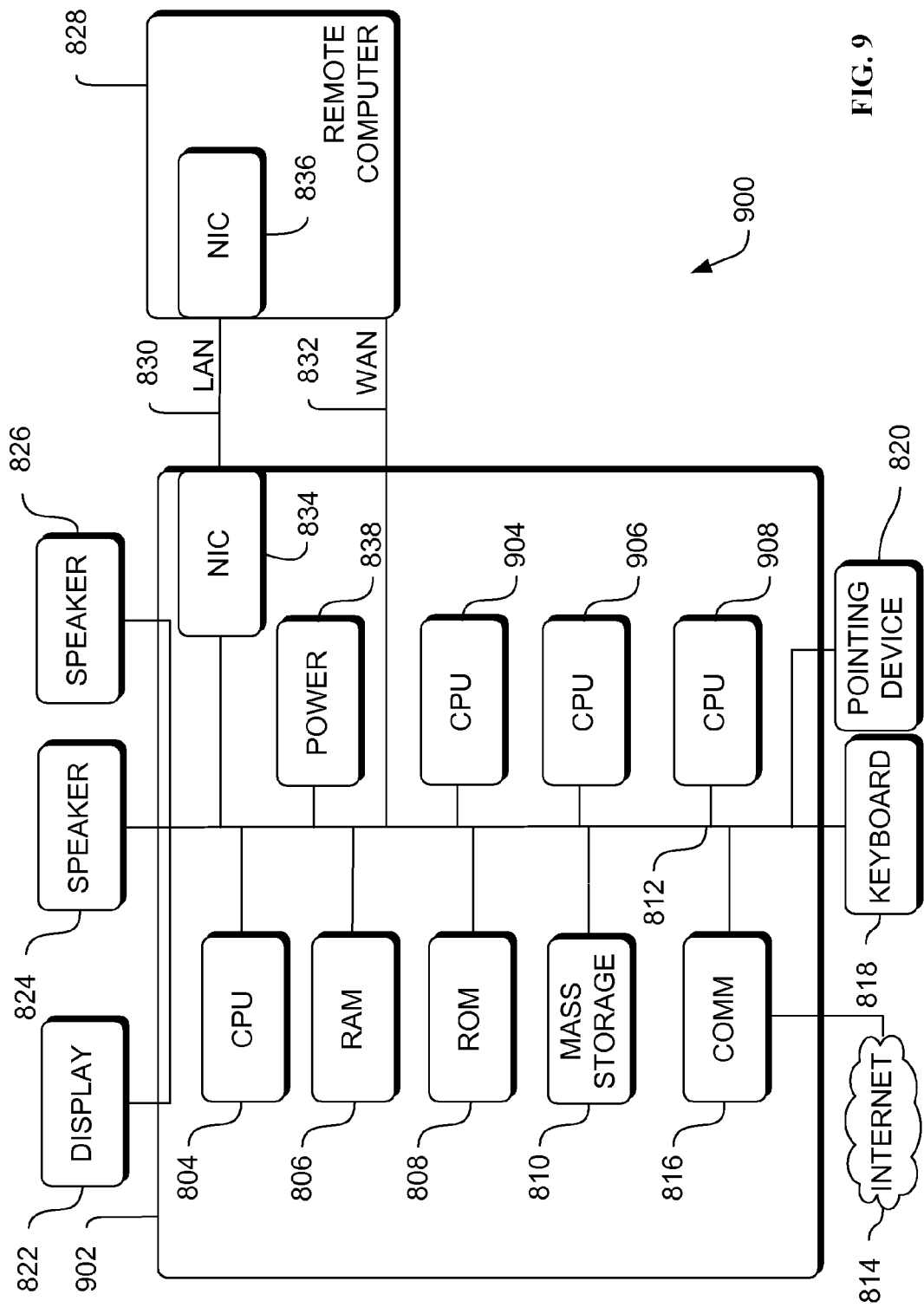
FIG. 9 is a block diagram of a conventional multiprocessor hardware and operating environment in which different embodiments can be practiced.

FIG. 9 is a block diagram of a multiprocessor hardware and operating environment 900 in which different embodiments can be practiced. Computer 902 can include a plurality of microprocessors, such as microprocessor 804, 904, 906, and 908. The four microprocessors of computer 902 can be one example of a multi-processor hardware and operating environment; other numbers of microprocessors can be used in other embodiments.

Similar to the computer cluster environment 700 in FIG. 7 above, the computer 902 can provide an environment in which a plurality of ESNSs and NBFs can be hosted in an environment that facilitates cooperation and communication between the ESNSs and the NBFs.

Figure 10:
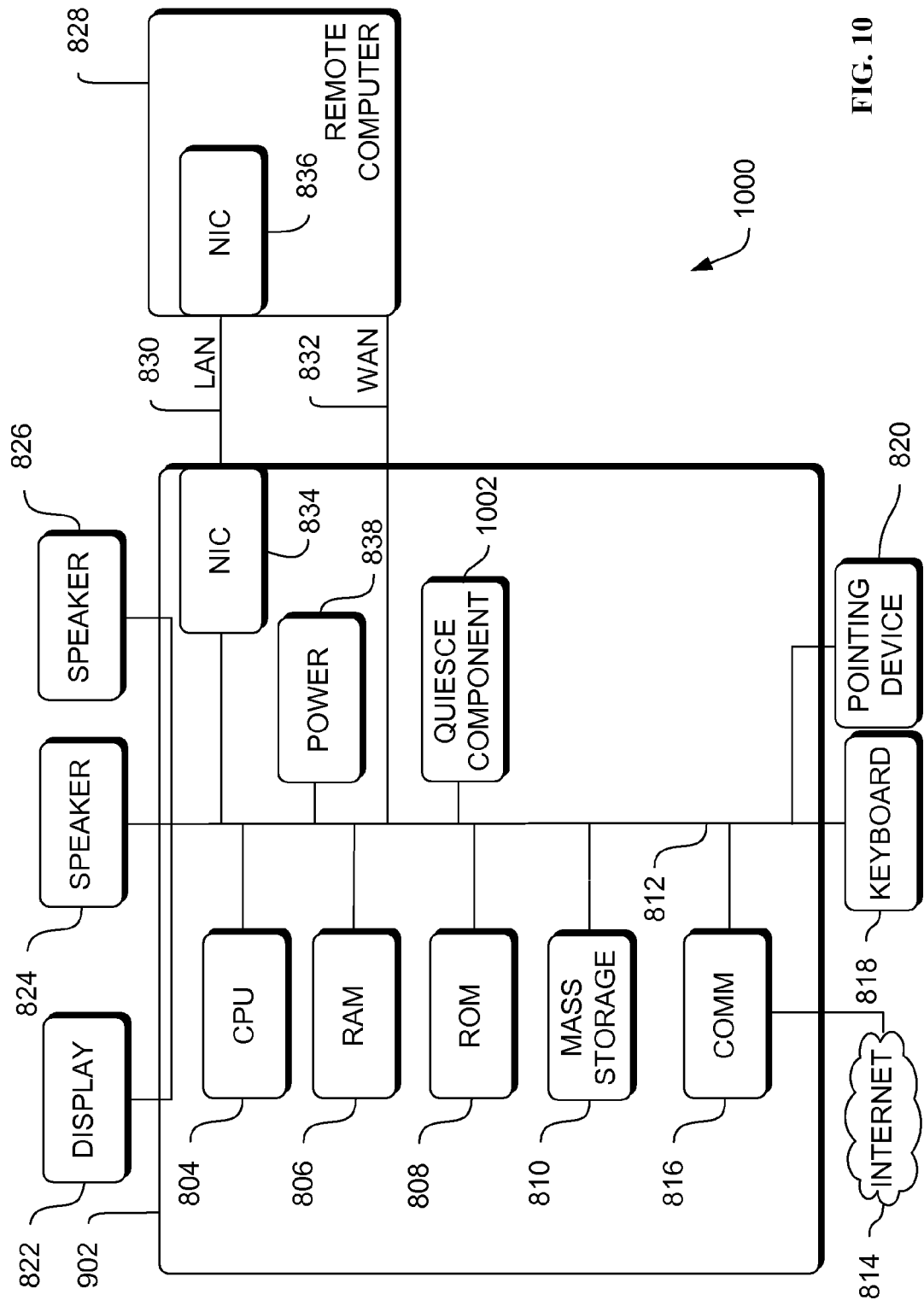
FIG. 10 is a block diagram of a hardware and operating environment, which includes a quiesce component, according to an embodiment.

FIG. 10 is a block diagram of a hardware and operating environment 1000 which can include a quiese component, according to an embodiment. The hardware and operating environment 1000 reduces the possibility that an autonomic element will jeopardize the mission of the autonomic unit.

A quiesce component 1002 of an autonomic unit can render the autonomic unit inactive for a specific amount of time or until a challenging situation has passed. The quiesce component 1002 can be invoked when either an external supervisory entity or the autonomic unit itself determines that the autonomic unit could best serve the needs of the swarm by quiescing. Quiescing can render the autonomic unit temporarily inactive or disabled. Thus, the quiesce component 1002 can reduce the possibility that an autonomic element will jeopardize the mission of the autonomic element by deactivation or inactivating the autonomic element.

Quiesce time can be defined as the length of time taken to quiesce a system (to render the system inactive), or the length of time between periods of activity (i.e., the length of time of inactivity). The quiescing can be somewhat analogous to the cell lifecycle, were cells can stop dividing and go into a quiescent state.

Components of the system 100, apparatus 200, 300, 400, 500, 600, 1000, 1400, 1200, 1300, 1400, 1500 and 1600 and methods 1700, 1800, 1900, 2000, 2100, 2200, 2300, 2400, 2500 and 2600 can be embodied as computer hardware circuitry or as a computer-readable program, or a combination of both.

More specifically, in one computer-readable program embodiment, the programs can be structured in an object-orientation using an object-oriented language such as Java, Smalltalk or C++, and the programs can be structured in a procedural-orientation using a procedural language such as COBOL or C. The software components can communicate in any of a number of ways that are well-known to those skilled in the art, such as application program interfaces (API) or inter process communication techniques such as remote procedure call (RPC), common object request broker architecture (CORBA), Component Object Model (COM), Distributed Component Object Model (DOOM), Distributed System Object Model (DSOM) and Remote Method Invocation (RMI). The components execute on as few as one computer as in computer 802 in FIG. 8, or on at least as many computers as there are components.

Figure 11:
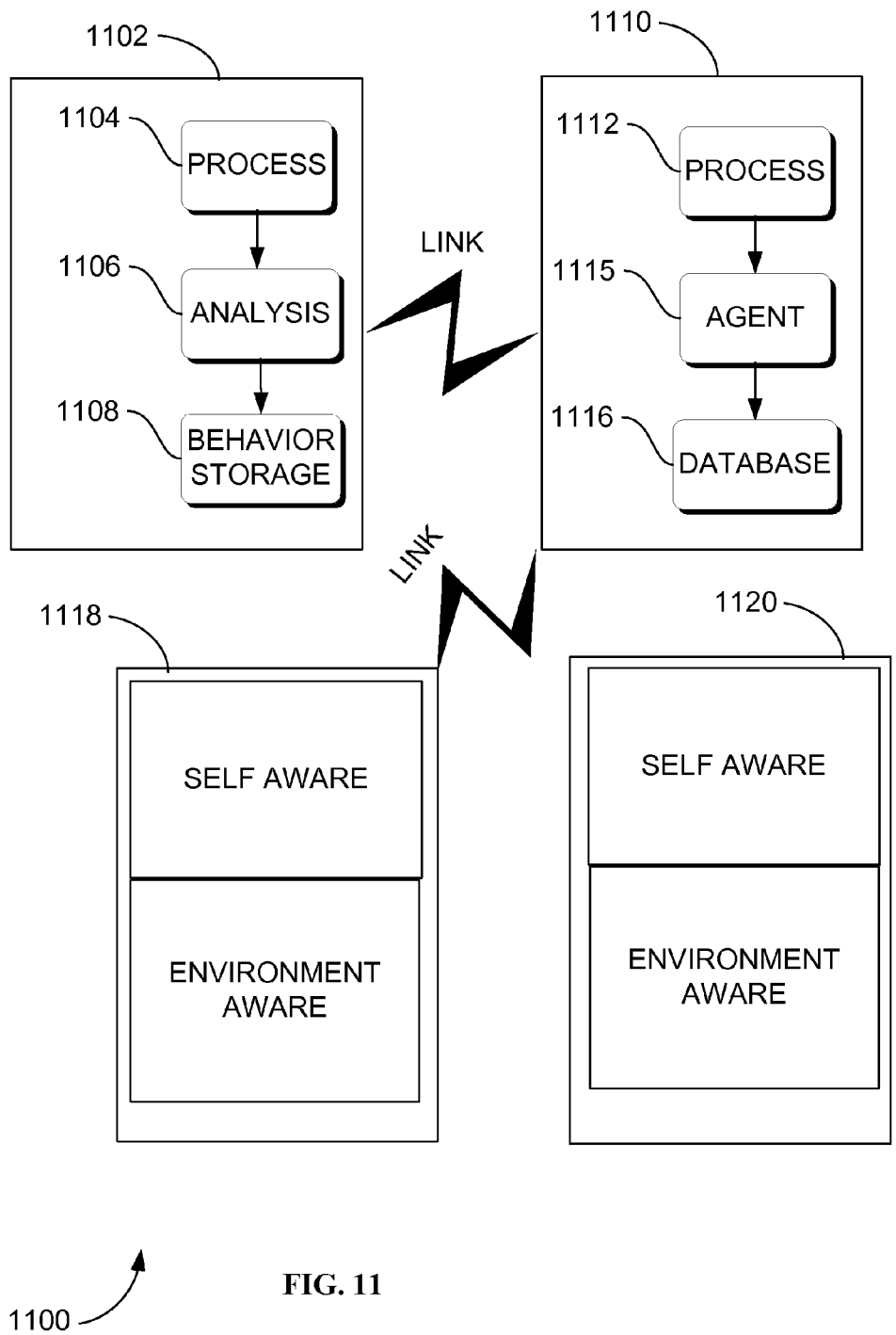
FIG. 11 is a diagram of autonomous entities' interaction, according to an embodiment.

Implementation of an Evolvable Synthetic Neural System in a Tetrahedral Architecture FIG. 11 is a diagram representation of a plurality of autonomic entities that have been assembled to perform a task. These entities can be self-configuring: adapt automatically to the dynamically changing environments; self-optimizing: monitor and tune resources automatically; self-protecting: anticipate, detect, identify, and protect against attacks from anywhere; and, self-healing: discover, diagnose, and react to disruptions. As shown with reference to autonomic entities 1118 and 1120 autonomic computing can have a self-aware layer and an environment aware layer. The self-aware layer of the autonomic entity (agent or other) can be comprised of a managed component and autonomic manager, which can be an agent, termed a self-managing cell (SMC). Control loops with sensors (self-monitor) and effectors (self-adjuster) together with system knowledge and planning/adapting policies can allow the autonomic entities to be self aware and to self manage. A similar scheme can facilitate environment awareness—allowing self managing if necessary, but without the immediate control to change the environment; this could be affected through communication with other autonomic managers that have the relevant influence, through reflex or event messages. The autonomic entities can be arranged or assigned distinctive roles such as worker entities, coordinating or managing entities, and message entities. Based on the task a ruler entity could be assigned a set of worker entities to manage inclusive of determining if a stay alive signal ought to be withdrawn. Further, the communication between the ruler and the worker can be facilitated through the message entity. The message entity could have the additional task of communicating with a remote system. In the case of space exploration, the remote system could be mission control on earth, mission control on an orbital platform, or any other arrangement that can facilitate that is external to the collection of autonomic elements. The remote system could be an autonomic entity acting like the project manager for the mission. Communication with mission control will be limited to the download of science data and status information. An example of such a grouping is shown in FIG. 11 where autonomic entity 1102 is shown as a ruler entity, autonomic entity 1110 as a message entity, and autonomic entities 1118 and 1120 are examples of worker entities. In terms of hardware, these entities can be all identical with the discernable difference being programming to accomplish assigned tasks. An added advantage to having identical hardware is replacing failed entities, which can be accomplished by activating software code found in the autonomic entity. If hardware differences exist they can be based on specialized equipment suitable for a particular task. However, at a minimum, certain functions or roles, such as ruler and messenger, can be expected to be within the skill set of all the autonomic entities.

As shown in FIG. 11, ruler autonomic entity 1102 can comprise a program or process 1104 executing in ruler entity 1102. Ruler entity 1102 can be implemented using a data processing system, such as data processing system 902 in FIG. 9, or in the form of an autonomous agent compiled by a data processing system. In the alternative, the ruler entity could be an autonomous nano-technology swarm that is launched from a factory ship for exploring planets, asteroids, or comets. Further, an analysis module 1106 or agent as executed by ruler entity 1102 can be used to monitor process 1104 and to receive pulse monitor and heart beat monitor signals from worker entities through the messenger entity. When the analysis module 1106 is used to monitor process 1104 the analysis module 1106 cart be to detect errors or problems with the operation of process 1104.

As shown in FIG. 11, analysis agent 1106 can include an evaluator or monitoring engine used to monitor the operation of process 1104. Analysis agent 1106 can be executed in response to some event. This event can be a periodic event, such as the passage of some period of time, data received from one or more of the worker entities. Further, the event can be the initialization of internal procedures in process 1104 or the starting or restarting of ruler entity 1102. Depending on the particular implementation, analysis agent 1106 can continuously run in the background monitoring process 1104 and analyzing the worker entity signals. See method 2100 in FIG. 21 below for actions taken by analysis agent module 1106 in formulating a strategy for the worker entities. Further, analysis agent 1106 can be subject to any self-healing routines found in ruler entity 1102.

This monitoring by analysis agent 1106 can be based on rules stored in behavior storage 1108, which could be used to compare the actual behavior of the received data to an expected behavior as defined in behavior storage 1108. In the present arrangement, behavior storage 1108 (ruler entity 1102) can be a collection of rules that can be updated by a remote computer through the messenger entity that reflects most current fixes (self-healing) or repair procedures and responses to worker entities upon the occurrence of an event, change in condition, or deviation from a normal operation. Behavior storage 1108 can be narrowly tailored based on the use and purpose of the autonomic entity, such as messenger entity 1110 and have only those procedures needed to perform its programming.

When messenger entity connects to remote computer at a command and control station, database 1116 can be updated with information that can later be used to program ruler entity or worker entity. In most cases a copy of the rules in database 1116 contains the most up-to-date information. If the objective changes or a solution to a problem requires an updated version not found within the autonomic entity, the entities can attempt to contact message entity 1110 to see if more recent or up-to-date information is available. If updates are available, these updates can be sent to the requesting entity for processing.

The information in behavior storage 1108 and databases in messenger and worker entity can include an array of values that are expected when selected process or operations are implemented in the respective entity. Examples processes can be initializing software, timing requirements, synchronization of software modules, and other metrics that can provide information concerning the running of a process within the respective entity. Examples operations can be data gathering, processing of information, controlling machinery, or any other operation where data processing systems are employed. These expected values can be compared to determine if an error condition has occurred in the operation of the entity. An error condition can be analyzed to determine its causes and possible correction. In the case of a worker entity, the error can be internally analyzed to select the appropriate self-healing procedure and the error can be sent to the ruler entity to be analyzed by analysis agent 1106 using the rules in behavior storage 1108. Based on the analysis, the ruler entity can elect to either withdraw the stay alive signal to the malfunctioning worker entity or wait a selected period to generate one or more stay alive signal, withdrawal of a stay alive signal, or a self-destruct signal. If the stay alive signal is withdrawn, the malfunctioning entity could be disconnected from the operation and the assigned to another entity or partially performed by the remaining entity to insure its completion.

Figure 12:
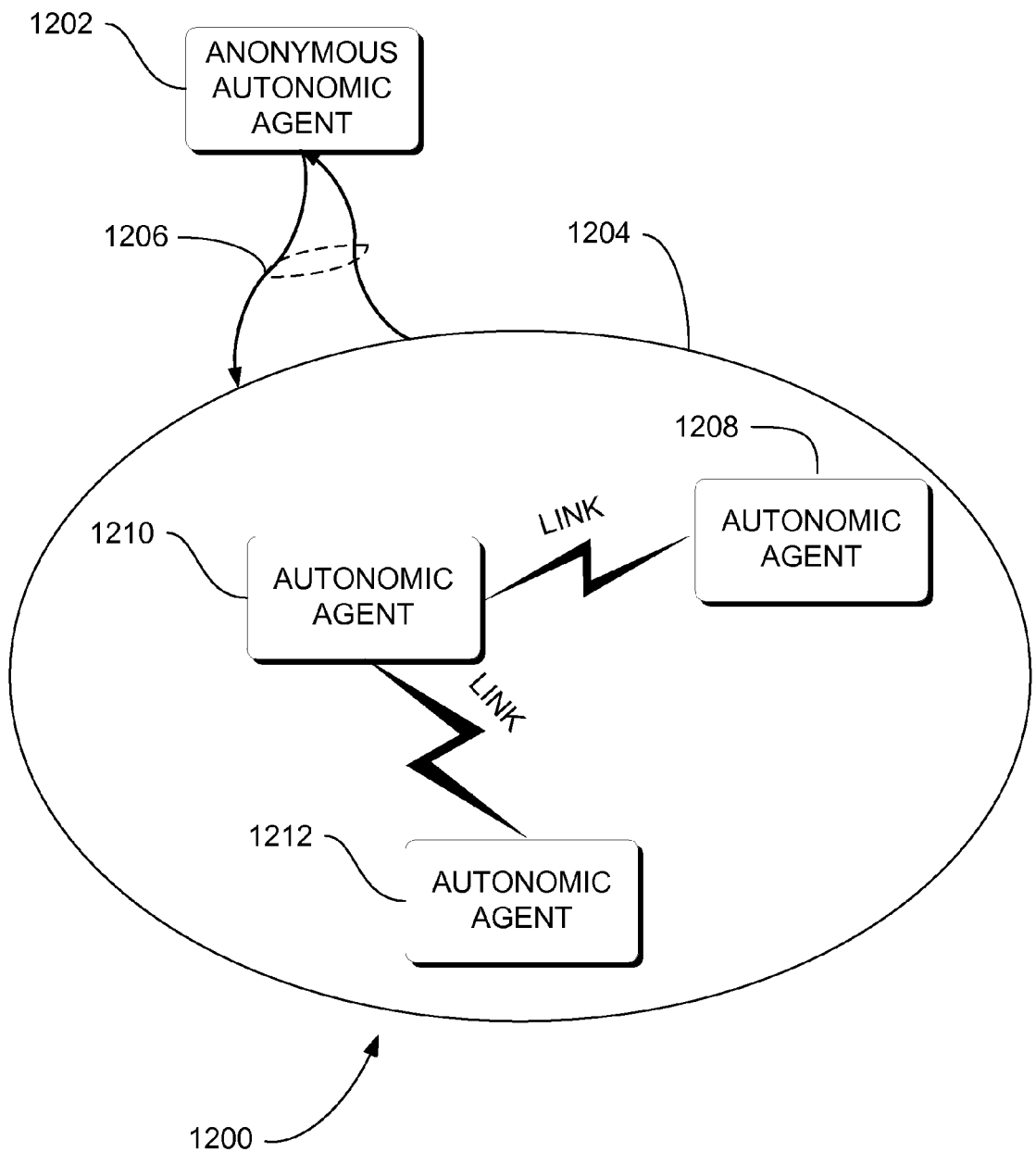
FIG. 12 is a block diagram of an autonomous entity management system, according to an embodiment.

FIG. 12 is a block diagram of an autonomous entity management system 1200 according to an embodiment. The system 1200 can be a generic system because the system 1200 represents a myriad of devices, processes, or device and process that perform a task in accordance to its programming or design. The illustrated system 1200 represents an instance when an autonomous system 1204 encounters an anonymous autonomic agent 1202. An anonymous autonomous agent can be a visiting agent, a mobile agent that can enter the sphere of influence of the autonomous system 1204, or any device for which the autonomous system 1204 has no established relationship. Example encounters can be a wireless device (agent) and communication tower (system), a client and server, a video subscriber and video provider, a process and an operating system. System 1200 manages autonomous entities that can be functionally extracted from an environment upon the occurrence of a predetermined condition such as a potential security breach.

The autonomous system 1204 can comprise one or more autonomic agents 1208, 1210, and 1212 all performing assigned functions and roles. As noted earlier, roles can be a combination of ruler, messenger, and worker. Functions can be data gathering, communication functions, scheduling, controlling, security, and so forth. Upon detecting anonymous autonomic agent 1202 the assigned autonomous agent for performing security functions for autonomous system 1204 can interrogate the anonymous autonomic agent 1202, requesting production of valid credentials. Detection can occur by employing various schemes such as when the anonymous autonomic agent 1202 requests resources from the system 1204 or from any autonomic entity that forms part of the system, response to polling signals from the autonomous system 1204, or through a friend or foe signal that indicates the presence of an anonymous entity 1202 in proximity to the autonomous system 1204.

To the autonomous system 1204, security can be important because of compromises by the accidental misuse of hosts by agents, as well as the accidental or intentional misuse of agents by hosts and agents by other agents. The result can be damage, denial-of-service, breach-of-privacy, harassment, social engineering, event-triggered attacks, or compound attacks. To prevent security breaches, visiting agents can be verified to have valid and justified reasons for being there as well as providing security to the visiting agent with interaction with other agents and host. Upon detection the visiting agent 1202 can be sent an asynchronous Alice signal (Autonomic license) 1206 requiring valid credentials from the agent 1202. The anonymous agent 1202 can need to work within the autonomic system 1204 to facilitate self-management, as such the anonymous agent 1202 and its host can need to be able to identify each other's credentials through such as an ALice signal. The autonomic system 1204 can establish certain response characteristics for the returned signal from the agent 1202. For example, the autonomic system 1204 can require a response in an appropriate format, within a certain timeout period, and with a valid and justified reason for being within the locust of interest or domain of the autonomous system 1204. For protection the autonomic system 1204 can make an assessment of the quality of the response from the anonymous agent 1202 to ascertain the potential of the agent for causing harm to the autonomous system 1204. Based on this determination the autonomous system 1204 can control the type of interaction with the agent 1202. The agent can be destroyed, blocked, partially blocked, stay alive signal withdrawn, or allowed to communicate with other agents within the autonomous system 1204. The protection can be triggered at any level of infraction or by a combination of infractions by the anonymous autonomic agent 1202 when responding to the ALice signal. If the agent 1202 fails to identify itself appropriately following an Alice interrogation, the agent 1202 can be blocked from the system and given either a self-destruct signal, or its "stay alive" reprieve is withdrawn. A consequence of unacceptable response within a timeout period is that the anonymous agent 1202 can be identified as an intruder or other invalid agent (process) and consequently, the anonymous agent 1202 is destroyed and/or excluded from communicating with other agents 1208, 1210, 1212 in the system. As an alternative to the ALice signal, a quiese signal, command or instruction can be sent. The quiesce signal is discussed in more detail in conjunction with FIGS. 10, 19 and 20.

Figure 13:
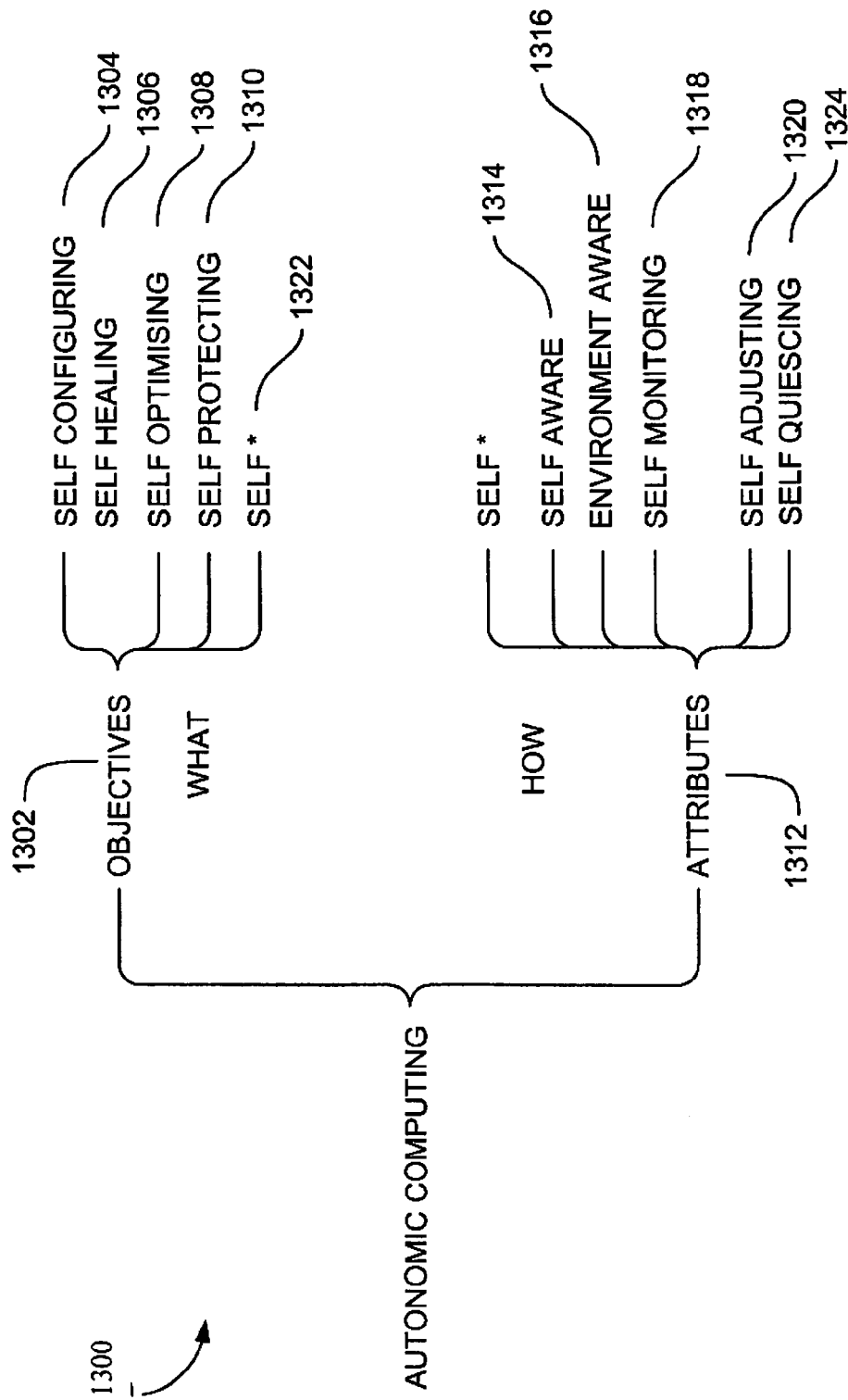
FIG. 13 is a hierarchical chart of an autonomous entity management system, according to an embodiment.

FIG. 13 is a hierarchical chart of an autonomous entity management system 1300 according to an embodiment. Properties that a system can possess in order to constitute an autonomic system are depicted in the autonomous entity management system 1300.

General properties of an autonomic (self-managing) system can include four objectives defined by International Business Machines 1302: self-configuring 1304, self-healing 1306 self-optimizing 1308 and self-protecting 1310, and four attributes 1312: self-awareness 1314, environment-awareness 1316, self-monitoring 1318 and self-adjusting 1320. One skilled in the art will recognize that other properties also exist, such as self-quiescing 1324. Essentially, the objectives 1302 could represent broad system requirements, while the attributes 1312 identify basic implementation mechanisms.

Self-configuring 1304 can represent an ability of the system 1300 to re-adjust itself automatically; this can simply be in support of changing circumstances, or to assist in self-healing 1306, self-optimization 1308 or self-protection 1310. Self-healing 1306, in reactive mode, is a mechanism concerned with ensuring effective recovery when a fault occurs, identifying the fault, and then, where possible, repairing it. In proactive mode, the self-healing 1306 objective can monitor vital signs in an attempt to predict and avoid "health" problems (i.e., reaching undesirable situations).

Self-optimization 1308 can mean that the system 1300 is aware of ideal performance of the system 1300, can measure current performance of the system 1300 against that ideal, and has defined policies for attempting improvements. The system 1300 can also react to policy changes within the system as indicated by the users. A self-protecting 1310 system 1300 can defend the system 1300 from accidental or malicious external attack, which necessitates awareness of potential threats and a way of handling those threats.

Self-managing objectives 1302 can require awareness of an internal state of the system 1300 (i.e., self-aware 1314) and current external operating conditions (i.e., environment-aware 1316). Changing circumstances can be detected through self-monitoring and adaptations are made accordingly (i.e., self-adjusting 1320). Thus, system 1300 can have knowledge of available resources, components, performance characteristics and current status of the system, and the status of inter-connections with other systems, along with rules and policies therein can be adjusted. Such ability to operate in a heterogeneous environment can require the use of open standards to enable global understanding and communication with other systems.

These mechanisms may not be independent entities. For instance, if an attack is successful, this can include elf-healing actions, and a mix of self-configuration and self-optimisation, in the first instance to ensure dependability and continued operation of the system, and later to increase the self-protection against similar future attacks. Finally, these self-mechanisms could ensure there is minimal disruption to users, avoiding significant delays in processing.

Other self* properties have emerged or have been revisited in the context of autonomicity. We highlight some of these briefly here. Self-* 1322 can be self-managing properties, as follows. Self-anticipating is an ability to predict likely outcomes or simulate self-* actions. Self-assembling is an assembly of models, algorithms, agents, robots, etc.; self-assembly is often influenced by nature, such as nest construction in social insects. Self-assembly is also referred to as self-reconfigurable systems. Self-awareness is "know thyself" awareness of internal state; knowledge of past states and operating abilities. Self-chop is the initial four self-properties (Self-Configuration 1304, Self-Healing 1306, Self-Optimisation 1308 and Self-Protection 1310). Self-configuring is an ability to configure and re-configure in order to meet policies/goals. Self-critical is an ability to consider if policies are being met or goals are being achieved (alternatively, self-reflect). Self-defining is a reference to autonomic event messages between Autonomic Managers: contains data and definition of that data—metadata (for instance using XML). In reference to goals/policies: defining these (from self-reflection, etc.). Self-governing is autonomous: responsibility for achieving goals/tasks. Self-healing is reactive (self-repair of faults) and proactive (predicting and preventing faults). Self-installing is a specialized form of self-configuration—installing patches, new components, etc or re-installation of an operating system after a major crash. Self-managing is autonomous, along with responsibility for wider self-* management issues. Self-optimizing is optimization of tasks and nodes. Self-organized is organization of effort/nodes; particularly used in networks/communications. Self-protecting is an ability of a system to protect itself. Self-reflecting is an ability to consider if routine and reflex operations of self-* operations are as expected and can involve self-simulation to test scenarios. Self-similar is self-managing components created from similar components that adapt to a specific task, for instance a self-managing agent. Self-simulation is an ability to generate and test scenarios, without affecting the live system. Self-aware is self-managing software, firmware and hardware.

Figure 14:
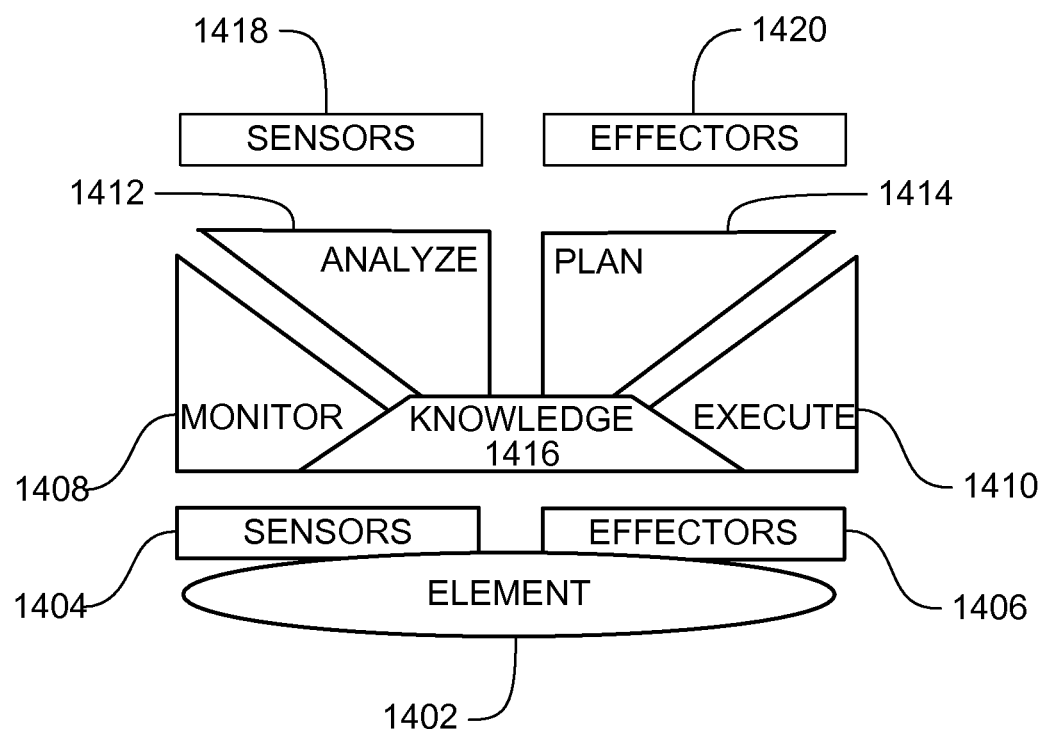
FIG. 14 is a block diagram of an autonomic element, according to an embodiment.

FIG. 14 is a block diagram of an autonomic element 1400 according to an embodiment. Autonomic element 1400 can include an element 1402 that is operably coupled to sensors and 1404 and effectors 1406.

Autonomic element 1400 can also include components that monitor 1408, execute 1410, analyze 1412 and plan 1414; those components can access knowledge 1416. Those components can interact with sensors 1418 and effectors 1420.

Figure 15:
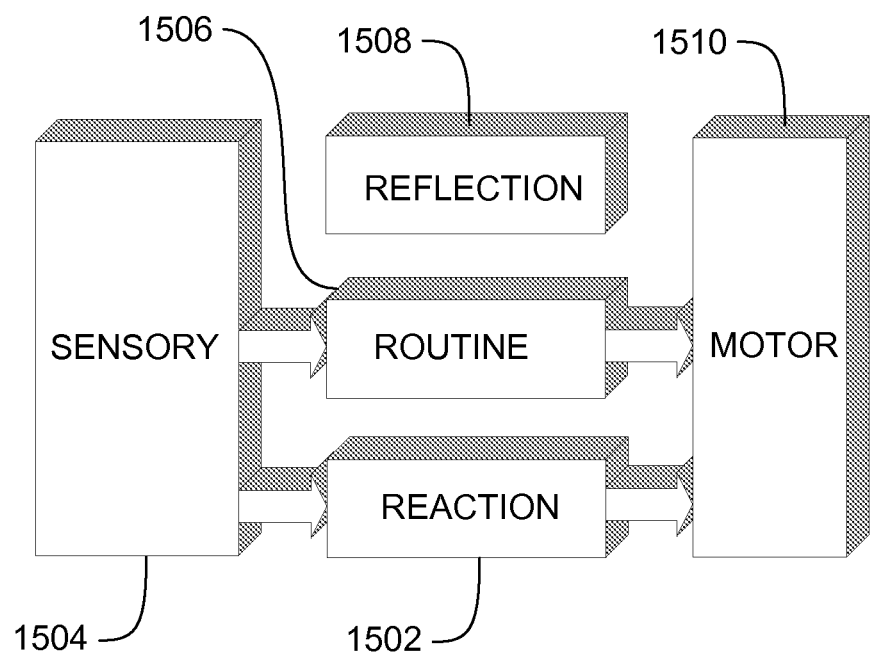
FIG. 15 is a block diagram of autonomy and autonomicity at a high system level, according to an embodiment.

FIG. 15 is a block diagram of autonomy and autonomicity 1500 at a high system level, according to an embodiment. A high level perspective for an intelligent machine design is depicted in FIG. 15. This diagram of autonomy and autonomicity 1500 includes intelligent machine design and system level autonomy and autonomicity.

FIG. 15 describes three levels for the design of intelligent systems:

1) Reaction 1502—the lowest level, where no learning occurs but there is immediate response to state information coming from sensory systems 1504.

2) Routine 1506—middle level, where largely routine evaluation and planning behaviors take place. Input is received from sensory system 1504 as well as from the reaction level and reflection level. This level of assessment results in three dimensions of affect and emotion values: positive affect, negative affect, and (energetic) arousal.

3) Reflection 1508—top level, receives no sensory 1504 input or has no motor 1510 output; input is received from below. Reflection is a meta-process, whereby the mind deliberates about itself. Essentially, operations at this level look at the system's representations of its experiences, its current behavior, its current environment, etc.

As illustrated, input from, and output to, the environment only takes place within the reaction 1502 and routine 1506 layers. One can consider that reaction 1502 level essentially sits within the "hard" engineering domain, monitoring the current state of both the machine and its environment, with rapid reaction to changing circumstances; and, that the reflection 1502 level can reside within an artificial domain utilizing its techniques to consider the behavior of the system and learn new strategies. The routine 1506 level can be a cooperative mixture of both. The high-level intelligent machine design can be appropriate for autonomic systems as depicted here in FIG. 15, in consideration of the dynamics of responses including reaction 1502 and also for reflection 1508 of self-managing behavior.

As depicted autonomic computing can reside within the domain of the reaction 1502 layer as a result of a metaphoric link with the autonomic biological nervous system, where no conscious or cognitive activity takes place. Other biologically-inspired computing (also referred to as nature-inspired computing, organic computing, etc.) can provide such higher level cognitive approaches for instance as in swarm intelligence. Within the autonomic computing research community, autonomicity can not normally be considered to imply this narrower view. Essentially, the autonomic self-managing metaphor can be considered to aim for a user/manager to be able to set high-level policies, while the system achieves the goals. Similar overarching views exist in other related initiatives and, increasingly, they are influencing each other.

in terms of autonomy and autonomicity, autonomy can be considered as being self-governing while autonomicity can be considered being self-managing. At the element level, an element can have some autonomy and autonomic properties, since to self-manage implies some autonomy, while to provide a dependable autonomous element requires such autonomic properties as self-healing along with the element's self-directed task. From this perspective, separation of autonomy and autonomicity as characteristics will decrease in the future and eventually will become negligible. On the other hand, at the system level if one considers again the three tiers of the intelligent machine design (reaction 1502, routine 1506, and reflection 1508) and accepts the narrower view of autonomicity, there is a potential correlation between the levels. That is, the reaction 1502 level correlates with autonomicity, and the reflection 1508 level correlates with autonomy; autonomy as in self-governing of the self-managing policies within the system.

Figure 16:
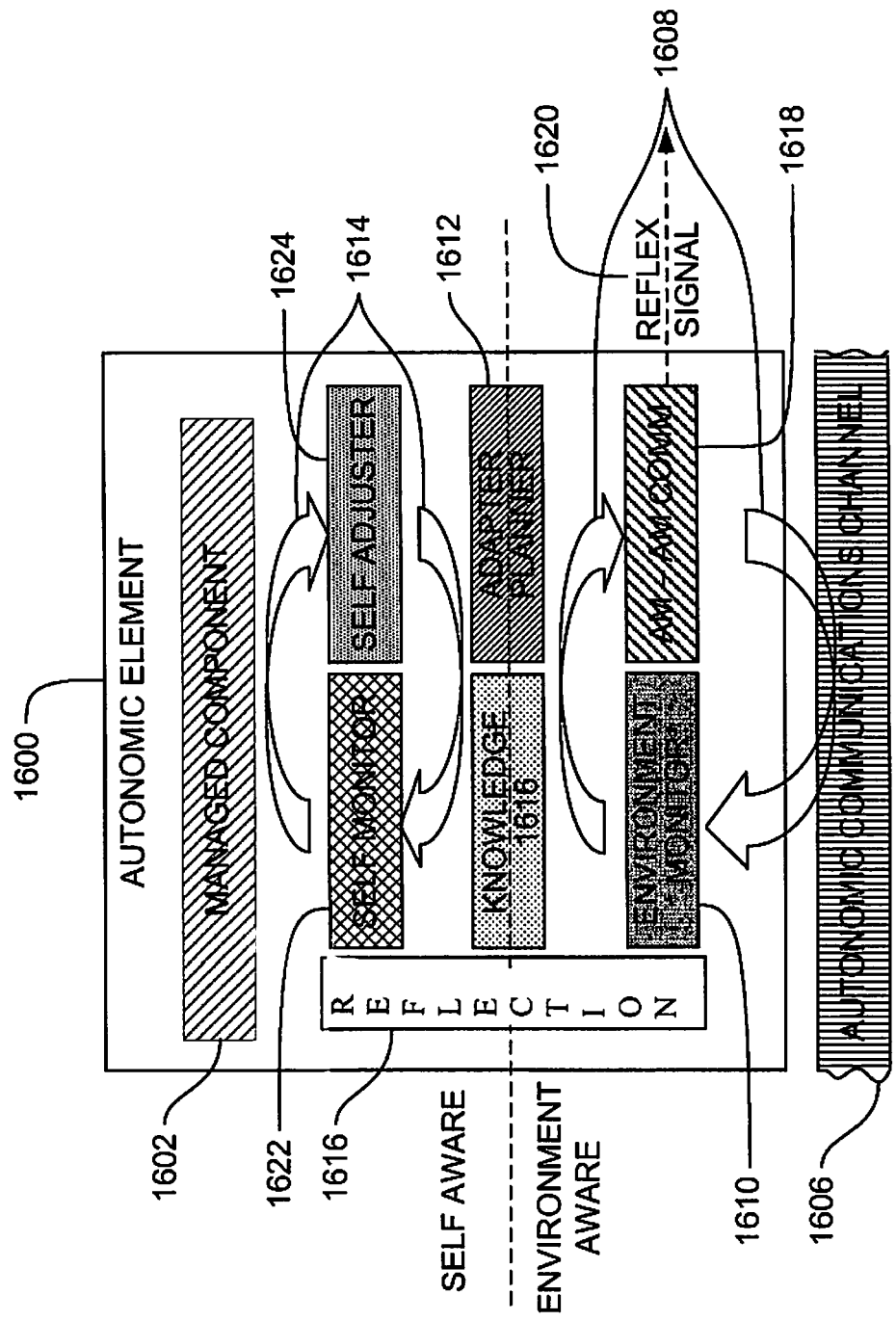
FIG. 16 is a block diagram of an architecture of an autonomic element, according to an embodiment, that includes reflection and reflex layers.

FIG. 16 is a block diagram of an architecture of an autonomic element (AE) 1600 according to an embodiment that includes reflection and reflex layers. The autonomic element 1600 can include a managed component (MC) 1602 that is managed, and the autonomic element 1600 can further include an autonomic manager (AM), not shown. The AM can be responsible for the MC 1602 within the AE 1600. The AM can be designed as part of the component or provided externally to the component, as an agent, for instance. Interaction of the autonomic element 1600 can occur with remote (external) autonomic managers (cf. the autonomic communications channel 1606) through virtual, peer-to-peer, client-server or grid configurations.

An important aspect of the architecture of many autonomic systems can be sensors and effectors, such as shown in FIG. 14. A control loop 1608 can be created by monitoring 1610 behavior through sensors, comparing this with expectations (knowledge 1416, as in historical and current data, rules and beliefs), planning 1612 what action is necessary (if any), and then executing that action through effectors. The closed loop of feedback control 1608 can provide a basic backbone structure for each system component. FIG. 16 describes at least two control loops in the autonomic element 1600, one for self-awareness 1614 and another control loop 1608 for environmental awareness.

In some embodiments, the self-monitor/self-adjuster control loop 1614 can be substantially similar to the monitor, analyze, plan and execute (MAPE) control loop described in FIG. 14. The monitor-and-analyze parts of the structure can perform a function of processing information from the sensors to provide both self-awareness 1614 and an awareness 1608 of the external environment. The plan-and-execute parts can decide on the necessary self-management behavior that will be executed through the effectors. The MAPE components can use the correlations, rules, beliefs, expectations, histories, and other information known to the autonomic element, or available to the autonomic element through the knowledge repository 1416 within the AM 1604.

A reflection component 1616 can perform analysis computation on the AE 1600 (cf. the reflection component 1616 within the autonomic manager). In terms of an autonomic system, reflection can be particularly helpful in order to allow the system to consider the self-managing policies, and to ensure that the policies are being performed as expected. This can be important since autonomicity involves self-adaptation to the changing circumstances in the environment. An autonomic manager communications (AM/AM) component 1618 can also produce a reflex signal 1620. A self adjuster 1622 can be operably coupled to a self-monitor 1624 in the self control loop 1614.

Method Embodiments

In the previous section, apparatus embodiments are described. In this section, the particular methods of such embodiments are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware can also be composed of computer-executable instructions. In some embodiments, methods 1700-2600 can be performed by a program executing on, or performed by firmware or hardware that is a part of a computer, such as computer 802 in FIG. 8.

Figure 17:
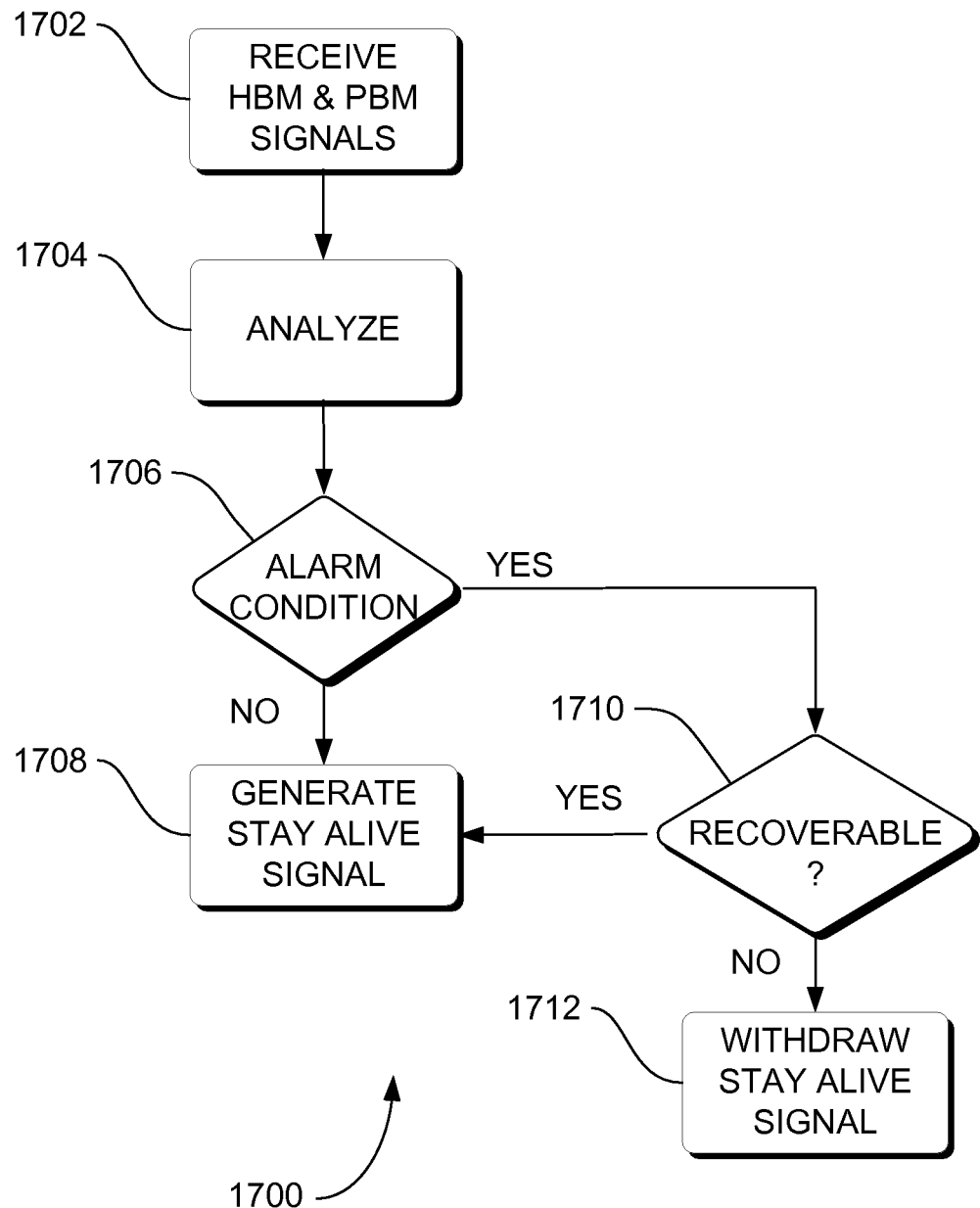
FIG. 17 is a flowchart of a method to construct an environment to satisfy increasingly demanding external requirements, according to an embodiment.

FIG. 17 is a flowchart of a method 1700 to construct an environment to satisfy increasingly demanding external requirements according to an embodiment where a ruler entity decides to withdraw or generate a stay alive signal. Method 1700 manages autonomous entities that can be functionally extracted from an environment upon the occurrence of a predetermined condition.

Method 1700 can begin with action 1702 when receiving a signal from a managed entity. Action 1702 can receive a heart beat monitor (HBM) signal and pulse monitor (PBM) signal from aged entity such as worker entities 1118 or 1120. The HBM signal can be an indication that the managed entity (worker entity) is operating. The HBM can be an "ON/OFF" state signal, an indication that a process is being performed, or any other signal that can convey information that the worker entity is alive or active. The PBM signal can extend the HBM signal to incorporate reflex/urgency/health indicators from the autonomic manager representing its view of the current self-management state. The PBM signal can thus convey the performance and characteristics of the entity in the form of engineering data summarization to add context to the received HBM signal. Engineering data summarization can be a set of abstractions regarding sensor that can comprise rise and fall of data by a certain amount, external causes for parameter deviations, actual numerical value of the parameters being summarized, warning conditions, alarm conditions, and any other summarization that would convey the general health of the system. Once the HBM and PBM signals have been received, control can be forwarded to action 1704 for further processing.

In action 1704, an analysis of the HBM and PBM signal can be performed to determine trends and possible areas of concern. Some purposes of the analysis can be to determine if a predetermined condition is exceeded, to make projection through simulation and data modeling areas of parameters that can lead to the failure of the worker entity or that might jeopardize the assigned mission, and ascertain the quality of performance of the system. The analysis can be performed by using regression techniques, neural network techniques, statistical techniques, or any other technique that can convey information about the state of a system or emergent behavior of the system. Once the analysis has been performed, control can pass to action 1706 for further processing.

In action 1706, an alarmed condition can be determined. In action 1706, the analysis of action 1704 can be referenced to determine if there is one or more alarm condition that can trigger the withdrawal of a stay alive signal. If no alarm conditions are determined, control can be passed to action 1708 to generate a stay alive signal. In the event that an alarm condition is present, control can be passed to action 1710 for further processing.

In action 1710, a determination can be performed to ascertain whether the identified alarmed condition of action 1706 is recoverable by the managed entity, such as worker entities 1118 and 1120 of FIG. 11. When an alarmed condition is determined to be recoverable, control can be passed to action 1708 to generate a stay alive signal. When an alarmed condition is determined not to be recoverable, control can be passed to action 1712 to withdraw the stay alive signal. Method 1800 below can be one embodiment of determining 1710 if the identified alarmed condition is recoverable.

Figure 18:
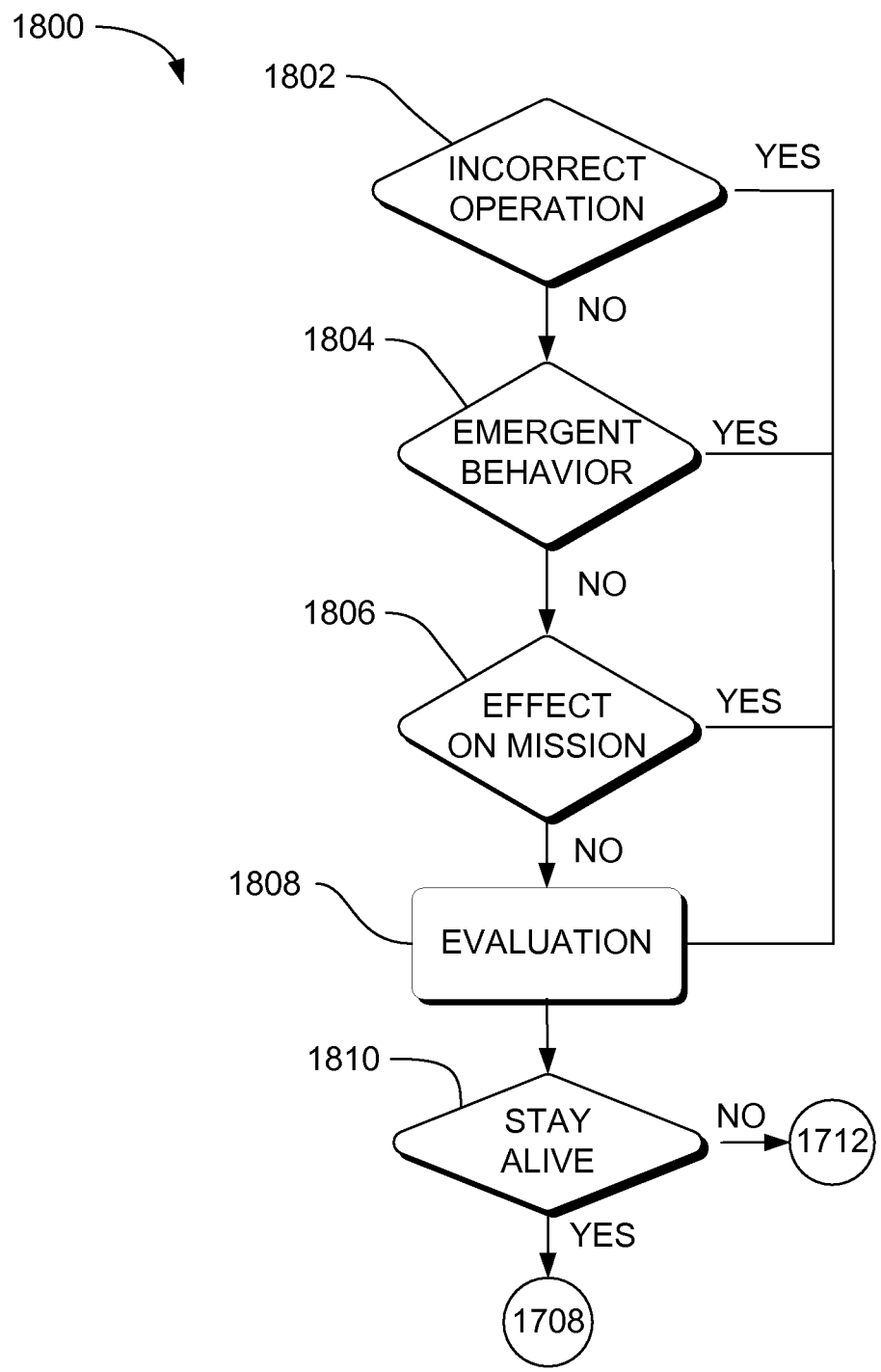
FIG. 18 is a flowchart of a method to construct an environment to satisfy increasingly demanding external requirements, according to an embodiment, where a ruler entity decides to withdraw or generate a stay alive signal.

FIG. 18 is a flowchart of a method 1800 for ascertaining the recoverability of an alarmed condition determined at action 1706 according to an embodiment. Method 1800 manages autonomous entities that can be functionally extracted from an environment upon the occurrence of a predetermined condition. Method 1800 is one possible embodiment of the action in FIG. 17 above of determining 1710 if the identified alarmed condition is recoverable.

Method 1800 can begin with action 1802 when receiving one or more alarmed conditions. In action 1802, a determination is performed of whether or not an incorrect operation from the managed system has been identified in action 1704 of FIG. 17. An incorrect operation can range from not initializing sensors to failing to self-heal when internal decision logic recommends as an appropriate cause of action. In action 1802 in addition to determining if an incorrect operation has been identified, the number of devices or processes within the entity that registered an incorrect operation can be ascertained. If at least one incorrect operation is determined, the action can transfer the identity of the unit evaluation block 1808 for further processing.

In action 1804, a determination is performed of whether or not emergent behavior from the managed system has been identified in action 1704 of FIG. 17. An emergent behavior or emergent property can appear when a number of entities (agents) operate in an environment forming behaviors that are more complex as a collective. The property itself can often be unpredictable and unprecedented and can represent a new level of the systems evolution. This complex behavior in the context of control system can be known as non-linearity, chaos, or capacity limits. The complex behavior or properties cannot be properties of any single such entity, nor can they easily be predicted or deduced from behavior in the lower-level entities. One reason why emergent behavior occurs can be that the number of interactions between autonomic components of a system increases combinatorially with the number of autonomic components, thus potentially allowing for many new and subtle types of behavior to emerge. Nothing can directly command the system to form a pattern, but the interactions of each part (entities) to its immediate surroundings can cause a complex process that leads to order. Emergent behavior can be identified based on parameters that give rise to the complex behavior in a system such as demands on resources. Once an emergent behavior condition has been identified, the information can be forwarded to evaluation block 1808 for further processing.

In action 1806, a determination can be performed of alarm conditions that can have an impact on the success of the mission or task by which all entities are striving to accomplish. The impact could be the ability to accomplish individual tasks or the potential for failure of the overall mission by permitting an entity to stay alive. This impact can be determined through Bayesian belief networks, statistical inference engines, or by any other presently developed or future developed inference engine that can ascertain the impact on a particular task if one or more agent is showing incorrect operation or harmful emergent behavior. Once the impact has been determined the information can be passed to evaluation block 1808 for further processing.

Evaluation block 1808 can marshal the incorrect operation identified in action 1802, the emergent behavior in action 1804, or the effect on mission in action 1806 to suggest a course of action that the managed entities should adopt, which in the present arrangement is based on a stay alive signal. The determination of withdrawing or affirming the stay alive signal can be based on the occurrence of one or more of the identified alarmed conditions, or a combination of two or more of the identified alarmed conditions. For example, the stay alive signal could be withdrawn if there is emergent behavior and there would be an effect on the mission. In the alternative, the stay alive signal could be affirmed if there was only emergent behavior, or incorrect operation. Once the evaluation is determined, control can be passed to decision block 1810 for further processing in accordance to the decision made in evaluation block 1808.

In action 1810, if the desired control instruction is to maintain the stay alive signal, control can be passed to action 1708 for further processing. In the alternative, a withdrawal of the stay alive signal can be sent to action 1712 for further processing. Generating a stay alive signal can be equivalent to generating a stay alive signal, affirming a stay alive signal, not withdrawing a stay alive signal, or any other condition that can determine if an entity is to perish or to extinguish unless allowed to continue by another entity. The other entity might be a managing entity since the other entity can determine the outcome (life or death) of an entity.

Figure 19:
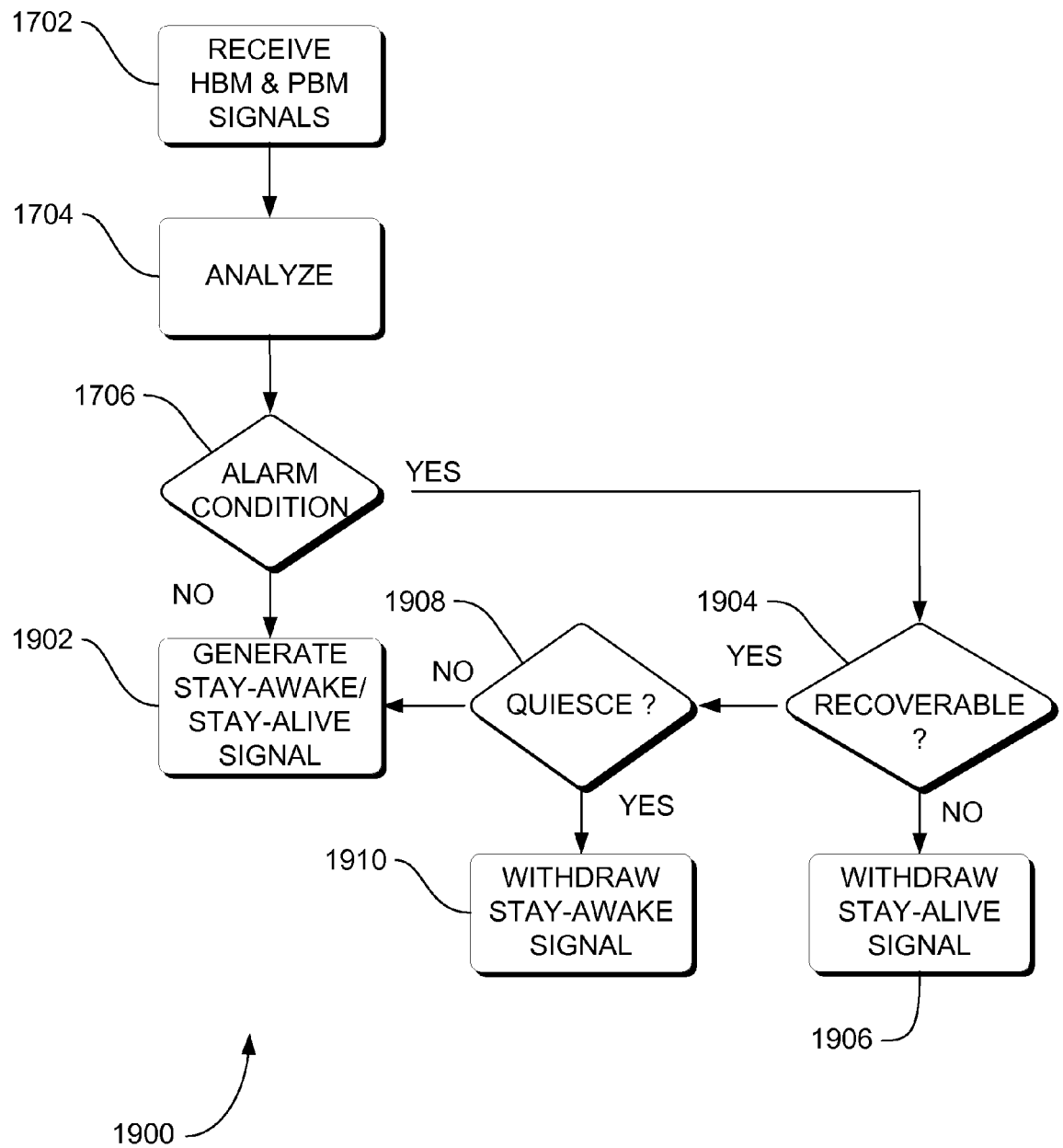
FIG. 19 is a flowchart for a generating stay-alive signal when a warning condition occurs, according to an embodiment.

FIG. 19 is a flowchart of a method 1900 to construct an environment to satisfy increasingly demanding external requirements according to an embodiment where a ruler entity decides to withdraw or generate a stay-awake signal. Method 1900 reduces the possibility that an autonomic element will jeopardize the mission of the autonomic element.

Method 1900 can begin with action 1702 when receiving a signal from a managed entity. Action 1702 can receive a heart beat monitor (HBM) signal and pulse monitor (PBM) signal from a managed entity such as worker entities 1118 or 1120. In some embodiments, the HBM signal is an indication that the managed entity (worker entity) is operating. The HBM can be an "ON/OFF" state signal, an indication that a process is being performed, or any other signal that can convey information that the worker entity is awake or active. The PBM signal can extend the HBM signal to incorporate reflex/urgency/health indicators from the autonomic manager representing its view of the current self-management state. The PBM signal can thus convey the performance and characteristics of the entity in the form of engineering data summarization to add context to the received HBM signal. Engineering data summarization could be a set of abstractions regarding sensors that, in some embodiments, could comprise rise and fall of data by a certain amount, external causes for parameter deviations, actual numerical value of the parameters being summarized, warning conditions, alarm conditions, and any other summarization that would convey the general health of the system. Once the HBM and PBM signals have been received, control can be forwarded to action 1704 for further processing.

In action 1904, an analysis of the HBM and PBM signal can be performed to determine trends and possible areas of concern. The purpose of the analysis can be to determine that a predetermined condition has been exceeded, generate a projection through simulation and data modeling areas of parameters that can lead to the failure of the worker entity or that might jeopardize the assigned mission, and ascertain the quality of performance of the system. The analysis can be performed by sing regression techniques, neural network techniques, statistical techniques, or any other technique that can convey information about the state of a system or emergent behavior of the system. Once the analysis has been performed, control can be passed to action 1706 for further processing.

In action 1706, an alarmed condition can be determined. In action 1706, the analysis of action 1704 can be referenced to determine if there is one or more alarm condition that can trigger the withdrawal of a stay-awake signal. If no alarm conditions are determined, control can be passed to action 1902 to generate a stay-alive signal. In the event that an alarm condition is present, control can be passed to action 1904 for further processing.

In action 1904, a determination can be performed to ascertain if the identified alarmed condition of action 1706 is recoverable by the managed entity such as worker entities 1118 and 1120 of FIG. 11. When an alarmed condition is determined not to be recoverable, control can be passed to action 1712 to withdraw the stay-alive signal. Method 2000 below could be one embodiment of determining 1904 if the identified alarmed condition is recoverable. When an alarmed condition is determined to be recoverable, control can be passed to action 1908 in which a determination can be performed to ascertain if quiescing the managed entity and/or subsequent recovery is possible. When quiescence of the managed entity and/or need for later recovery is determined as not possible, control can pass to action 1902 to generate a stay-awake/stay-alive-signal. When quiesence of the managed entity is determined as possible and/or needed in action 1908, control can pass to action 1910, to withdraw the stay-awake signal. Thus, quiescing the managed entity functionally extracts the managed entity from an environment upon the occurrence of an alarmed condition. Quiescence can be a less encompassing alternative to withdrawing the stay-awake signal of apoptosis. Method 1900 can allow an agent or craft that is in danger or endangering the mission to be put into a self-sleep mode, then later reactivated or self-destructed.

Figure 20:
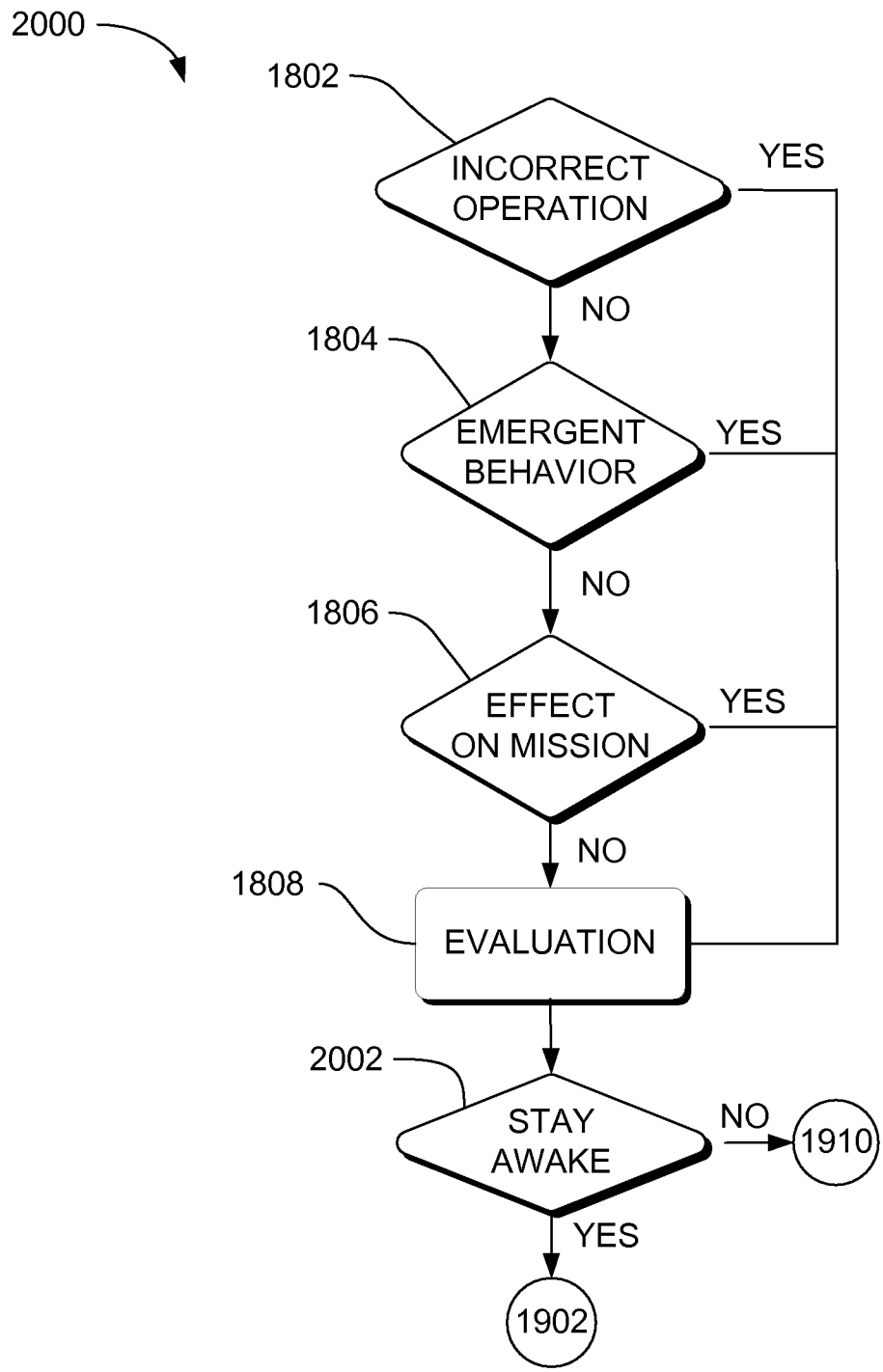
FIG. 20 is a flowchart of a method to construct an environment to satisfy increasingly demanding external requirements, according to an embodiment, where a ruler entity decides to withdraw or generate a stay-awake signal.

FIG. 20 is a flowchart of a method 2000 for ascertaining the recoverability of an alarmed condition determined at action 1904. Method 2000 manages autonomous entities that can be functionally extracted from an environment upon the occurrence of a predetermined condition.

Method 2000 can begin with action 1802 when receiving one or more alarmed conditions. In action 1802, a determination is performed as to whether or not an incorrect operation from the managed system has been identified in action 1704 of FIG. 17. An incorrect operation can range from not initializing sensors to failing to self-heal when internal decision logic recommends as an appropriate cause of action. In action 1802, in addition to determining if an incorrect operation has been identified, the number of devices or processes within the entity that registered an incorrect operation can be ascertained. If at least one incorrect operation is determined, the action can transfer the identity of the unit to evaluation block 1808 for further processing.

In action 1804, there can be a determination of emergent behavior from the managed system that has been identified in action 1704 of FIG. 17. An emergent behavior or emergent property can appear when a number of entities (agents) operate in an environment forming behaviors that are more complex as a collective. The property itself can often be unpredictable and unprecedented and can represent a new level of the system's evolution. This complex behavior in the context of control system can be known as non-linearity, chaos, or capacity limits. The complex behavior or properties cannot be properties of any single such entity, nor can they easily be predicted or deduced from behavior in the lower-level entities. One reason why emergent behavior occurs could be that the number of interactions between autonomic components of a system increases combinatorially with the number of autonomic components, thus potentially allowing for many new and subtle types of behavior to emerge. Nothing can directly command the system to form a pattern, but instead the interactions of each part (entities) to its immediate surroundings can cause a complex process that leads to order. Emergent behavior can be identified based on parameters that give rise to the complex behavior in a system such as demands on resources. Once an emergent behavior condition has been identified, the information can be forwarded to evaluation block 1808 for further processing.

In action 1806, a determination can be performed of alarm conditions that can have an impact on the success of the mission or task which all entities are striving to accomplish. The impact could be the ability to accomplish individual tasks or the potential for failure of the overall mission by permitting an entity to stay awake. This impact can be determined through Bayesian belief networks, statistical inference engines, or by any other presently developed or future developed inference engine that can ascertain the impact on a particular task if one or more agent is showing incorrect operation or harmful emergent behavior. Once the impact has been determined, the information can be passed to evaluation block 1808 for further processing.

Evaluation block 1808 can marshal the incorrect operation identified in action 1802, the emergent behavior in action 1804, and the effect on mission in action 1806 to suggest a course of action that the managed entities should adopt, which in the present arrangement is based on a stay-awake signal. The determination of withdrawing or affirming the stay-awake signal can be based on the occurrence of one or more of the identified alarmed conditions, or a combination of two or more of the identified alarmed conditions. For example, the stay-awake signal could be withdrawn if there is emergent behavior and there would be an effect on the mission. In the alternative, the stay-awake signal could be affirmed if there was only emergent behavior, or incorrect operation. Once the evaluation is determined, control can pass to decision block 2002 for further processing in accordance with the decision made in evaluation block 1808.

In action 2002, if the desired control instruction is to maintain the stay-awake signal, control can be passed to action 1902 for further processing. In the alternative, a withdrawal of the stay-awake signal can be sent to action 1910 for further processing. Generating a stay-awake signal is equivalent to affirming a stay awake signal, not withdrawing a stay awake signal, or any other condition that can determine if an entity is to perish or to extinguish unless allowed to continue by another entity. The other entity could be a managing entity since the other entity can determine the outcome (life or death) of an entity.

Figure 21:
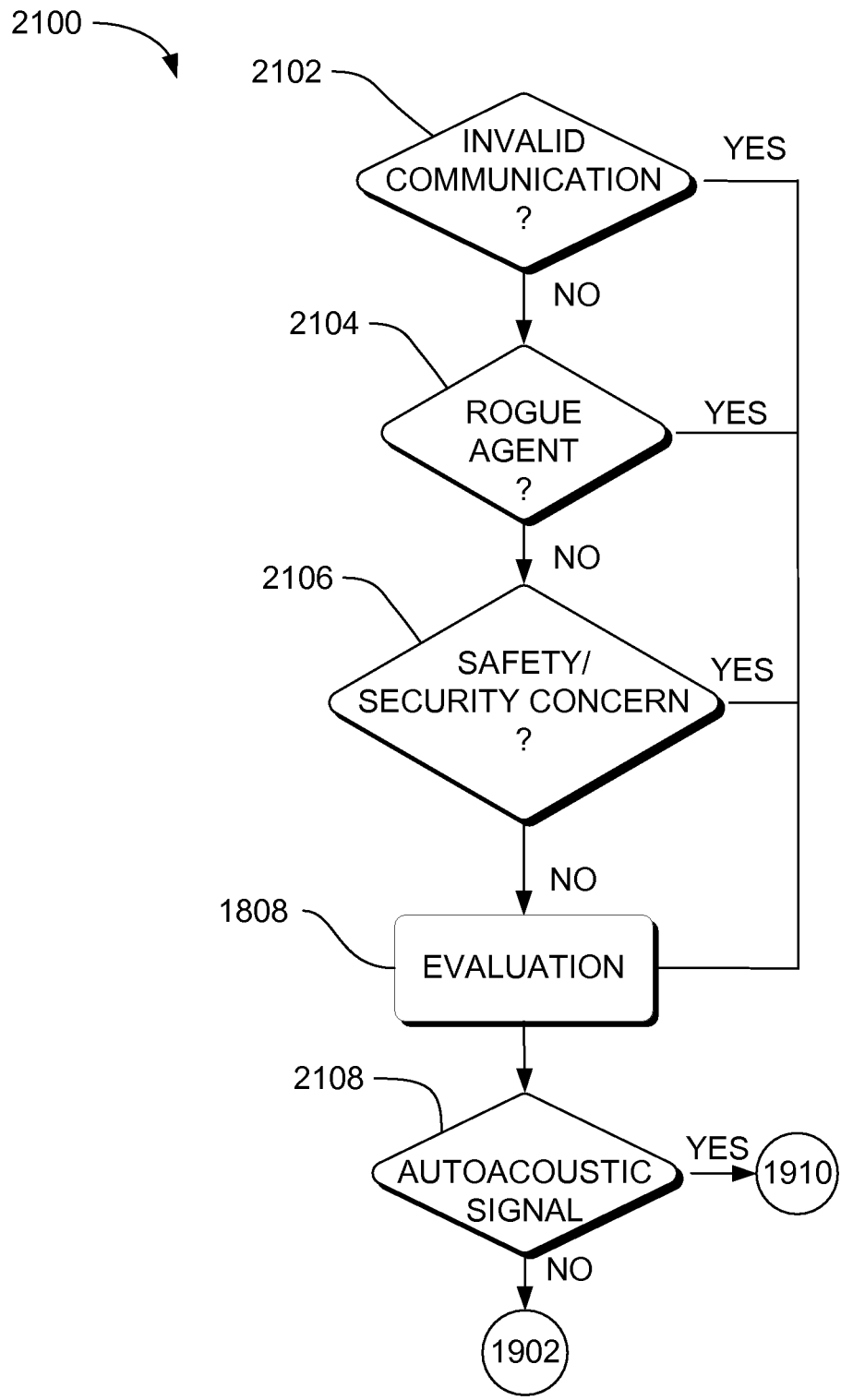
FIG. 21 is a flowchart for generating an otoacoustic signal when a warning condition occurs, according to an embodiment.

FIG. 21 is a flowchart of a method 2100 for ascertaining the recoverability of an alarmed condition determined at action 1904. Method 2100 manages autonomous entities that can be functionally extracted from an environment upon the occurrence of a predetermined condition.

Method 2100 can begin with action 2102 after having received one or more alarmed conditions. In action 2102, a determination is performed as to whether or not an invalid communication from the managed system has been identified in action 1704 of FIG. 17. In action 2102, in addition to determining if an invalid communication has been identified, the number of devices or processes within the entity that registered an invalid communication can be ascertained. If at least one invalid communication is determined, the identity of the unit can be transferred to evaluation block 1808 for further processing. An invalid communication is a communication handshake that doesn't match an expected protocol, such as the "rogue" agent didn't respond in the expected manner, or in the expected time limits, or failed to send a signal in the correct format.

In action 2104, a determination is performed as to whether or not a rogue agent from the managed system that has been identified in action 1704 of FIG. 17. A rogue agent can exist when a number of entities (agents) operate in an environment forming behaviors that are more complex as a collective. One cause of a rogue agent could be that the number of interactions between autonomic components of a system increases combinatorially with the number of autonomic components, thus potentially allowing for many new and subtle types of counterproductive behavior to emerge. Nothing can directly command the system to form a pattern, but instead the interactions of each part (entities) to its immediate surroundings can cause a complex process that leads to order. A rogue agent can be identified based on parameters that give rise to the complex behavior in a system such as demands on resources. Once a rogue agent has been identified, the information can be forwarded to evaluation block 1808 for further processing.

In action 2106, a determination can be performed of safety/security issue/concerns that can have an impact on the success of the mission or task which all entities are configured to accomplish. The impact could be the ability to accomplish individual tasks or the potential for failure of the overall mission by permitting an entity to stay awake. This impact can be determined through Bayesian belief networks, statistical inference engines, or by any other presently developed or future developed inference engine that can ascertain the impact on a particular task if one or more agent is showing invalid communication or harmful rogue age Once the safety/security issue/concern has been determined, the information can be passed to evaluation block 1808 for further processing.

Evaluation block 1808 can marshal the invalid communication identified in action 2102, the rogue agent in action 2104, and the safety/security issue/concern in action 2106 to suggest a course of action that the managed entities should adopt, which in the present arrangement is based on a stay-awake signal. The determination of withdrawing or affirming the stay-awake signal can be based on the occurrence of one or more of the identified alarmed conditions, or a combination of two or more of the identified alarmed conditions. For example, the stay-awake signal could be withdrawn if there is rogue agent and there would be a safety/security issue/concern of the mission. In the alternative the stay-awake signal could be affirmed if there was only rogue agent, or invalid communication. Once the evaluation is determined, control can pass to decision block 2002 for further processing in accordance with the decision made in evaluation block 1808.

In action 2108, if the desired control instruction is not to transmit an otoacoustic signal, control can be passed to action 1902 for further processing. In the alternative, an otoacoustic signal can be sent in action 1910 for further processing. The self managing autonomous system can self-protect from spurious signals or signals generated by a rogue agent that has failed to engage in a satisfactory ALice exchange by generating an otoacoustic signal. An otoacoustic signal is a counteracting signal to the spurious signals or signals generated by a rogue agent that is intended to stop the self managing autonomous system from receiving, or at least from reacting to, these unwanted signals, effectively having an overriding effect or an equalizing effect on any reflex signal received by the self managing autonomous system. In essence, counter-signals can be generated that will render the undesirable signals harmless to the self managing autonomous system. The security and protection of the self managing autonomous system may be improved by the use of the otoacoustic signal. The otoacoustic signal can help ensure that self-managing complex systems operate correctly without human intervention where management by humans is simply not realistic or even feasible.

Generating an otoacoustic signal can be equivalent to affirming an otoacoustic not withdrawing an otoacoustic signal, or any other condition that can determine if an entity is to counteract a spurious signal or signal from a rogue agent. The other entity could be a managing entity since the other entity can determine the outcome (life or death) of an entity.

The present invention may draw inspiration from or have some similarities to the mammalian acoustic or stapedius reflex, although one skilled in the art will recognize that when in danger of exposure to extreme sounds that may damage the ear drum, the mammalian body protects itself. The acoustic reflex, or stapedius reflex, is an involuntary muscle contraction in the middle ear of mammals in response to high-intensity sound stimuli. The mammalian otoacoustic mechanism, called otoacoustic emission, involves the generation of sound from within the inner ear in response to over-activity of the cochlear amplifier. That is, when the body is presented with a sound that is potentially damaging, the inner ear generates a counter-sound, which is benign, and protects the inner ear from hearing it.

In some embodiments, all of the agents, components and apparatus of FIG. 1-6 or 11-16 can detect and/or issue the otoacoustic signal, as long as the agents, components and apparatus are "friendly" (i.e., known not to be rogue) agents. In some embodiments, however, only a coordinating agent, such as ruler NBF 608, can perform method 2100.

Figure 22:
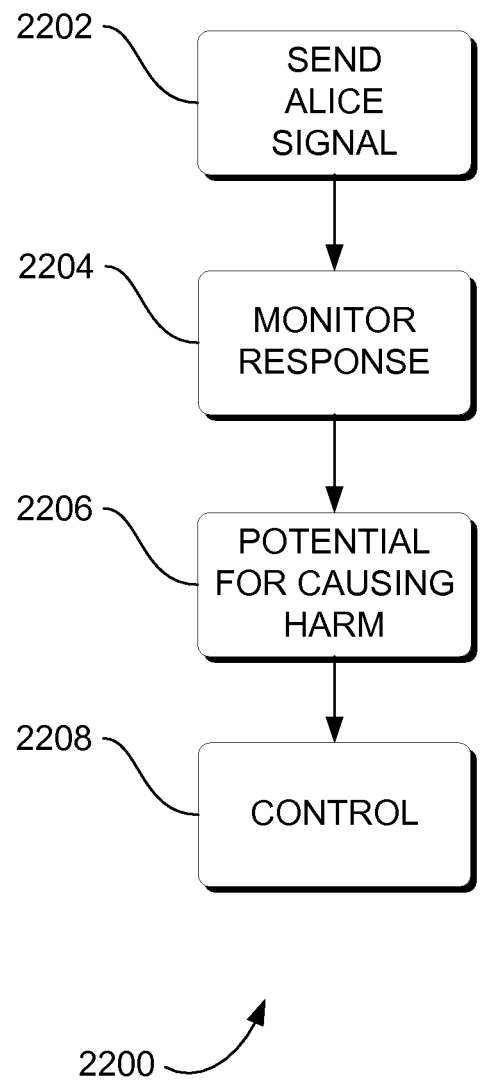
FIG. 22 is a flowchart for interrogating an anonymous autonomic agent, according to an embodiment.

FIG. 22 is a flowchart of a method 2200 for providing security requirements according to an embodiment where a ruler entity decides to withdraw or generate a stay alive signal from an anonymous agent. Method 2200 manages autonomous entities that can be functionally extracted from an environment upon the occurrence of a predetermined condition. Method 2200 can begin with action 2202 where an ALice signal is sent to an anonymous agent to ascertain the potential for harm of the agent to a system as shown in FIG. 22. After the ALice signal has been sent to the agent, control can be passed to action 2204 for further processing.

In action 2204 the response from the agent can be monitored. Monitored as used herein refers to maintaining regular surveillance, or close observation, over an anonymous agent and can include the absence of a signal. For example, not responding with a timeout period is considered, as used herein, as monitor response. After action 2204 is completed, control can be passed to action 2206 for further processing.

In action 2206, the monitored response from action 2204 can be analyzed to determine if the monitored response is in an appropriate format, within a certain timeout period, and with a valid and justified reason for being within the locust of interest or domain of the autonomous system 2204 as shown in FIG. 22. Once the potential for causing harm has been ascertained, control can be passed to action 2208 for further processing.

In action 2208, the system can control the future of the anonymous agent based on the potential for harm to the autonomous system. This mimics the mechanism of cell death in the human (and animal) body, and hence makes use of autonomic and other biologically inspired metaphors. The technique would send self-destruct signals to agents that can be compromised, or which cannot be identified as friendly or as having a right to access certain resources. The concept of the ALice signal is to challenge a mobile, agent to determine if the mobile agent is friendly and to determine if the mobile agent has permission to access certain resources. If the mobile agent fails to identify itself appropriately following an ALice interrogation, the mobile agent can be blocked from the system and given either a self-destruct signal, or its stay alive reprieve is withdrawn. As an alternative to the Alice signal, a quiesce signal, command or instruction can be sent. The quiesce signal is discussed in more detail in conjunction with FIGS. 10, 19 and 20.

Figure 23:
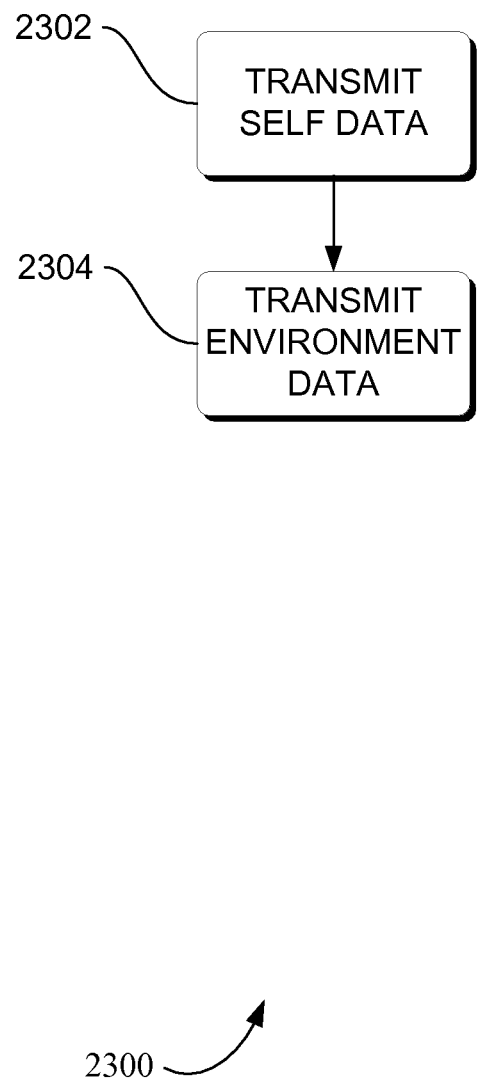
FIG. 23 is a flowchart of a method of autonomic communication by an autonomic element, according to an embodiment.

FIG. 23 is a flowchart of a method 2300 of autonomic communication by an autonomic element. Method 2300 can offer a holistic vision for the development and evolution of computer-based systems that brings new levels of automation and dependability to systems, while simultaneously hiding their complexity and reducing their total cost of ownership.

Method 2300 can include transmitting self health/urgency data 2302. Examples of the self health/urgency data can include information describing low battery power and/or failed sensors. Method 2200 can also include transmitting 2304 environment health/urgency data. Examples of the environment health/urgency data can include information describing inaccessible devices, unauthorized access, and/or an unidentified mobile agent sending communication signals.

Transmitting 2302 and 2304 can be performed in any order relative to each other. For example, in one embodiment the transmitting 2302 self health/urgency data can be performed before transmitting 2304 environment health/urgency data. In another embodiment, transmitting 2304 environment health/urgency data can be performed before transmitting 2302 self health/urgency data. In yet another embodiment, the self health/urgency data can be transmitted simultaneously with the environment health/urgency data. For example, the environment health/urgency data and the self health/urgency data can be transmitted together. One example of transmitting the environment health/urgency data and the self health/urgency data can include encapsulating the environment health/urgency data and the self health/urgency data in a X.25 packet, although one skilled in the art will readily recognize that any number of alternative packet types can be used that fall within the scope of this invention. The environment health/urgency data and the self health/urgency data can be thought of together as the "tub-dub" of a heartbeat in which the two "beats" or two pieces of data are transmitted simultaneously. The X.25 standard is published by the ITU Telecommunication Standardization Sector at Place des Nations, CH-1211 Geneva 20, Switzerland.

An autonomic environment can require that autonomic elements and, in particular, autonomic managers communicate with one another concerning self-* activities, in order to ensure the robustness of the environment. A reflex signal 1620 of FIG. 16 above can be facilitated through the pulse monitor (PBM). A PBM can be an extension of the embedded system's heart-beat monitor, or I-IBM, which safeguards vital processes through the emission of a regular "I am alive" signal to another process with the capability to encode self health/urgency data and environment health/urgency data as a single pulse. HBM is described in greater detail in FIGS. 14 and 21 above. Together with the standard event messages on an autonomic communications channel, this can provide dynamics within autonomic responses and multiple loops of control, such as reflex reactions among the autonomic managers. Some embodiments of the autonomic manager communications (AM/AM) component 1618 can produce a reflex signal 1620 that includes the self health/urgency data and the environment health/urgency data in addition to the HBM. More concisely, the reflex signal can carry a PBM. A reflex signal that carries a PBM can be used to safe-guard the autonomic element by communicating health of the autonomic element to another autonomic unit. For instance, in the situation where each PC in a LAN is equipped with an autonomic manager, rather than each of the individual PCs monitoring the same environment, a few PCs (likely the least busy machines) can take on this role and alert the others through a change in pulse to indicate changing circumstances.

An important aspect concerning the reflex reaction and the pulse monitor is the minimization of data sent—essentially only a "signal" is transmitted. Strictly speaking, this is not mandatory; more information can be sent, yet the additional information should not compromise the reflex reaction.

Just as the beat of the heart has a double beat (lub-dub), the autonomic element's pulse monitor can have a double beat encoded—as described above, a self health/urgency measure and an environment health/urgency measure. These match directly with the two control loops within the AE, and the self-awareness and environment awareness properties.

Figure 24:
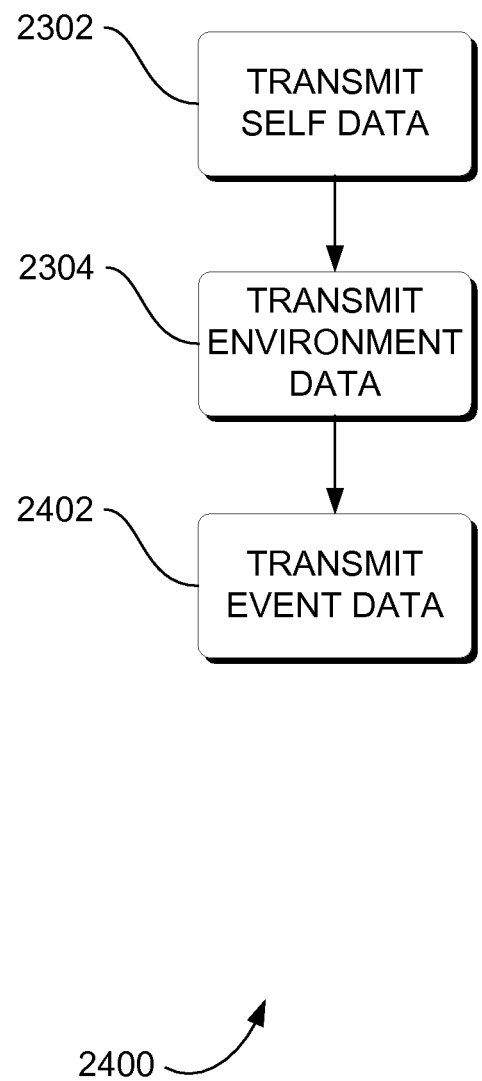
FIG. 24 is a flowchart of a method of autonomic communication by an autonomic element, according to an embodiment.

FIG. 24 is a flowchart of a method 2400 of autonomic communication by an autonomic element. Method 2400 can include transmitting 2402 event message data in addition to the self and environment health/urgency data. Event message data can include data describing a change in condition, or a deviation from a normal operation. Event message data is described in more detail above in FIG. 11.

In some embodiments, the self health/urgency data and environment health/urgency data encoded with the standard event messages on an autonomic communications channel, can provide dynamics within autonomic responses and multiple loops of control, such as reflex reactions among an autonomic manager.

Figure 25:
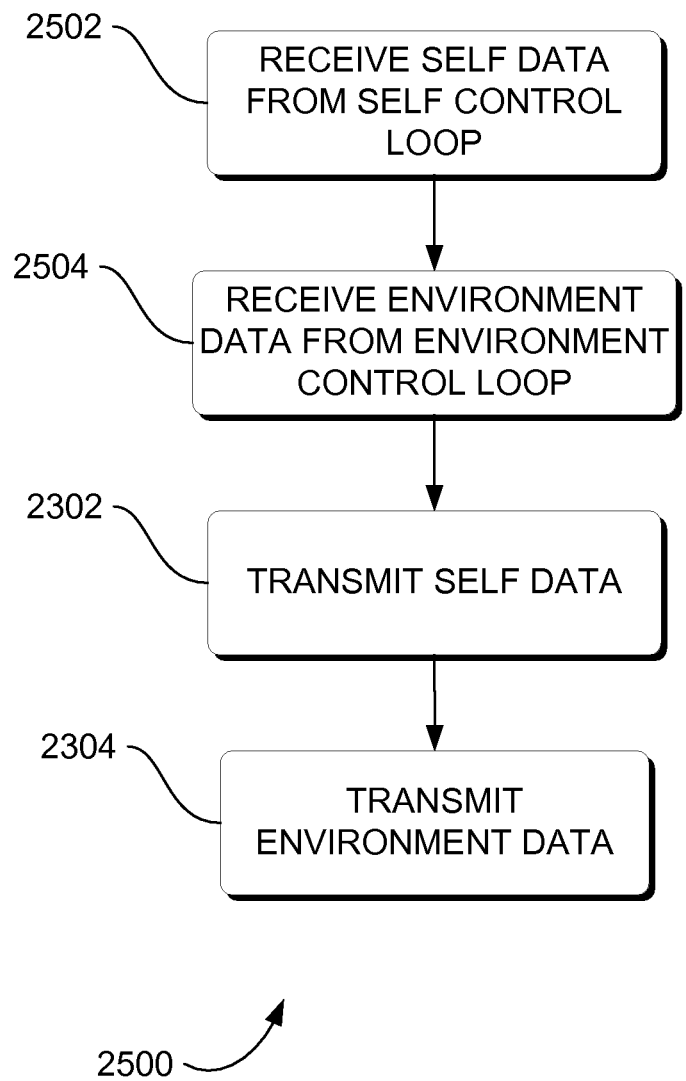
FIG. 25 is a flowchart of a method of autonomic communication by an autonomic element, according to an embodiment.

FIG. 25 is a flowchart of a method 2500 of autonomic communication by an autonomic element. Method 2500 can include receiving 2502 the self health/urgency data from self control loop component of the autonomic element. One example of the self control loop component of the autonomic element can be the self awareness control loop 1614 of the autonomic element 1600 of FIG. 16 above.

Method 2500 can also include receiving 2504 the environment health/urgency data from an environment control loop component of the autonomic element. One example of the environment control loop component of the autonomic element can be the environment awareness control loop 1608 of the autonomic element 1600 of FIG. 16 above.

Figure 26:
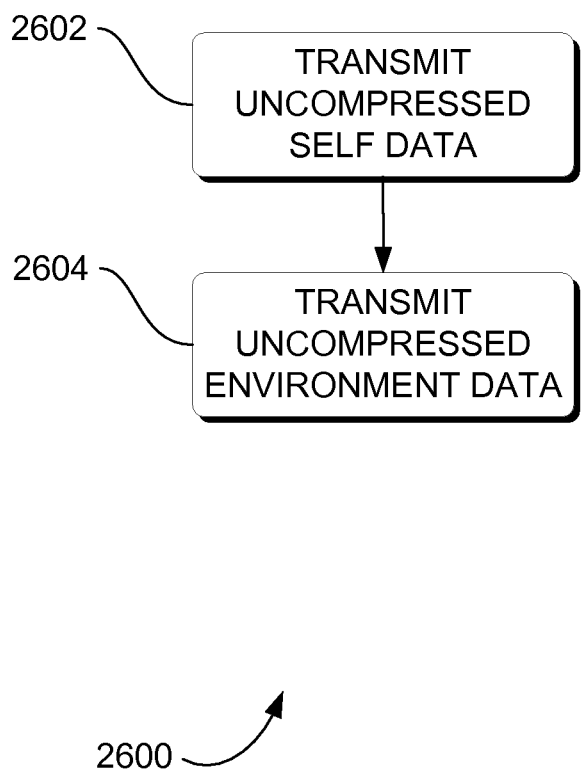
FIG. 26 is a flowchart of a method of autonomic communication by an autonomic element, according to an embodiment.

FIG. 26 is a flowchart of a method 2600 of autonomic communication by an autonomic element. Method 2600 can offer a holistic vision for the development and evolution of computer-based systems that brings new levels of automation and dependability to systems, while simultaneously hiding their complexity and reducing processing delays by systems that receive data from the autonomic element.

Method 2600 can include transmitting uncompressed self heal urgency data 2602. Method 2600 can also include transmitting 2604 uncompressed environment health/urgency data. In the absence of bandwidth concerns, the uncompressed data can be acted upon quickly and not incur processing delays. One important aspect can be that the data, whether uncompressed or sent in some other form, should be in a form that can be acted upon immediately and not involve processing delays (such as is the case of event correlation). Transmitting 2602 and 2604 can be performed in any order relative to each other.

An otoacoustic component of an autonomic unit can render an incoming potentially harmful signal inert. Self-managing systems, whether viewed from the autonomic computing perspective, or from the perspective of another initiative, can offer a self-defense capability that brings new levels of automation and dependability to systems, while simultaneously hiding their complexity and reducing their total cost of ownership.

According to various embodiments, a number of initiatives inspired by concepts from biology have arisen for self-management of a complex system. Biological systems, and in particular, the Autonomic Nervous System (ANS), are capable of performing autonomic, innate or in-built, self-regulation activities requiring no conscious thought. In similar fashion, and according to various embodiments of the present teachings, a software system is provided that manages itself. In some embodiments, the system takes advantage of emergent behavior similar to that in social insect colonies. It has been found that emergent, behavior helps an insect colony to collectively solve complex problems without centralized control. Thus, colony (or swarm) behavior appears out of local interactions between individuals with simple rule sets and no global knowledge. In fact, emergent behavior does not "help" insect colonies in the general sense of the word, but instead it is the coordinated behavior of the social insects that collectively solves problems. What is emergent in this example is coherence and cooperation from a global point of view, where at the level of the individual nothing actively pushes for it.

According to various embodiments, the self-sacrifice behavior of one or more individual components can be absorbed in serving the usefulness or lives of other individual components. Thus, an emergent behavior is provided wherein the individual components sacrifice themselves to jointly solve a complex problem vital to the entire system or swarm. In some embodiments an emergent behavior can be provided by the system whereby one or more components of the system self-sacrifices itself for the greater good of the system. In an example, each component can be programmed to identify at least one condition that would cause the respective component to be detrimental to the greater good of the system. The component could also be programmed to self-sacrifice itself if the condition is determined to exist, thereby benefiting the entire system. As an illustration, such a time-to-self-sacrifice condition can comprise exceeding a risk threshold, for example, a threshold determined by a risk analysis program that is run periodically during operation of the system component. For example, if the continued operation of the component poses a risk of collision with another component of the system, and the risk exceeds a risk threshold, a self-sacrifice operation can be initiated for the greater good of the entire system. Self-sacrifice can comprise, for example, shutting down, self-destruction, or the like. Self-destruction can be, for example, by explosion, by implosion, or be steering into an asteroid, planet, or sun, in the case of a multiple spacecraft system.

According to various embodiments of the present, teachings, an autonomic nano technology swarm (ANTS) system is provided. With the ANTS system, a swarm of small autonomous exploration vehicles, such as spacecraft, can be used for an exploration mission, thus reducing the costs and risks involved when only a single, larger spacecraft is used. The system further enables exploration missions where a single, large, spacecraft would be impractical, and can offer greater redundancy and increased mission longevity in harsh environments. The ANTS system can exhibit all of the features of a multi-agent autonomic system (AS) wherein the spacecraft, vehicles, or system components themselves are autonomic elements (AEs).

According to various embodiments, the software architecture is adaptive in all its attributes and functionality, including its performance, security, fault tolerance, configurability, and the like. Moreover, the system can make decisions to cope with new environmental conditions encountered, and can learn and evolve to become better adapted to what it is supposed to do. Thus, a spacecraft unit can be programmed such that its own self-sacrifice can be used to protect other components or units vital to the system, or programmed to self-sacrifice if the result would be a significant performance gain for the entire system or mission.

In some embodiments, the emergent behavior is a complex behavior derived spontaneously from simple rules. Thus, the emergent behavior can enable the production of a high-level, more complex behavior through the interaction of multiple system components, by following simple rules.

The self-sacrifice behavior described herein differs from the other approaches mentioned above in at least the following ways. Firstly, in some embodiments, "death" is not always assumed for the individual component. Secondly, in some embodiments, self-sacrifice can comprise making a choice of leaving a critical task to another individual component when the individual's own performance is not optimal. These and other advantages are apparent from the present teachings.

According to various embodiments, an autonomic element in a system comprising numerous autonomic elements can exhibit or be programmed to exhibit self-adapting behavior to improve performance and/or to protect vital parts of the system. According to some embodiments, an autonomic element can comprise a spacecraft in an autonomous space mission. According to some embodiments, the spacecraft can comprise an autonomous worker vehicle or component in an autonomous space mission which mission involves using a plurality of different spacecrafts. According to some embodiments, the autonomic space mission can be performed by an ANTS system as described above. According to some embodiments, each spacecraft in the ANTS system can have a specialized mission. According to some embodiments, individual components, such as spacecraft or units in the ANTS system, can be programmed to exhibit emergent self-adapting behavior. An individual spacecraft unit of the system can perform self-sacrifice as part of its self-adapting behavior, in order to improve the system performance and/or to protect vital parts of the system, for example, based on goals of an exploration mission.

According to various embodiments, the system uses Autonomic System Specification Language (ASSL). The ASSL can be used to model the self-sacrifice behavior of the individual spacecraft units. The ASSL can follow simple predefined rules, but can help in the formation of an emergent complex system-level behavior that strives to protect and optimize the system as a whole. It should be understood that by self-sacrifice, "death" is not the only option under consideration for the spacecraft, but rather, in some embodiments another option for self-sacrifice can comprise a voluntary relinquishment from the "social status" of the spacecraft in the swarm. According to some embodiments, the voluntary relinquishment from the "social status" can be achieved by delegating rights from one component to another, for example, from one spacecraft to another spacecraft of the system.

The systems, clients, servers, methods, computer-readable media, software, hardware, and operating environments that can be used include those described in U.S. Patent Applications Publications Nos. US 2007/0073631 A1, entitled "Systems, Methods and Apparatus for Quiescence of Autonomic Systems," and US 2007/0260570 A1, entitled "Systems, Methods and Apparatus for Autonomic Safety Devices," which are incorporated herein in their entireties, by reference.

ANTS Structure

According to various embodiments of the present teachings, an ANTS system is provided for use in a sub-mission Prospecting Asteroids Mission (PAM). The PAM can provide a novel approach to asteroid belt resource exploration. ANTS can provide extremely high autonomy, minimal communication requirements to Earth, and a set of very small explorers with few consumables. In some embodiments, the explorers forming the swarm can be pico-class, low-power, and low-weight spacecraft units, yet capable of operating as fully autonomous and adaptable agents.

Figure 27:
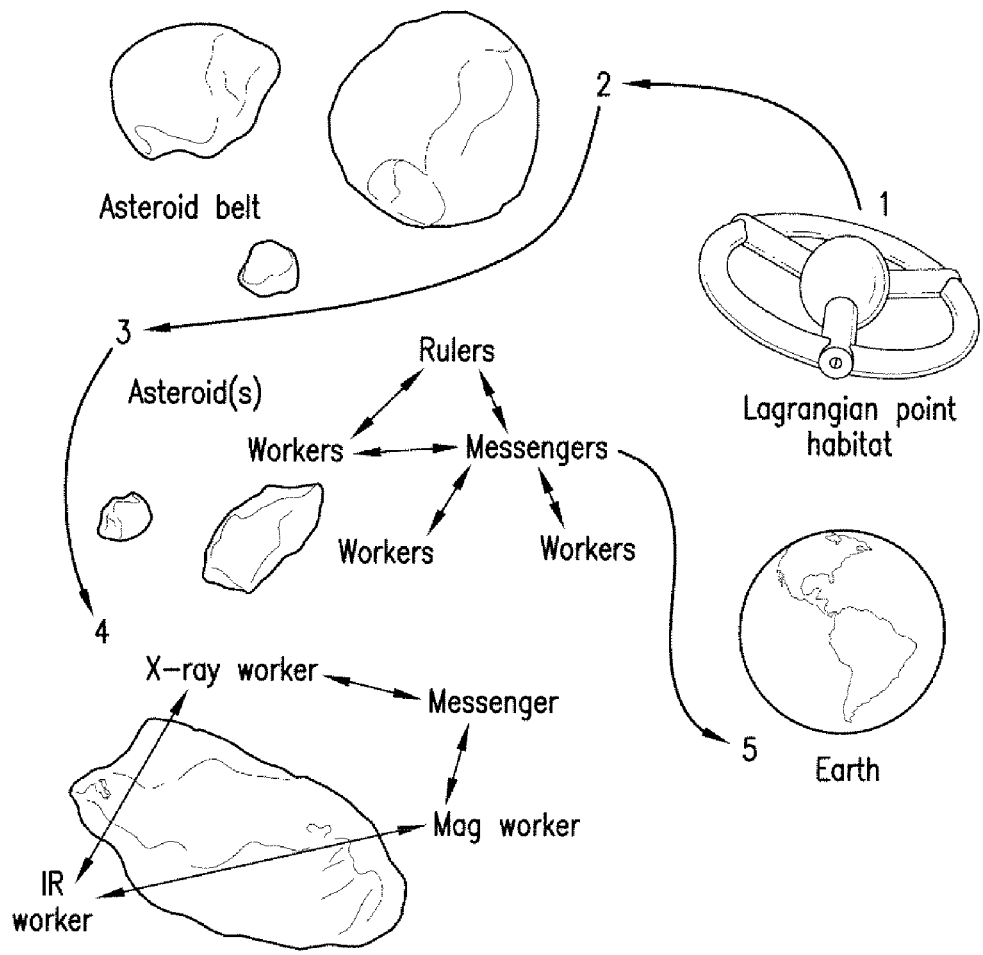
FIG. 27 is a diagram depicting the ANTS concept mission scenario according to various embodiments of the present teachings.

FIG. 27 depicts a PAM sub-mission scenario of the ANTS concept mission, according to various embodiments of the present teachings. As depicted in FIG. 27, a transport spacecraft launched from Earth toward an asteroid belt can carry a laboratory that assembles tiny spacecraft. Once the transport spacecraft reaches a certain point in space where gravitational forces are balanced, termed a Lagrangian, and in this case the L1 Lagrangian point, the transport ship can release the assembled swarm, which can head toward the asteroid belt. Each spacecraft can be equipped with a solar sail and thereby can rely primarily on power from the sun, using, for example, tiny thrusters to navigate independently.

As FIG. 27I shows, there can be at least three classes of spacecraft: coordinating autonomic components (rulers); messenger autonomic components (messengers); and autonomic worker components (workers). By grouping them in appropriate ways, the ANTS system can form teams that explore particular asteroids of the asteroid belt. Hence, the ANTS system can exhibit self-organization since there is no external force directing its behavior and no single spacecraft having a global view of the intended macroscopic behavior. According to some embodiments, the internal organization of the swarm can depend on the global task to be performed and on the current environmental conditions. According to some embodiments, the swarm can consist of several sub-swarms, which can be temporal groups organized to perform a particular task. According to some embodiments, each sub-swarm can have a coordinating group leader (ruler), one or more messengers, and a number of workers each carrying at least one specialized instrument. According to some embodiments, the messengers can connect or provide communications between the team members when such team members cannot connect directly to one another.

Self-Sacrifice Scenarios in ANTS

According to various embodiments, the system can implement self-optimization. In general, the global system optimization can be correlated to the optimization of the individual system elements. Each component of the system improve its performance on-the-fly. For example, in some embodiments rulers can use experience gained to self-optimize. As an example, rulers can use their experience to improve their ability to identify asteroids. In some embodiments, messengers can strive to find the best position to improve communication among the other components or swarm units. According to some embodiments, workers can self-optimize through learning and experience.

Single components can "die" for the good of the entire system or otherwise self-sacrifice, for example, by voluntarily relinquishing their posts. In some embodiments, a spacecraft unit can, for example, voluntarily relinquish its post as an ANTS worker component by delegating tasks to other worker components. While scenarios related to self-sacrifice of ANTS workers are described in great detail herein, it is to be understood that other classes of spacecraft, for example, rulers and/or messengers, can also be configured to self-sacrifice voluntarily.

According to various embodiments, a worker can "die" or sacrifice itself voluntarily. For example, a worker can sacrifice itself voluntarily when the worker cannot continue performing its duties as a worker. As an illustration, a worker can self-sacrifice if it cannot continue to support the service-level objectives assigned to it (for example, if it cannot achieve performance). While operating in space, for example, an instrument of a worker can be damaged but not destroyed. For example, the instrument may still be operational, but its performance might be degraded or destroyed. According to some embodiments, a worker with a destroyed or heavily damaged instrument that performs below a performance minimum, can self-sacrifice voluntarily.

According to some embodiments, the self-sacrifice can comprise a transformation, for example, a transformation of a worker. If a worker cannot perform its duties anymore, due to a damage or instrument loss, the worker can, according to various embodiments, perform one or more operations. The operations can comprise, for example, asking the ruler to assign a new replacement worker, and/or striving to transform into another category of component useful to the swarm unit. Such transformation can comprise, for example, transforming from a worker to a messenger, from a messenger to a worker, from a worker to a ruler, or the like. According to some embodiments, a worker can try to transform to a ruler or a messenger, but if it is not possible for the worker to transform to a ruler or messenger, the worker can instead transform to a shield component such as a stand-by shield. According to some embodiments, such a shield component can sail nearby and strive to protect the replacement worker from different hazards. For example, a shield unit can, according to some embodiments, take the impact of an incoming small asteroid which is about to hit the replacement worker. The shield unit does not have to spend additional time and resources to recover from this probable impact. This kind of protection can comprise a complete self-sacrifice because the shield unit can serve as such until its full destruction, while increasing the overall performance of the system.

According to various embodiments, the self-sacrifice operation can comprise a self-destruction operation. According to some embodiments, when a worker is damaged so badly that it cannot move anymore, the worker can self-destruct, for example, by exploding. This can be used to avoid the risk of collision with another component of the system. Hence, there can be a real self-sacrifice that indirectly leads to higher system performance, due to the reduction in the risk of an impact.

According to various embodiments, the self-sacrifice behavior of a single component, such as a spacecraft unit in an ANTS system, can be modeled with Autonomic System Specification Language (ASSL). With ASSL, validation and code generation of specified instructions can be achieved. According to various embodiments, the ASSL can be defined through formalization tiers. According to some embodiments, over the formalization tiers, ASSL can provide a multi-tier specification model that is designed to be scalable and to expose a judicious selection and configuration of infrastructure elements and mechanisms needed by an AS. ASSL can define an AS with interaction protocols and AEs, where the ASSL tiers and their sub-tiers describe different aspects of the AS under consideration, like policies, communication interfaces, execution semantics, actions, and the like.

According to various embodiments, the ASSL tiers and their sub-tiers, as shown in FIG. 28, can be abstractions of different aspects of the autonomic system under consideration. According to some embodiments, the AS Tier can specify an AS in terms of service-level objectives (AS SLO), self-management policies, architecture topology, actions, events, and metrics. According to some embodiments, the AS SLO can be a high-level form of behavioral specification that establishes system objectives such as performance. According to some embodiments, the self-management policies of an AS can include: 1) self-configuring; 2) self-healing; 3) self-optimizing; and 4) self-protecting (also referred to herein as a self-CHOP of an AS). Other self-management policies can also or instead be included. According to some embodiments, the metrics can constitute a set of parameters and observables controllable by the AEs.

According to various embodiments, at the AS Interaction Protocol tier, the ASSL framework can specify an AS-level interaction protocol (ARP). According to some embodiments, ASIP can be a public communication interface, expressed as communication channels, communication functions, and messages.

According to various embodiments, at the AE Tier, the ASSL formal model considers AEs to be analogous to software agents able to manage their own behavior and their relationships with other AEs. According to some embodiments, at the AE Tier, ASSL can describe the individual AEs.

According to various embodiments, a worker's self-sacrifice behavior can be modeled with ASSL. It should be understood that the model presented and described herein is exemplary only.

According to various embodiments, the self-sacrifice behavior can comprise a self-management policy, which can be specified at the individual component or spacecraft level (at the AE Tier). FIG. 28 presents a partial specification of a self-sacrifice policy that can be used according to various embodiments based on the scenarios described herein. FIG. 28 describes possible choices a worker can make when the worker is no longer minimally or fully operational. According to various embodiments, the definitions that follow can be used to specify exemplary the self-sacrifice policies.

Self-sacrifice can be defined as a self-management policy structure. A set of fluents and mappings can be used to specify this policy. With fluents, specific situations can be expressed, in which the policy is interested. With mappings, the situations can be mapped to actions.

Actions can be defined as a set of actions that can be undertaken by the worker in response to certain conditions, and according to that policy, as shown in FIG. 29.

Events can be defined as a set of events that initiate fluents and can optionally be prompted by actions according to that policy.

Metrics can be defined as a set of metrics needed by that policy.

According to various embodiments, the unableToExplore fluent, shown in FIG. 28, can take place when the worker is no longer operational, due to, for example, heavy damage or instrument loss. The fluent can be initiated by an instrIsNonfunctional event and can terminate if one of the events canBeRuler, canBeMessenger, canBeShield, or mustBeDestroyed occurs. In some embodiments, this fluent can be mapped to a checkTransformation action that checks for a possible worker transformation and triggers one of the triggering events that terminate the current fluent. According to some embodiments, each of the terminating events can initiate a new fluent respectively. According to some embodiments, the "transform" fluents, shown in FIG. 28, can be mapped to "transformTo" actions, exemplary portions of which are presented in FIG. 29. The mapping can transform the worker into a ruler, a messenger, or a shield, according to the example shown. As specified, the transformation attempts can be hierarchically related. Thus, when possible, the transformation process can start with a transformation into a ruler or into a messenger, and then, in case of failure, the algorithm can attempt to perform a transformation into a shield. According to some embodiments, at the end of the hierarchically ordered transformations, self-destruction of the worker can be performed, in case none of the transformations is successful. A self-destruction device can be included in or on the component, for example, an explosive charge and appropriate detonation circuitry mounted in a spacecraft.

According to various embodiments, ASSL can allow specification of systems evolving over time. According to some embodiments, the evolution of such systems can take place in the actions of the system. According to some embodiments, via a finite set of change, remove, add, and create statements, the actions of the system can prompt changes in the tiers and sub-tiers of the AS under consideration.

FIG. 30 presents a partial specification of some of the actions which can be needed by the self-sacrifice policy. It should be understood that, the "transformTo" actions can change the service-level objectives (SLO) of the worker under consideration. According to some embodiments, these actions can be used to re-specify the component or unit in accordance with the new SLO. According to some embodiments, the transformToShield action can first remove the old worker SLO specifications and next create the new shield SLO, as shown in FIG. 3, thus avoiding contradictions between both worker and shield SLO. It should be understood that while the add statements in FIG. 3 are only partially their use in a more complex algorithm would be apparent to those skilled in the art given the present teachings.

According to some embodiments, the transformToShield action can turn off the other worker's self-management policies to avoid contradictions between both worker and shield SLO. According to some embodiments, the transformToShield action can turn off the other worker's self-management policies via four change statements, which set the SWITCH flag of the self-management policies to OFF.

In some embodiments, the physical transformation can be accomplished by the IMPL routine doShieldTransformation. The IMPL clause states "for further implementation". This means that the ASSL framework will generate doShieldTransformation as an empty routine for manual implementation.

While spacecraft have been exemplified herein as the system components, it is to be understood that other systems and components are also within the scope and spirit of the present teachings. Systems comprising deep sea exploration components, land-based exploration components, atmospheric-based exploration components, or other exploration vehicles, should also be considered to be within the realm of the present teachings.

According to the present teachings, a self-managing computer system has been developed based on autonomic computing. The autonomic computing system is analogous to the biological nervous system, which automatically maintains homeostasis (metabolic equilibrium) and controls responsiveness to external stimuli. For example, most of the time a human is not consciously aware of its breathing rate or how fast its heart is beating, although if the human touches a sharp knife with its finger the result is a reflex reaction to move the finger out of danger. If the human cuts itself and starts bleeding, the wound can be treated and the human can then carry on without thinking about it, although pain receptors will induce self-protection and self-configuration to use the other hand. Yet, often the cut will have caused skin cells to be displaced down into muscle tissue. If the cells survive and divide, they have the potential to grow into a tumor. The human body's solution to this situation is cell self-destruction. There is mounting evidence that some forms of cancer are the result of cells not dying fast enough, rather than multiplying out of control, as previously thought.

Figure 31A:
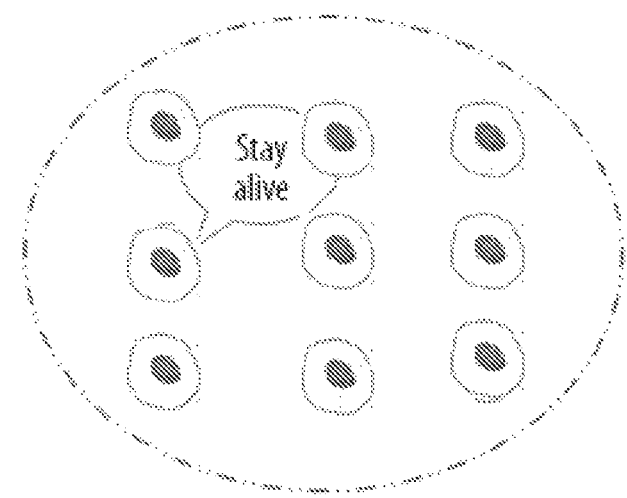
FIG. 31A is a schematic diagram showing a biological system wherein, when a cell constantly receives "stay alive" signals, it turns off its programmed self-destruct sequence, similar to various embodiments of the present teachings.
Figure 31B:
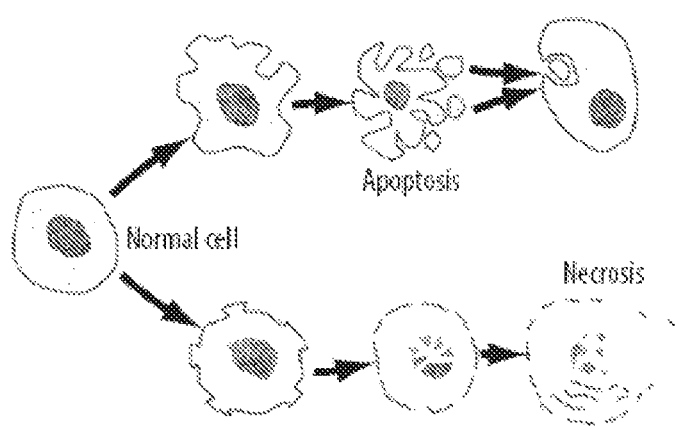
FIG. 31B is a schematic diagram showing a comparison between biological apoptosis and biological necrosis due to an injury.

Biologists believe that cells are programmed to commit suicide through a controlled process known as apoptosis. The term is derived from the Greek word for "to fall off," in reference to dead leaves falling from trees in autumn. Likewise, cells "fall off" living organisms and die. As FIG. 31 shows, a cell's constant receipt of "stay alive" signals turns off the self-destruct sequence. Biological apoptosis is shown in FIG. 31A, which shows that when a cell constantly receives "stay alive" signals it turns off its programmed self-destruct sequence. FIG. 31B, on the other hand, shows apoptosis versus necrosis due to an injury. When these signals cease, the cell starts to shrink, internal structures decompose, and all internal proteins degrade; thereafter, the cell breaks into small, membrane-wrapped fragments to be engulfed by phagocytic cells for recycling. FIG. 31B contrasts apoptosis, also known as "death by default," with necrosis, which is the unprogrammed death of a cell due to injury, inflammation, and the accumulation of toxic substances.

Autonomic Agents

Autonomic computing can depend on many disciplines for its success, including, for example, research in agent technologies. There are no assumptions that an autonomic architecture must use agents, but agent properties complement the objectives of the paradigm. The properties that can be utilized in forming an autonomic computing system according to the present teachings can include, for example, adaptability, autonomy, cooperation, and the like. In addition, complex systems can be formed with multiple agents, and in such embodiments, the systems can comprise inbuilt redundancy and greater robustness, and can be retrofitted in legacy systems with autonomic capabilities that may benefit from an agent-based approach.

Referring back to FIG. 16, an autonomic computing system is shown according to the present teachings, which comprises a basic autonomic element (AE) that consists of a managed component (MC) and an autonomic manager (AM). The AM can be a stationary agent, for example, a self-managing cell that contains functionality for measurement and event correlation and provides support for policy-based control. The AMs can communicate through an autonomic channel via means such as self-* event messages. The AM↔AM communications module includes heartbeat monitoring and pulse monitoring.

Mobile agents can be utilized in the autonomic systems of the present teachings. Their ability to reduce network load, overcome network latency, encapsulate protocols, execute asynchronously and autonomously, adapt dynamically, reflect natural heterogeneity, and maintain robustness and fault tolerance, can make it easier for AMs within different systems to cooperate.

Apoptosis in Agent-Based Autonomic Environments

In Greenberg et al., "Mobile Agents and Security," *IEEE Comm. Magazine*, Jul. 1998, pp. 76-85, agent destruction to facilitate security in mobile-agent systems is described, and the publication is incorporated herein in its entirety by reference. The article describes a scenario in which mobile agents—not rogue agents, but instead ones carrying proper authenticated credentials—carried out work that was out of context rather than the result of abnormal procedures or system failure. In this circumstance, the mobile agents could cause substantial damage. For example, the mobile agents could deliver an archaic upgrade to part of a network operating system, bringing down the entire network. These and other misuses involving mobile agents can occur in several forms. Agents can accidentally or unintentionally misuse hosts due to, say, race conditions or unexpected emergent behavior in those agents. In addition, external bodies acting upon agents, either deliberately or accidentally, can lead to their misuse by hosts or other agents. Misuses can result, for example, due to damage, breaches of privacy, harassment, social engineering, event-triggered attacks, or compound attacks.

Encryption can prevent situations in which portions of an agent's binary image could be copied when visiting a host, for example, portions such as monetary certificates, keys, information, and the like, Agent execution, however, requires decryption, which provides a window of vulnerability. This situation is analogous to the body's vulnerability during cell division.

Figure 32:
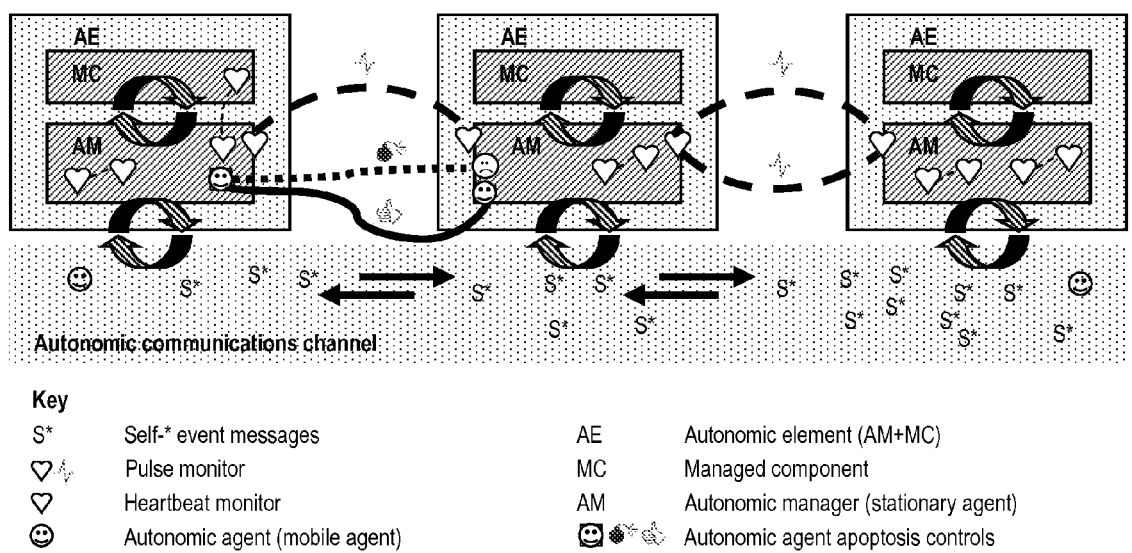
FIG. 32 is a schematic diagram of a high-level view of a simple autonomic environment with three autonomic elements (AEs), exemplifying various embodiments of the present teachings.

FIG. 32 shows a high-level view of a simple autonomic environment with three autonomic elements (AEs). It is to be understood, however, that systems having hundreds, thousands, or even millions of AEs are within the scope of the present teachings. Each AE shown in FIG. 32 is an abstract view of FIGS. 31A and 31B, and in this case the MCs represent self-managing computer systems. These AEs can have many other lower-level AEs, for example, an autonomic manager for the disk drive, while at the same time residing within the scope of a higher-level AM such as a system-wide local area network domain's AE. In various embodiments, the self-managing computer systems can comprise and autonomic and apoptotic cloud computing system, an autonomic and apoptotic grid computing system, an autonomic and apoptotic highly distributed computing system, a combination thereof, or the like.

Within each AM, heartbeat monitors (HBMs) send "I am alive" signals to ensure the continued operation of vital processes in the MC and to immediately indicate if any fail. The AM has a control loop that continually monitors and adjusts, if necessary, metrics within the MC, yet vital processes in the MC can also be safeguarded by an HBM that emits a heartbeat signal as opposed to its being polled by the AM, avoiding lost time (time to next poll) by the AM to notice a failure. Note that in FIG. 32 the left-hand AE has an HBM between the AM and a process on the MC. Because each AM is aware of its MC's health via the continuous control loop, it can share this information by sending a pulse signal ("I am un/healthy") to another AM, for example, from the left-hand AE to the middle AE as shown in FIG. 32. This not only allows self-managing options if the machines are, for example, sharing workload as a cluster, but also protects the AM itself as the pulse signal also acts as an HBM signal from one AM to another. Thus, if an AE's vital process fails, the neighboring AM will immediately become aware of it and, for example, try to restart the failed AE or initiate a failover to another AM. This pulse signal can also act as a reflex signal between AMs warning of an immediate incident, which is a more direct solution than having the AM process numerous event messages to eventually determine an urgent situation.

Because AMs also monitor the external environment (the second control loop), they have a view of the health of their local environment. They can encode such information into the pulse signal along with self-health data (just as our hearts have a double beat). The double-pulse signals between the right-hand and center AEs in FIG. 32 represent this situation.

In some embodiments, AMs can dispatch mobile agents to work on their behalf, for example, to update a set of policies. To help provide self-protection in these situations, AMs can send apoptosis signals ("stay alive/self-destruct") to such agents by either authorizing continued operation or by withdrawing such authorization. An example of when authorization for continued operation can be withdrawn can include, for instance, when policies become out of date. FIG. 32 depicts both scenarios.

The absence of a "stay alive" signal resulting in agent self-destruction can be referred to as strong apoptotic computing, or programmed death by default, while weak apoptotic computing can involve an explicit self-destruct signal. The differences in these approaches are subtle but important. Only a built-in default death can guarantee true system safety. For example, you would never rely on a self-destruct signal getting through to an agent containing system password updates in a hostile environment. Likewise, a robot with adaptive capabilities could learn to ignore such a signal. Not all circumstances require a death-by-default mechanism, however, many researchers using programmed death under the apoptosis descriptor can use programmed death by default.

There is a concern that denial-of-service attacks could prevent "stay alive" signals from reaching their target and thereby induce unintentional agent self-destruction. DoS attacks could likewise interrupt terminate signals, resulting in potentially dangerous scenarios. DoS-immune architectures can thus be useful in the self-managing systems of the present teachings.

Swarm Space Exploration Systems

Space exploration missions by necessity have become increasingly autonomous and adaptable. To develop more self-sustainable exploration systems, the present teachings provide the use of biologically inspired swarm technologies. Swarms of small spacecraft are used and offer greater redundancy, greater protection of assets, lower costs, lower risks, and the ability to explore more remote regions of space, when compared to a single large craft. Such a new space exploration paradigm calls for missions involving many, for example, thousands of, small spacecraft rather than a single large craft.

The Autonomous NanoTechnology Swarm mission, a.k.a. ANTS, (http://ants.gsfc.nasa.gov), is a collaboration between NASA's Goddard Space Flight Center and its Langley Research Center, and exploits swarm technologies and artificial intelligence (AI) techniques to develop revolutionary architectures for both space craft and surface-based rovers. ANTS consists of several submissions: the Saturn Autonomous Ring Array (SARA); the Prospecting Asteroid Mission (PAM); and the Lander Amorphous Rover Antenna (LARA).

The Saturn Autonomous Ring Array consists of a swarm of 1,000 pico-class spacecraft, organized as 10 subswarms with specialized instruments, to perform in situ exploration of Saturn's rings to better understand their constitution and how they were formed. SARA uses self-configuring structures for nuclear propulsion and control as well as autonomous operation for both maneuvering around Saturn's rings and collision avoidance.

The Prospecting Asteroid Mission (PAM) also involves 1,000 pico-class spacecraft but with the aim of exploring the asteroid belt and collecting data on particular asteroids of interest for potential future mining operations.

The Lander Amorphous Rover Antenna (LARA) implements new NASA-developed technologies in the field of miniaturized robotics, to form the basis of remote lunar landers launched from remote sites, as well as offering innovative techniques to allow rovers to move in an amoeboid fashion over the moon's uneven terrain.

The ANTS architecture emulates the successful division of labor exhibited by low-level social-insect colonies. In such colonies, with sufficiently efficient social interaction and coordination, a group of specialists usually outperforms a group of generalists. To accomplish their specific mission goals, ANTS systems likewise rely on large numbers of small, autonomous, reconfigurable, and redundant worker craft that act as independent or collective agents. The architecture is self-similar in that ANTS system elements and subelements can be structured recursively, and it is self-managing, with at least one ruler (AM) per ANTS craft. An exemplary system is shown in FIGS. 27-30.

NASA missions such as ANTS provide a trusted private environment, eliminating many agent security issues and enabling system designers to focus on ensuring that agents are operating in the correct context and exhibiting emergent behavior within acceptable parameters.

In considering the role of the self-destruct property inspired by apoptosis, suppose one of the worker craft in the ANTS mission was operating incorrectly and, when coexisting with other workers, was causing undesirable emergent behavior and failing to self-heal correctly. That emergent behavior could put the mission in danger, and ultimately the ruler would withdraw the "stay alive" signal. Likewise, if a worker or its instrument was damaged, either by colliding with another worker or (more likely) an asteroid, or during a solar storm, the ruler would withdraw the "stay alive" signal and request a replacement worker. Another worker would then self-configure to take on the role of the lost worker to ensure optimal balanced coverage of tasks to meet the scientific goals. If a ruler or messenger was similarly damaged, its ruler would withdraw the "stay alive" signal and promote a worker to play its role.

The majority of these applications fall into the weak apoptotic computing (programmed death) category, and would likely benefit from, instead, utilizing a strong (programmed death by default) approach. They also highlight a strong need for standards and trust requirements, and a DoS-resistant architecture.

The human body regulates vital functions such as heartbeat, blood flow, and cell growth and death, all without conscious effort. The present teachings provide computer-based systems that can perform similar operations on themselves without constant human intervention.

The apoptotic computing applications of the present teachings have been developed for data objects, highly distributed systems, services, agent systems, and swarm systems. According to some embodiments, the entire computer-based system is autonomic. In some cases, the entire system can be apoptotic. The apoptotic controls can cover all levels of human-computer interaction from data, to services, to agents, to robotics. With recent headline incidents of credit card and personal data losses by organizations and governments, and scenarios once relegated to science fiction becoming increasingly possible, programmed death by default can be a useful tool toward securing such systems.

In some embodiments, the autonomous computer-based systems and robots undergo tests, similar to ethical and clinical trials for new drugs, before they are used. Emerging research from apoptotic computing can be used to guide the safe deployment of such systems.

According to various embodiments of the present teachings, the properties of the autonomic, or self-managing, computing system include four objectives that represent broad system requirements, and four attributes that identify basic implementation mechanisms. These objectives and requirements are described, for example, in Sterritt, "Towards Autonomic Computing: Effective Event Management," *Proc. 27th Ann. IEEE/NASA Software Eng. Workshop* (SEW 02), IEEE CS Press, 2002, pp. 40-47, and in Sterritt et al., "Autonomic Computing—A Means of Achieving Dependability?" *Proc. 10th IEEE Int'l Conf. and Workshop Eng. of Computer-Based Systems* (ECBS 03), IEEE CS Press, 2003, pp. 247-251, both of which are incorporated herein in their entireties by reference.

According to various embodiments, the autonomic system can have the following objectives: self-configuration; self-healing; self-optimization; and self-protection. By self-configuration, what is meant is that the system can be able to readjust itself automatically, either to support a change in circumstances or to assist in meeting other system objectives. By self-healing, what is meant is that, in a reactive mode, the system can effectively recover when a fault occurs, identify the fault, and, when possible, repair it. In a proactive mode, self-healing can entail a system configured to monitor vital signs to predict and avoid health problems; or to prevent vital signs from reaching undesirable levels. By self-optimization, what is meant is the system can measure its current performance against a known optimum, and can carry out defined policies for attempting improvements. Self-optimization can also encompass a system configured to react to a user's policy changes within the system. By self-protection, what is meant is that the system can defend itself from accidental or malicious external attacks, which requires an awareness of potential threats and the means to manage them.

According to various embodiments of the present teachings, these self-managing objectives can be achieved be configuring the system to be: self-aware, that is, aware of its internal state; self-situated, that is, aware of current external operating conditions and context; self-monitoring, that is, able to detect changing circumstances; and self-adjusting, that is, able to adapt accordingly. Thus, the autonomic systems of the present teachings can be aware of its available resources and components, their ideal performance characteristics, and current status. The system can also be aware of interconnection with other systems, as well as rules and policies for adjusting as required. The system can also operate in a heterogeneous environment, for example, by relying on open standards to communicate with other systems.

According to various embodiments, these mechanisms do not exist independently. For example, to successfully survive an attack, the system can exhibit self-healing abilities, with a mixture of self-configuration and self-optimization. This not only ensures the system's dependability and continued operation but also increases self-protection from similar future attacks. The self-managing mechanisms can also ensure minimal disruption to users.

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations. For example, although described in procedural terms, one of ordinary skill in the art will appreciate that implementations can be performed in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all environments and alternate technologies which provide the same functionality as described herein.

What is claimed is:

1. A non-transitory computer-accessible medium in a first autonomic computing device, the computer-accessible medium having executable instructions of autonomic communication, the executable instructions capable of directing a processor of the first autonomic computing device to perform:
   receiving a quiesce instruction from a second autonomic computing device; and
   invoking a function of a quiesce component of the first autonomic computing device, wherein the function of the quiesce component comprises deactivating the first autonomic computing device, and then, if the first autonomic computing device does not receive a stay-alive reprieve signal after a predetermined period of time, the first autonomic computing device self-destructs.

2. The non-transitory computer-accessible medium of claim 1, wherein the autonomic computing device comprises a plurality of processors.

3. The non-transitory computer-accessible medium of claim 1, wherein the executable instructions are capable of directing the processor of the first autonomic computing device to transmit environment health/urgency data and then subsequently transmit self health/urgency data.

4. The non-transitory computer-accessible medium of claim 1, wherein the executable instructions are capable of directing the processor of the first autonomic computing device to transmit environment health/urgency data and simultaneously transmit self health/urgency data.

5. The non-transitory computer-accessible medium of claim 1, wherein the executable instructions are capable of directing the processor of the first autonomic computing device to transmit environment health/urgency data and self health/urgency data together.

6. An autonomic computing device, the autonomic computing device comprising:
   a self-monitor that is operable to receive information from sensors and operable to monitor and analyze the sensor information and access a knowledge repository;
   a self-adjuster operably coupled to the self-monitor in a self control loop, the self adjuster operable to access the knowledge repository, the self adjuster operable to transmit data to effectors, and the self adjuster operable to plan and execute; an environment-monitor that is operable to receive information from the sensors and operable to monitor and analyze the sensor information and access the knowledge repository; an autonomic manager communications component operably coupled to the environment-monitor in an environment control loop, the autonomic manager communications component being operable to access the knowledge repository, and to produce and transmit a pulse monitor signal, the pulse monitor signal including a heart beat monitor signal and a reflex signal, the reflex signal including self health/urgency data and environment health/urgency data; and a quiescing component operably coupled to the self-monitor, the quiescing component receiving a quiescence instruction from another autonomic computing device, the quiescing component withdrawing a stay-awake signal, if the first autonomic computing device does not receive a stay-alive reprieve signal after a predetermined period of time, the first autonomic computing device self-destructs.

7. The autonomic computing device of claim 6, wherein the autonomic computing device further comprises a plurality of processors.

8. A method for managing a first computing device based on a functioning state and an operating status of the first computing device, the method comprising:

receiving a quiesce instruction from a second computing device;

invoking a function of a quiesce component of the first computing device, wherein the function of the quiesce component comprises deactivating the first computing device, and then, if the first computing device does not receive a stay-alive reprieve signal after a predetermined period of time, the first computing device self-destructs; and generating one or more stay-awake signals based on the functioning state and operating status of the first computing device.

9. The method of claim 8, wherein the generating one or more stay-awake signal is based on processing received signals from the first computing device indicative of functioning state and operating status to obtain an analysis of the condition of the first computing device.

10. The method of claim 8, wherein the functioning state of the first computing device comprises one or more on signals, off signals, active signals, and inactive signals.

11. The method of claim 8, wherein the operating status of the first computing device comprises an event condition, and the event condition comprises an incorrect operation, an emergent behavior, a failure to perform self healing, or a likelihood of jeopardizing primary objectives.

12. An autonomic system, the autonomic system comprising:

a plurality of autonomic computing devices performing one or more programmed tasks;

a coordinating autonomic computing device for assigning programmed tasks and for issuing instructions to the plurality of autonomic computing devices; and a messenger autonomic computing device for facilitating communication among the coordinating autonomic computing device, plurality of autonomic computing devices, and a remote system; wherein one or more programmed tasks performed by the plurality of autonomic computing device is generating signals indicative of functional state and operating status; wherein the coordinating autonomic computing device based on the generated signals emits a stay-awake signal to one or more of the plurality of autonomic computing devices, and then, if the at least one autonomic computing device does not receive the stay-awake signal after a predetermined period of time, the at least one autonomic computing device self-destructs, and wherein the coordinating autonomic computing device emits a quiesce signal, based on the generated signals, to one or more of the plurality of autonomic computing devices.

13. The autonomic system of claim 12, wherein the plurality of autonomic computing devices comprises a plurality of computers and a highly distributed computing network.

14. The autonomic system of claim 12, wherein the operating status of the system comprises an event condition and the event condition comprises an incorrect operation, an emergent behavior, a failure to perform self healing, a likelihood of jeopardizing primary objectives, or a combination thereof.

15. An autonomous system, the autonomous system comprising:

a first autonomic computing device composed of self-similar autonomic components;

a second autonomic computing device composed of self-similar autonomic components; and a third autonomic computing device composed of self-similar autonomic components; wherein the third autonomic computing device facilitates communication between the first autonomic computing device and the second autonomic computing device, the first autonomic computing device generates a heart beat monitor signal and pulse monitor signal, the second autonomic computing device generates a stay-awake signal based on the generated heart beat monitor signal and pulse monitor signal from the first autonomic computing device, and then, if the first autonomic computing device does not receive a stay-awake signal after a predetermined period of time, the first autonomic computing device self-destructs, and further wherein the second autonomic computing device generates a quiesce signal based on the generated heart beat monitor signal and pulse monitor signal from the first autonomic computing device.

16. The autonomous system of claim 15, wherein each autonomic computing device comprises a first plurality of neural basis functions, and a first evolvable neural interface operably coupled to each of the first plurality of neural basis functions.

17. A non-transitory computer-accessible medium having executable instructions to construct an environment of an autonomic computing device to satisfy increasingly demanding external requirements, the executable instructions capable of directing a processor to perform:

instantiating a first embryonic evolvable neural interface;

evolving the first embryonic evolvable neural interface towards complex complete connectivity; wherein the evolvable neural interface receives one or more heart beat monitor signal, pulse monitor signal, and quiesce signal, wherein the evolvable neural interface generates one or more heart beat monitor signal, pulse monitor signal, and quiesce signal, wherein the quiesce signal comprises a stay-awake signal, wherein the first embryonic evolvable neural interface receives the quiesce signal from a second embryonic evolvable neural interface to withdraw a stay-awake signal, and then, if the first embryonic evolvable neural interface does not receive a stay-alive reprieve signal after a predetermined period of time, the first embryonic evolvable neural interface self-destructs.

18. The non-transitory computer-accessible medium of claim 17, wherein the autonomic computing device comprises a plurality of computers and a highly distributed computer network.

19. A non-transitory computer-accessible medium having executable instructions to protect an autonomic computing system, the executable instructions capable of directing a processor of the autonomic system to perform:
    sending a quiesce signal to a first autonomic computing device from a second autonomic computing device;
    monitoring the response of the first autonomic computing device to the quiesce signal;
    determining the potential of the first autonomic computing device to cause harm to the autonomic system, and controlling the autonomic computing system based on the potential of the first autonomic computing device to cause harm to the autonomic computing system, wherein controlling the autonomic computing system further comprises blocking the first autonomic computing device from accessing certain resources, and generating a signal to the second autonomic computing device to transmit to the first autonomic computing device a stay-awake signal, and wherein the quiesce signal is a request for the first autonomic computing device to deactivate, and, if the first autonomic computing device does not receive a stay-alive reprieve signal, the first autonomic computing device self-destructs.

20. The non-transitory computer-accessible medium of claim 19, wherein the first autonomic system comprises a highly distributed computer network.

21. The non-transitory computer-accessible medium of claim 19, wherein controlling the autonomic system further comprises: generating a signal to the first autonomic computing device to withdraw the stay-awake signal.

22. A computer system for protecting an autonomic system, the computer system comprising:
    a processor;
    a storage device coupled to the processor; and
    the non-transitory computer-accessible medium of claim 19.

23. A non-transitory computer-accessible medium in a first autonomic robotics device, the computer-accessible medium having executable instructions of autonomic communication, the executable instructions capable of directing a processor of the first autonomic robotics device to perform: receiving a quiesce instruction from a second autonomic robotics device; and invoking a function of a quiesce component of the first autonomic robotics device, wherein the function of the quiesce component comprises deactivating the first autonomic robotics device, and then, if the first autonomic robotics device does not receive a stay-alive reprieve signal after a predetermined period of time, the first autonomic robotics device self-destructs.

24. The non-transitory computer-accessible medium of claim 23, wherein the computer-accessible medium is installed in a processor of a first autonomic robotics device.

25. The non-transitory computer-accessible medium of claim 23, wherein the executable instructions are capable of directing the processor of the first autonomic robotics device to transmit environment health/urgency data and then subsequently transmit self health/urgency data.

26. The non-transitory computer-accessible medium of claim 23, wherein the executable instructions are capable of directing the processor of the first autonomic robotics device to transmit environment health/urgency data and simultaneously transmit self health/urgency data.

27. The non-transitory computer-accessible medium of claim 23, the medium further comprising executable instructions capable of directing the processor to perform the function of receiving environment health/urgency data from an environment control loop component of the first autonomic robotics device.

28. An autonomic robotics device, the autonomic robotics device comprising:
    a self-monitor that is operable to receive information from sensors and operable to monitor and analyze the sensor information and access a knowledge repository;
    a self-adjuster operably coupled to the self-monitor in a self control loop, the self adjuster operable to access the knowledge repository, the self adjuster operable to transmit data to effectors, and the self adjuster operable to plan and execute;
    an environment-monitor that is operable to receive information from the sensors and operable to monitor and analyze the sensor information and access the knowledge repository;
    an autonomic manager communications component operably coupled to the environment-monitor in an environment control loop, the autonomic manager communications component being operable to access the knowledge repository, and to produce and transmit a pulse monitor signal, the pulse monitor signal including a heart beat monitor signal and a reflex signal, the reflex signal including self health/urgency data and environment health/urgency data; and
    a quiescing component operably coupled to the self-monitor, the quiescing component receiving a quiescence instruction from another autonomic robotics device, the quiescing component withdrawing a stay-awake signal, if a first autonomic robotics device does not receive a stay-alive reprieve signal after a predetermined period of time, the first autonomic robotics device self-destructs.

29. The autonomic robotics device of claim 28, wherein the first autonomic robotics device comprises a plurality of robotic devices.

30. The autonomic robotics device of claim 28, wherein the pulse monitor signal further comprises at least one of an urgency signal, environmental condition, and an event condition.

31. A method for managing a first robotics device based on a functioning state and an operating status of the first robotics device, the method comprising:
    receiving a quiesce instruction from a second robotics device;
    invoking a function of a quiesce component of the first robotics device, wherein the function of the quiesce component comprises deactivating the first robotics device, and then, if the first robotics device does not receive a stay-alive reprieve signal after a predetermined period of time, the first robotics device self-destructs; and
    generating one or more stay-awake signals based on the functioning state and operating status of the first robotics device.

32. The method of claim 31, wherein the generating one or more stay-awake signal is based on processing received signals from the first robotics device indicative of functioning state and operating status to obtain an analysis of the condition of the first robotics device.

33. The method of claim 31, wherein the operating status of the first robotics device comprises an event condition, and the event condition comprises an incorrect operation, an emergent behavior, a failure to perform self healing, or a likelihood of jeopardizing primary objectives.

34. An autonomic system, the autonomic system comprising:
a plurality of autonomic robotics devices performing one or more programmed tasks;
a coordinating autonomic robotics device for assigning programmed tasks and for issuing instructions to the plurality of autonomic robotics devices; and
a messenger autonomic robotics device for facilitating communication among the coordinating autonomic robotics device, plurality of autonomic robotics devices, and a remote system; wherein one or more programmed tasks performed by the plurality of autonomic robotics device is generating signals indicative of functional state and operating status; wherein the coordinating autonomic robotics device based on the generated signals emits a stay-awake signal to one or more of the plurality of autonomic robotics devices, and then, if the at least one autonomic robotics device does not receive the stay-awake signal after a predetermined period of time, the at least one autonomic robotics device self-destructs, and wherein the coordinating autonomic robotics device emits a quiesce signal, based on the generated signals, to one or more of the plurality of autonomic robotics devices.

35. The autonomic system of claim 34, wherein the plurality of autonomic robotics devices comprises a swarm of robotic devices.

36. The autonomic system of claim 34, wherein the operating status of the system comprises an event condition and the event condition comprises an incorrect operation, an emergent behavior, a failure to perform self healing, a likelihood of jeopardizing primary objectives, or a combination thereof.

37. An autonomous system, the autonomous system comprising:
a first autonomic robotics device composed of self-similar autonomic components;
a second autonomic robotics device composed of self-similar autonomic components; and
a third autonomic robotics device composed of self-similar autonomic components; wherein the third autonomic robotics device facilitates communication between the first autonomic robotics device and the second autonomic robotics device, the first autonomic robotics device generates a heart beat monitor signal and pulse monitor signal, the second autonomic robotics device generates a stay-awake signal based on the generated heart beat monitor signal and pulse monitor signal from the first autonomic robotics device, and then, if the first autonomic robotics device does not receive a stay-awake signal after a predetermined period of time, the first autonomic robotics device self-destructs, and further wherein the second autonomic robotics device generates a quiesce signal based on the generated heart beat monitor signal and pulse monitor signal from the first autonomic robotics device.

38. The autonomous system of claim 37, wherein each autonomic robotics device comprises a first plurality of neural basis functions and a first evolvable neural interface operably coupled to each of the first plurality of neural basis functions.

39. The autonomous system of claim 37, wherein the autonomic robotics device comprises a plurality of robotic devices.

40. A non-transitory computer-accessible medium having executable instructions to construct an environment of an autonomic robotics device to satisfy increasingly demanding external requirements, the executable instructions capable of directing a processor to perform:
instantiating a first embryonic evolvable neural interface;
evolving the first embryonic evolvable neural interface towards complex complete connectivity; wherein the evolvable neural interface receives one or more heart beat monitor signal, pulse monitor signal, and quiesce signal, wherein the evolvable neural interface generates one or more heart beat monitor signal, pulse monitor signal, and quiesce signal, wherein the quiesce signal comprises a stay-awake signal, wherein the first embryonic evolvable neural interface receives the quiesce signal from a second embryonic evolvable neural interface to withdraw a stay-awake signal, and then, if the first embryonic evolvable neural interface does not receive a stay-alive reprieve signal after a predetermined period of time, the first embryonic evolvable neural interface self-destructs.

41. The non-transitory computer-accessible medium of claim 40, wherein the autonomic robotics device comprises one or more detectors.

42. The non-transitory computer-accessible medium of claim 41, wherein the autonomic robotics device comprises one or more detectors selected from a motion detector, a glass-shatter detector, a trip wire detector, a laser trip wire detector, a door alarm, an infrared heat detector, a weight detector, a light detector, a temperature detector, a vibration detector, and an electromagnetic radiation detector.

43. A non-transitory computer-accessible medium having executable instructions to protect an autonomic robotics system, the executable instructions capable of directing a processor of the autonomic system to perform:
sending a quiesce signal to a first autonomic robotics device from a second autonomic robotics device; monitoring the response of the first autonomic robotics device to the quiesce signal; determining the potential of the first autonomic robotics device to cause harm to the autonomic system, and controlling the autonomic robotics system based on the potential of the first autonomic robotics device to cause harm to the autonomic robotics system, wherein controlling the autonomic robotics system further comprises blocking the first autonomic robotics device from accessing certain resources, and generating a signal to the second autonomic robotics device to transmit to the first autonomic robotics device a stay-awake signal, and wherein the quiesce signal is a request for the first autonomic robotics device to deactivate, and, if the first autonomic robotics device does not receive a stay-alive reprieve signal, the first autonomic robotics device self-destructs.

44. The non-transitory computer-accessible medium of claim 43, wherein the first autonomic robotics device comprises a plurality of robotics devices.

45. The non-transitory computer-accessible medium of claim 43, wherein controlling the autonomic system further comprises: generating a signal to the first autonomic robotics device to withdraw the stay-awake signal.

46. A computer system for protecting an autonomic system, the computer system comprising:
a processor;
a storage device coupled to the processor; and
the non-transitory computer-accessible medium of claim 43.

47. A non-transitory computer-accessible medium in a first autonomic security device, the computer-accessible medium having executable instructions of autonomic communication, the executable instructions capable of directing a processor of the first autonomic security device to perform: receiving a quiesce instruction from a second autonomic security device; and invoking a function of a quiesce component of the first autonomic security device, wherein the function of the quiesce component comprises deactivating the first autonomic security device, and then, if the first autonomic security device does not receive a stay-alive reprieve signal after a predetermined period of time, the first autonomic security device self-destructs.

48. The non-transitory computer-accessible medium of claim 47, wherein the autonomic security device comprises a motion detector, a glass-shatter detector, a trip wire detector, a laser trip wire detector, a door alarm, an infrared heat detector, a weight detector, or a combination thereof.

49. The non-transitory computer-accessible medium of claim 47, wherein the executable instructions are capable of directing the processor of the first autonomic security device to transmit environment health/urgency data and then subsequently transmit self health/urgency data.

50. The non-transitory computer-accessible medium of claim 47, wherein the executable instructions are capable of directing the processor of the first autonomic security device to transmit environment health/urgency data and simultaneously transmit self health/urgency data.

51. The non-transitory computer-accessible medium of claim 47, wherein the executable instructions are capable of directing the processor of the first autonomic security device to transmit environment health/urgency data and self health/urgency data together.

52. An autonomic security device, the autonomic security device comprising:
- a self-monitor that is operable to receive information from sensors and operable to monitor and analyze the sensor information and access a knowledge repository;
- a self-adjuster operably coupled to the self-monitor in a self control loop, the self adjuster operable to access the knowledge repository, the self adjuster operable to transmit data to effectors, and the self adjuster operable to plan and execute;
- an environment-monitor that is operable to receive information from the sensors and operable to monitor and analyze the sensor information and access the knowledge repository;
- an autonomic manager communications component operably coupled to the environment-monitor in an environment control loop, the autonomic manager communications component being operable to access the knowledge repository, and to produce and transmit a pulse monitor signal, the pulse monitor signal including a heart beat monitor signal and a reflex signal, the reflex signal including self health/urgency data and environment health/urgency data; and
- a quiescing component operably coupled to the self-monitor, the quiescing component receiving a quiescence instruction from another autonomic security device, the quiescing component withdrawing a stay-awake signal, if the first autonomic security device does not receive a stay-alive reprieve signal after a predetermined period of time, the first autonomic security device self-destructs.

53. The autonomic security device of claim 52, the autonomic security device further comprising one or more detectors.

54. The autonomic security device of claim 53, wherein the one or more detectors are selected from a motion detector, a glass-shatter detector, a trip wire detector, a laser trip wire detector, a door alarm, an infrared heat detector, a weight detector, a light detector, a temperature detector, a vibration detector, an electromagnetic radiation detector, and a combination thereof.

55. A method for managing a first security device based on a functioning state and an operating status of the first security device, the method comprising:
- receiving a quiesce instruction from a second security device;
- invoking a function of a quiesce component of the first security device, wherein the function of the quiesce component comprises deactivating the first security device, and then, if the first security device does not receive a stay-alive reprieve signal after a predetermined period of time, the first security device self-destructs; and
- generating one or more stay-awake signals based on the functioning state and operating status of the first security device.

56. The method of claim 55, wherein the generating one or more stay-awake signal is based on processing received signals from the first security device indicative of functioning state and operating status to obtain an analysis of the condition of the first security device.

57. The method of claim 55, wherein the functioning state of the first security device comprises one or more on signals, off signals, active signals, and inactive signals.

58. The method of claim 55, wherein the operating status of the first security device comprises an event condition, and the event condition comprises an incorrect operation, an emergent behavior, a failure to perform self healing, or a likelihood of jeopardizing primary objectives.

59. An autonomic system, the autonomic system comprising:
- a plurality of autonomic security devices performing one or more programmed tasks;
- a coordinating autonomic security device for assigning programmed tasks and for issuing instructions to the plurality of autonomic security devices; and
- a messenger autonomic security device for facilitating communication among the coordinating autonomic security device, plurality of autonomic security devices, and a remote system; wherein one or more programmed tasks performed by the plurality of autonomic security device is generating signals indicative of functional state and operating status; wherein the coordinating autonomic security device based on the generated signals emits a stay-awake signal to one or more of the plurality of autonomic security devices, and then, if the at least one autonomic security device does not receive the stay-awake signal after a predetermined period of time, the at least one autonomic security device self-destructs, and wherein the coordinating autonomic security device emits a quiesce signal, based on the generated signals, to one or more of the plurality of autonomic security devices.

60. The autonomic system of claim 59, wherein the plurality of autonomic security devices further comprises a plurality of motion detectors, glass-shatter detectors, trip wire detectors, laser trip wire detectors, door alarms, infrared heat detectors, weight detectors, or a combination thereof.

61. The autonomic system of claim 59, wherein the operating status of the system comprises an event condition and the event condition comprises an incorrect operation, an emergent behavior, a failure to perform self healing, a likelihood of jeopardizing primary objectives, or a combination thereof.

62. An autonomous system, the autonomous system comprising:
- a first autonomic security device composed of self-similar autonomic components;
- a second autonomic security device composed of self-similar autonomic components; and
- a third autonomic security device composed of self-similar autonomic components; wherein the third autonomic security device facilitates communication between the first autonomic security device and the second autonomic security device, the first autonomic security device generates a heart beat monitor signal and pulse monitor signal, the second autonomic security device generates a stay-awake signal based on the generated heart beat monitor signal and pulse monitor signal from the first autonomic security device, and then, if the first autonomic security device does not receive a stay-awake signal after a predetermined period of time, the first autonomic security device self-destructs, and further wherein the second autonomic security device generates a quiesce signal based on the generated heart beat monitor signal and pulse monitor signal from the first autonomic security device.

63. The autonomous system of claim 62, wherein each autonomic security device comprises: a motion detector, a glass-shatter detector, a trip wire detector, a laser trip wire detector, a door alarm, an infrared heat detector, a weight detector, or a combination thereof; a first plurality of neural basis functions; and a first evolvable neural interface operably coupled to each of the first plurality of neural basis functions.

64. A non-transitory computer-accessible medium having executable instructions to construct an environment of an autonomic security device to satisfy increasingly demanding external requirements, the executable instructions capable of directing a processor to perform: instantiating a first embryonic evolvable neural interface; evolving the first embryonic evolvable neural interface towards complex complete connectivity; wherein the evolvable neural interface receives one or more heart beat monitor signal, pulse monitor signal, and quiesce signal, wherein the evolvable neural interface generates one or more heart beat monitor signal, pulse monitor signal, and quiesce signal, wherein the quiesce signal comprises a stay-awake signal, wherein the first embryonic evolvable neural interface receives the quiesce signal from a second embryonic evolvable neural interface to withdraw a stay-awake signal, and then, if the first embryonic evolvable neural interface does not receive a stay-alive reprieve signal after a predetermined period of time, the first embryonic evolvable neural interface self-destructs.

65. The non-transitory computer-accessible medium of claim 64, wherein the autonomic security device comprises a motion detector, a glass-shatter detector, a trip wire detector, a laser trip wire detector, a door alarm, an infrared heat detector, a weight detector, or a combination thereof.

66. The non-transitory computer-accessible medium of claim 64, wherein the embryonic evolvable neural interface further comprises a neural thread possessing only minimal connectivity.

67. A non-transitory computer-accessible medium having executable instructions to protect an autonomic security system, the executable instructions capable of directing a processor of the autonomic system to perform:
- sending a quiesce signal to a first autonomic security device from a second autonomic security device; monitoring the response of the first autonomic security device to the quiesce signal; determining the potential of the first autonomic security device to cause harm to the autonomic system, and controlling the autonomic security system based on the potential of the first autonomic security device to cause harm to the autonomic security system, wherein controlling the autonomic security system further comprises blocking the first autonomic security device from accessing certain resources, and generating a signal to the second autonomic security device to transmit to the first autonomic security device a stay-awake signal, and wherein the quiesce signal is a request for the first autonomic security device to deactivate, and, if the first autonomic security device does not receive a stay-alive reprieve signal, the first autonomic security device self-destructs.

68. The non-transitory computer-accessible medium of claim 67, wherein the first autonomic security device comprises a motion detector, a glass-shatter detector, a trip wire detector, a laser trip wire detector, a door alarm, an infrared heat detector, a weight detector, or a combination thereof.

69. The non-transitory computer-accessible medium of claim 67, wherein controlling the autonomic system further comprises: generating a signal to the first autonomic security device to withdraw the stay-awake signal.

70. A computer system for protecting an autonomic system, the computer system comprising:
- a processor;
- a storage device coupled to the processor; and
- the non-transitory computer-accessible medium of claim 67.

* * * * *